(12) United States Patent
Dalum et al.

(10) Patent No.: US 8,905,166 B2
(45) Date of Patent: Dec. 9, 2014

(54) HYBRID VEHICLE DRIVE SYSTEM AND METHOD AND IDLE REDUCTION SYSTEM AND METHOD

(71) Applicant: Odyne Systems, LLC, Waukesha, WI (US)

(72) Inventors: Joseph Thomas Dalum, Delafield, WI (US); Matthew J. Jarmuz, Grafton, WI (US); Daniel Francis Myers, Milwaukee, WI (US); Joseph Mario Ambrosio, Smithtown, NY (US)

(73) Assignee: Odyne Systems, LLC, Waukesha, WI (US)

( * ) Notice: Subject to any disclaimer, the term of this patent is extended or adjusted under 35 U.S.C. 154(b) by 0 days.

(21) Appl. No.: 13/629,533

(22) Filed: Sep. 27, 2012

(65) Prior Publication Data

US 2013/0096754 A1    Apr. 18, 2013

Related U.S. Application Data

(60) Division of application No. 12/710,247, filed on Feb. 22, 2010, now Pat. No. 8,408,341, which is a (Continued)

(51) Int. Cl.
*B60K 6/42*    (2007.10)
*B60K 6/12*    (2006.01)
(Continued)

(52) U.S. Cl.
CPC .................. *B60W 20/00* (2013.01); *B60K 6/12* (2013.01); *B60Y 2200/14* (2013.01);
(Continued)

(58) Field of Classification Search
CPC .............................. B60K 17/28; B60K 17/00
USPC ........ 180/65.22, 65.25, 65.23, 65.26, 65.275, 180/65.285, 367
See application file for complete search history.

(56) References Cited

U.S. PATENT DOCUMENTS

| 2,581,010 A | 1/1952 | Findley et al. |
| 2,968,915 A | 1/1961 | Feistel, Jr. |

(Continued)

FOREIGN PATENT DOCUMENTS

| CN | 1647968 | 8/2005 |
| CN | 101011964 | 8/2007 |

(Continued)

OTHER PUBLICATIONS

AZD, Azure Dynamics, Electric Drive Solutions, AZD Force Drive, We drive a World of difference; available at least by May 30, 2008; 2 pgs.

(Continued)

*Primary Examiner* — John Walters
*Assistant Examiner* — Brian Swenson
(74) *Attorney, Agent, or Firm* — Foley & Lardner LLP

(57) ABSTRACT

A hybrid vehicle drive system for a vehicle includes a first prime mover, a first prime mover driven transmission, and a rechargeable power source. The hybrid vehicle drive system further includes an interface between the transmission and the prime mover for coupling to an electric motor. The electric motor can be in direct or indirect mechanical communication with a hydraulic pump. The electric motor can receive power from the prime mover driven transmission through the interface.

18 Claims, 29 Drawing Sheets

Related U.S. Application Data continuation-in-part of application No. 12/130,888, filed on May 30, 2008, said application No. 12/710,247 is a continuation-in-part of application No. 12/217,407, filed on Jul. 3, 2008, said application No. 12/710,247 is a continuation-in-part of application No. PCT/US2008/008442, filed on Jul. 10, 2008, and a continuation-in-part of application No. PCT/US2008/079376, filed on Oct. 9, 2008, which is a continuation of application No. 12/130,088, filed on May 30, 2008, now abandoned, said application No. 12/710,247 is a continuation-in-part of application No. PCT/US2009/066151, filed on Nov. 30, 2009.

(60) Provisional application No. 60/979,755, filed on Oct. 12, 2007, provisional application No. 61/014,406, filed on Dec. 17, 2007, provisional application No. 60/959,181, filed on Jul. 12, 2007, provisional application No. 61/126,118, filed on May 1, 2008, provisional application No. 60/979,755, filed on Oct. 12, 2007, provisional application No. 61/118,980, filed on Dec. 1, 2008, provisional application No. 61/177,240, filed on May 11, 2009, provisional application No. 61/235,998, filed on Aug. 21, 2009, provisional application No. 61/251,285, filed on Oct. 13, 2009.

(51) Int. Cl.
| | | |
|---|---|---|
| *B60W 20/00* | (2006.01) | |
| *B60W 30/188* | (2012.01) | |
| *B60W 10/06* | (2006.01) | |
| *B60L 11/14* | (2006.01) | |
| *B60K 25/00* | (2006.01) | |
| *B60L 11/00* | (2006.01) | |
| *B60K 6/48* | (2007.10) | |
| *B60K 6/442* | (2007.10) | |
| *B60W 10/08* | (2006.01) | |
| *B60L 1/00* | (2006.01) | |
| *B60K 17/28* | (2006.01) | |
| *B60K 6/28* | (2007.10) | |
| *B60K 1/02* | (2006.01) | |
| *B60W 10/30* | (2006.01) | |

(52) U.S. Cl.
CPC .......... *B60W 30/1888* (2013.01); *Y02T 10/6282* (2013.01); *B60W 10/06* (2013.01); *B60L 11/14* (2013.01); *Y02T 90/16* (2013.01); *B60K 1/02* (2013.01); *Y02T 10/6208* (2013.01); *Y02T 10/6221* (2013.01); *B60K 25/00* (2013.01); *Y10S 903/93* (2013.01); *Y02T 10/7077* (2013.01); *B60L 11/002* (2013.01); *B60K 6/48* (2013.01); *B60K 6/442* (2013.01); *Y02T 10/6269* (2013.01); *Y02T 10/6278* (2013.01); *Y02T 10/6286* (2013.01); *B60W 10/30* (2013.01); *B60W 10/08* (2013.01); *B60L 1/003* (2013.01); *B60K 17/28* (2013.01); *B60K 6/28* (2013.01); *B60L 1/00* (2013.01)
USPC .............. 180/65.22; 180/65.285; 903/930

(56) References Cited

U.S. PATENT DOCUMENTS

| | | |
|---|---|---|
| 3,299,983 A | 1/1967 | Hubbard |
| 3,923,115 A | 12/1975 | Helling |
| 4,443,752 A | 4/1984 | Newman |
| 4,588,040 A | 5/1986 | Albright et al. |
| 4,918,690 A | 4/1990 | Markkula et al. |
| 4,941,143 A | 7/1990 | Twitty et al. |
| 4,948,050 A | 8/1990 | Picot |
| 4,955,018 A | 9/1990 | Twitty et al. |
| 4,959,962 A | 10/1990 | Hagin et al. |
| 4,962,462 A | 10/1990 | Fekete |
| 4,969,147 A | 11/1990 | Markkula et al. |
| 4,993,780 A | 2/1991 | Tanaka et al. |
| 5,190,118 A | 3/1993 | Yelton |
| 5,195,600 A | 3/1993 | Dorgan |
| 5,242,278 A | 9/1993 | Vanderslice et al. |
| 5,297,143 A | 3/1994 | Fridrich et al. |
| 5,315,227 A | 5/1994 | Pierson et al. |
| 5,318,142 A | 6/1994 | Bates et al. |
| 5,319,641 A | 6/1994 | Fridrich et al. |
| 5,366,827 A | 11/1994 | Belanger et al. |
| 5,373,198 A | 12/1994 | Lopez Jimenez |
| 5,394,089 A | 2/1995 | Clegg |
| 5,420,572 A | 5/1995 | Dolin et al. |
| 5,492,189 A | 2/1996 | Kriegler et al. |
| 5,495,912 A | 3/1996 | Gray et al. |
| 5,500,852 A | 3/1996 | Riley |
| 5,513,324 A | 4/1996 | Dolin et al. |
| 5,519,878 A | 5/1996 | Dolin, Jr. |
| 5,558,588 A | 9/1996 | Schmidt |
| 5,568,037 A | 10/1996 | Massaroni et al. |
| 5,569,552 A | 10/1996 | Rao et al. |
| 5,620,057 A | 4/1997 | Klemen et al. |
| 5,625,272 A | 4/1997 | Takahashi |
| 5,635,805 A | 6/1997 | Ibaraki et al. |
| 5,669,842 A | 9/1997 | Schmidt |
| 5,701,068 A | 12/1997 | Baer et al. |
| 5,806,617 A | 9/1998 | Yamaguchi |
| 5,866,276 A | 2/1999 | Ogami et al. |
| 5,867,009 A | 2/1999 | Kiuchi et al. |
| 5,887,674 A | 3/1999 | Gray, Jr. |
| 5,923,093 A | 7/1999 | Tabata et al. |
| 5,985,483 A | 11/1999 | Verhoog et al. |
| 6,037,749 A | 3/2000 | Parsonage |
| 6,042,961 A | 3/2000 | Verhoog et al. |
| 6,048,288 A | 4/2000 | Tsujii et al. |
| 6,057,050 A | 5/2000 | Parise |
| 6,165,102 A * | 12/2000 | Bellinger .................. 477/54 |
| 6,198,387 B1 | 3/2001 | Dalum et al. |
| 6,220,733 B1 | 4/2001 | Gordon |
| 6,251,042 B1 | 6/2001 | Peterson et al. |
| 6,269,895 B1 | 8/2001 | Tanuguchi et al. |
| 6,316,841 B1 | 11/2001 | Weber |
| 6,395,417 B1 | 5/2002 | Frazier |
| 6,456,041 B1 | 9/2002 | Terada et al. |
| 6,484,830 B1 | 11/2002 | Gruenwald et al. |
| 6,502,393 B1 | 1/2003 | Stephenson et al. |
| 6,511,399 B2 * | 1/2003 | McCollum et al. ........... 477/107 |
| 6,524,084 B2 | 2/2003 | Neumair |
| 6,524,743 B2 | 2/2003 | Vackar |
| 6,590,363 B2 | 7/2003 | Teramoto |
| 6,598,496 B2 | 7/2003 | Pannell |
| 6,617,826 B2 | 9/2003 | Liao et al. |
| 6,651,759 B1 | 11/2003 | Gruenwald et al. |
| 6,653,002 B1 | 11/2003 | Parise |
| 6,658,852 B2 | 12/2003 | Frey |
| 6,666,022 B1 | 12/2003 | Yoshimatsu et al. |
| 6,672,415 B1 | 1/2004 | Tabata |
| 6,692,395 B2 | 2/2004 | Rodeghiero et al. |
| 6,705,416 B1 | 3/2004 | Glonner et al. |
| 6,708,787 B2 | 3/2004 | Naruse et al. |
| 6,718,782 B2 | 4/2004 | Egami |
| 6,719,080 B1 | 4/2004 | Gray, Jr. |
| 6,725,581 B2 | 4/2004 | Naruse et al. |
| 6,751,960 B2 | 6/2004 | Arimitsu |
| 6,834,737 B2 | 12/2004 | Bloxham |
| 6,880,651 B2 | 4/2005 | Loh et al. |
| 6,882,129 B2 | 4/2005 | Boskovitch et al. |
| 6,885,920 B2 | 4/2005 | Yakes et al. |
| 6,922,990 B2 | 8/2005 | Naruse et al. |
| 6,945,039 B2 | 9/2005 | Yoshino |
| 6,945,893 B2 | 9/2005 | Grillo et al. |
| 7,004,273 B1 | 2/2006 | Gruenwald et al. |
| 7,017,348 B2 | 3/2006 | Tajima et al. |
| 7,086,226 B2 | 8/2006 | Oguri |

(56) References Cited

U.S. PATENT DOCUMENTS

| | | | |
|---|---|---|---|
| 7,096,985 | B2 | 8/2006 | Charaudeau et al. |
| 7,104,920 | B2 | 9/2006 | Beaty et al. |
| 7,119,454 | B1 | 10/2006 | Chiao |
| 7,125,357 | B2 | 10/2006 | Porter |
| 7,147,071 | B2 | 12/2006 | Gering et al. |
| 7,182,583 | B2 | 2/2007 | Gandrud et al. |
| 7,185,722 | B1 | 3/2007 | Sakamoto et al. |
| 7,190,133 | B2 | 3/2007 | King et al. |
| 7,207,916 | B2 | 4/2007 | Rodeghiero et al. |
| 7,219,000 | B2 | 5/2007 | Steinmetz et al. |
| 7,251,265 | B2 | 7/2007 | Yakymyshyn et al. |
| 7,252,165 | B1 | 8/2007 | Gruenwald et al. |
| 7,258,183 | B2 | 8/2007 | Leonardi et al. |
| 7,273,122 | B2 | 9/2007 | Rose |
| 7,275,917 | B1 | 10/2007 | Hicks |
| 7,277,782 | B2 | 10/2007 | Yakes et al. |
| 7,293,621 | B2 | 11/2007 | Long |
| 7,298,102 | B2 | 11/2007 | Sopko et al. |
| 7,315,090 | B2 | 1/2008 | Yang |
| 7,345,441 | B2 | 3/2008 | Yoshimatsu |
| 7,375,492 | B2 | 5/2008 | Calhoon et al. |
| 7,391,129 | B2 | 6/2008 | Chiao et al. |
| 7,427,156 | B2 | 9/2008 | Ambrosio et al. |
| 7,448,981 | B2 | 11/2008 | Mashiki |
| 7,471,066 | B2 | 12/2008 | Ambrosio et al. |
| 7,520,354 | B2 | 4/2009 | Morrow et al. |
| 7,575,287 | B2 | 8/2009 | Matsuura et al. |
| 7,597,172 | B1 | 10/2009 | Kovach et al. |
| 7,600,595 | B2 * | 10/2009 | Harris ........................ 180/65.31 |
| 7,610,976 | B2 | 11/2009 | Holmes et al. |
| 7,641,018 | B2 | 1/2010 | Bissontz |
| 7,657,350 | B2 | 2/2010 | Moran |
| 7,658,250 | B2 | 2/2010 | Betz et al. |
| 7,662,062 | B2 | 2/2010 | Yang |
| 7,665,559 | B2 | 2/2010 | De La Torre-Bueno |
| 7,669,414 | B2 | 3/2010 | Loeffler |
| 7,806,801 | B2 | 10/2010 | Gohring et al. |
| 7,841,432 | B2 | 11/2010 | Lynn et al. |
| 7,854,282 | B2 | 12/2010 | Lee et al. |
| 7,859,202 | B2 | 12/2010 | Lukic et al. |
| 7,921,950 | B2 | 4/2011 | Harris |
| 7,994,221 | B2 | 8/2011 | Dai et al. |
| 8,275,528 | B2 | 9/2012 | Kresse |
| 2001/0035740 | A1 | 11/2001 | Palanisamy |
| 2002/0028376 | A1 | 3/2002 | Yamane et al. |
| 2002/0104300 | A1 | 8/2002 | Hunt |
| 2002/0108794 | A1 | 8/2002 | Wakashiro et al. |
| 2003/0062205 | A1 * | 4/2003 | Konrad et al. ................ 180/65.2 |
| 2003/0103850 | A1 | 6/2003 | Szulczewski |
| 2003/0145666 | A1 | 8/2003 | Warner |
| 2003/0162631 | A1 * | 8/2003 | Williams ........................... 477/5 |
| 2003/0169002 | A1 | 9/2003 | Hughes |
| 2004/0108831 | A1 | 6/2004 | Cartwright et al. |
| 2004/0207205 | A1 | 10/2004 | Kikuchi et al. |
| 2004/0207350 | A1 | 10/2004 | Wilton et al. |
| 2004/0251065 | A1 | 12/2004 | Komiyama et al. |
| 2005/0012337 | A1 | 1/2005 | Yoshimatsu |
| 2005/0082098 | A1 | 4/2005 | Ito et al. |
| 2005/0139399 | A1 | 6/2005 | Gopal |
| 2005/0167169 | A1 | 8/2005 | Gering et al. |
| 2005/0202315 | A1 | 9/2005 | Sugeno et al. |
| 2005/0271934 | A1 | 12/2005 | Kiger et al. |
| 2006/0052215 | A1 | 3/2006 | Beaty et al. |
| 2006/0068970 | A1 | 3/2006 | Rose |
| 2006/0116797 | A1 | 6/2006 | Moran |
| 2007/0001616 | A1 | 1/2007 | Puccetti et al. |
| 2007/0095587 | A1 | 5/2007 | DuCharme |
| 2007/0096667 | A1 | 5/2007 | Komiyama et al. |
| 2007/0107958 | A1 | 5/2007 | Oliver |
| 2007/0124037 | A1 | 5/2007 | Moran |
| 2007/0158118 | A1 | 7/2007 | King |
| 2007/0181355 | A1 | 8/2007 | Harris |
| 2007/0209850 | A1 | 9/2007 | Bloomfield |
| 2007/0227801 | A1 | 10/2007 | Loeffler |
| 2007/0246274 | A1 | 10/2007 | Dreibholz et al. |
| 2007/0278022 | A1 | 12/2007 | Tanishima |
| 2008/0093143 | A1 * | 4/2008 | Harrison ........................ 180/165 |
| 2008/0093864 | A1 | 4/2008 | Kagoshima et al. |
| 2008/0141800 | A1 | 6/2008 | Seitz et al. |
| 2008/0234097 | A1 | 9/2008 | Sah |
| 2008/0288132 | A1 | 11/2008 | King et al. |
| 2009/0018716 | A1 | 1/2009 | Ambrosio |
| 2009/0068547 | A1 | 3/2009 | Ambrosio et al. |
| 2009/0095549 | A1 | 4/2009 | Dalum et al. |
| 2009/0096424 | A1 | 4/2009 | Ambrosio et al. |
| 2009/0236156 | A1 | 9/2009 | Promersberger et al. |
| 2009/0259355 | A1 | 10/2009 | Li |
| 2009/0259363 | A1 | 10/2009 | Li et al. |
| 2010/0065358 | A1 | 3/2010 | Harris |
| 2010/0219007 | A1 | 9/2010 | Dalum et al. |
| 2011/0022259 | A1 | 1/2011 | Niwa |
| 2011/0190968 | A1 | 8/2011 | Fleming et al. |

FOREIGN PATENT DOCUMENTS

| | | |
|---|---|---|
| DE | 2701301 | 7/1978 |
| DE | 4024384 | 2/1992 |
| DE | 4102822 | 8/1992 |
| DE | 4102882 | 8/1992 |
| DE | 4204384 | 8/1993 |
| DE | 19748423 | 2/1999 |
| DE | 10203514 | 8/2003 |
| EP | 492152 | 7/1992 |
| EP | 2055548 | 5/2009 |
| JP | 08-308020 | 11/1996 |
| JP | 08-322107 | 12/1996 |
| JP | 09-163616 | 6/1997 |
| JP | 10-037904 | 2/1998 |
| JP | 2001-008309 | 1/2001 |
| JP | 2003-191762 | 1/2005 |
| JP | 2007-069788 | 3/2007 |
| JP | 2007-106385 | 4/2007 |
| JP | 2007-107231 | 4/2007 |
| WO | WO-92/01584 | 2/1992 |
| WO | WO-2007/097819 | 8/2007 |
| WO | WO-2009/009078 | 1/2009 |
| WO | WO-2009/049066 | 4/2009 |

OTHER PUBLICATIONS

AZD, Azure Dynamics, Force Drive Electric Solutions, Force Drive Electric Vehicles Zero Emissions, website: http://www.azuredynamics.com/products/force-drive/traction-motors.htm; © 2008 Azure Dynamics Inc.; accessed on Sep. 17, 2008; 2 pgs.

AZD, Azure Dynamics, LEEP, Low Emission Electric Power System, AZD has one of the largest hybrid technology engineering teams in the world; available at least by May 30, 2008; 2 pgs.

AZD, Azure Dynamics, Parallel Hybrid Electric Ford E450 Cutaway and Strip Chassis, available at least by May 30, 2008; 2 pgs.

AZD, Azure Dynamics, Series Hybrid Electric Azure CitiBus, Our drive can make your difference; available at least by May 30, 2008; 2 pgs.

Balance Hybrid Electric E450 Drive System Hybrid Trucks, © 2008 Azure Dynamics Inc.; website http://www.azuredynamics.com/products/balance-hybrid-electric.htm; accessed by Sep. 17, 2008; 2 pgs.

Blanco, S., "Odyne, Dueco will build PHV aerial lift truck," website: http://autobloggreen.com/2007/05/07/odyne-dueco-will-build-phev-aerial-lift-truck/, accessed on Jan. 3, 2009, 6 pgs.

Business Wire, Odyne Corp. Receives order for Twenty-five plug-in hybrid systems from Dueco, Inc., website: http://www.businesswire.com/portal/site/home/index.jsp?epi_menuItemID=887566059a3ae . . . , accessed on Jan. 3, 2008, 3 pgs.

CitiBus Hybrid Electric StarTrans, CitiBus Hd Senator; © 2008 Azure Dynamics Inc.; website: http://www.azuredynamics.com/products/citibus-hybrid-electric.htm; accessed on Sep. 17, 2008; 2 pgs.

Communication and Supplementary European Search Report for Application No. EP08794431, mail date May 24, 2011, 7 pages.

Dueco, Hybrid Vehicle, TL50M Dueco's Plug-In Hybrid Electric Vehicle (PHEV); available at least by May 30, 2008; website: www.dueco.com; 1 page.

(56) References Cited

OTHER PUBLICATIONS

Dueco/Odyne Corporation, Partners in Green Technology for the Utility Industry, Hybrid Power, PHEV-Diesel Electric; available at least by May 30, 2008; website: www.dueco.com; 1 page.
Eaton, Freightliner® LLC, Daimler Chrysler Truck Group, M2 "Proof of Concept" HEV Utility Truck Specs; available at least by May 30, 2008; 2 pgs.
Eaton, Hybrid Power Systems, Roadranger®, Eaton's Medium-Duty Hybrid Electric System provides up to 60% fuel savings and significantly reduces emissions as compared to a conventional drivetrain.; © 2006 Eaton Corporation; website at www.roadranger.com.; 2 pgs.
Green Car Congress, "Nissan Adds Diesel Hybrid and CNG Models to Atlas H43 Lineup," website: http://www.greencarcongress.com/2007/09/nissan-adds-die.html; accessed on Jun. 23, 2009, 2 pgs.
Hodges, Susan L., Is There a Hybrid in Your Future?; website: http://www.lmtruck.com/articles/petemplate.aspx?storyid=116; accessed on Jun. 6, 2008; 6 pgs.
Hybrid Electric Vehicles LEEP Systems/Azure Dynamics; LEEP Systems/Freeze/Lift; © 2008 Azure Dynamics Inc.; website: http://www.azuredynamics.com/products/leep-system.htm; accessed on Sep. 17, 2008; 2 pgs.
HyPower by Terex, "Low Carbon Footprint, Plug-In Power Hybrid System," Copyright © 2009 Terex Corporation, 2 pgs.
International Search Report and Written Opinion for International Appl. No. PCT/US08/08442, mail date Sep. 26, 2008, 7 pgs.
International Search Report and Written Opinion for International Appl. No. PCT/US2008/079376, mail date Apr. 9, 2009, 9 pgs.
International Search Report and Written Opinion for International Appl. No. PCT/US2009/066151 dated Jul. 15, 2010, 10 pages.
International Search Report and Written Opinion for International Application No. PCT/US2009/037664, dated Aug. 3, 2009, 9 pages.
Isuzu ELF Diesel Hybrid description from Isuzu.com—different pages of complete report retrieved from web.archieve.org on various dates such as May 9, 2006, Sep. 5, 2006, Oct. 31, 2006 for the pages included with the Office Action for U.S. Appl. No. 12/130,888, 6 pages.
Isuzu, "Introduction of ELF Diesel Hybrid," website: http://www.isuzu.co.jp/world/technology/randd/project6/01.html; accessed on Nov. 1, 2007, 2 pgs.
Isuzu; "Low Pollution Alternative Fuel Vehicles," website: http://www.isuzu.co.jp/world/technology/low/index.html, accessed on Jun. 22, 2009, 3 pgs.
Notice of Allowance for U.S. Appl. No. 11/312,803, mail date Jun. 2, 2008, 7 pages.
Notice of Allowance for U.S. Appl. No. 11/315,927, mail date Sep. 29, 2008, 7 pages.
Notice of Allowance for U.S. Appl. No. 11/322,024, mail date Nov. 15, 2007, 6 pages.
Notice of Allowance for U.S. Appl. No. 11/329,018, mail date Jun. 25, 2010, 7 pages.
Office Action for U.S. Appl. No. 11/312,803, mail date Dec. 14, 2007, 8 pages.
Office Action for U.S. Appl. No. 11/315,927, mail date Aug. 19, 2008, 15 pages.
Office Action for U.S. Appl. No. 11/315,927, mail date Nov. 21, 2007, 19 pages.
Office Action for U.S. Appl. No. 11/322,024, mail date May 29, 2007, 9 pages.
Office Action for U.S. Appl. No. 11/329,018, mail date Oct. 14, 2008, 12 pages.
Office Action for U.S. Appl. No. 12/130,888, mail date Mar. 27, 2012, 18 pages.
Office Action for U.S. Appl. No. 12/217,407, mail date Dec. 5, 2011, 10 pages.
Office Action for U.S. Appl. No. 12/217,407, mail date Jun. 21, 2011, 10 pages.
Office Action for U.S. Appl. No. 12/217,407, mail date Jun. 6, 2012, 8 pages.
Office Action for U.S. Appl. No. 12/284,612, mail date Mar. 16, 2011, 11 pages.

Office Action for U.S. Appl. No. 12/316,494, mail date Dec. 1, 2009, 15 pages.
Office Action for U.S. Appl. No. 12/316,494, mail date Jun. 9, 2009, 17 pages.
Office Action for U.S. Appl. No. 12/710,247, mail date Aug. 27, 2012, 5 pages.
Office Action for U.S. Appl. No. 12/710,247, mail date Apr. 10, 2012, 17 pages.
Office Action for U.S. Appl. No. 11/329,018, mail date Dec. 18, 2009, 13 pages.
Office Action for U.S. Appl. No. 11/329,018, mail date Jun. 25, 2009, 16 pages.
Ogando, Joseph; Hydraulic Powertrains Propel These Hybrid Trucks; website: http://www.designnews.com/article/CA6451735.html?nid=2874#_self; Design News, Jun. 13, 2007; 5 pgs.
Palumbo, Anthony J.; Bloomfield, Aaron, Major, Jeff; Ultracapacitor Based "Hybrid Booster Drive®"; Original Aug. 2003 (Revised Jun. 2004); 16 pgs.
Powderly II, H.E., Long Island Business News, "Odyne to ship 25 plug-in systems to Dueco Inc.," dated Dec. 20, 2007, website: http://www.libn.com/breakingnews.htm?articleID=9497 accessed on Jan. 3, 2008, 2 pgs.
Supplementary European Search Report and Search Opinion for European Application No. 08837311, mail date Sep. 20, 2011, 9 pages.
Supplementary European Search Report for European Patent Application No. 08837311.3, mail date Sep. 1, 2011, 8 pages.
ThomasNet, "Aerial lift truck delivers plug-in hybrid functionality," website: http://news.thomasnet.com/fullstory/535299, accessed on Jan. 3, 2008, 4 pgs.
Vasilash, G., "Power Trains 2005, Hybrid Powertrains: The Two-Mode Approach," website: http://www.autofieldguide.com/articles/article_print1.cfm, accessed on Jun. 24, 2009, 3 pgs.
Vehicle Technology.org, Advanced GM Allison Two-Mode Parallel Hybrid Technology Ready for Europe; Energy storage system (ESS); website: http://www.vehicletecnology.org/vt2007/38.html; accessed on Jun. 22, 2009, 3 pgs.
Vehicle Technology.org, Advanced GM Allison Two-Mode Parallel Hybrid Technology Ready for Europe; website: http://www.vehicletecnology.org/vt2007/36.html; accessed on Jun. 6, 2008; 2 pgs.
Vehicle Technology.org, Advanced GM Allison Two-Mode Parallel Hybrid Technology Ready for Europe; website: http://www.vehicletecnology.org/vt2007/37.html; accessed on Jun. 6, 2008; 2 pgs.
Office Action for Japanese Application No. 2010-529046, mail date Mar. 12, 2013, 2 pages.
Office Action for U.S. Appl. No. 12/217,407, mail date Feb. 5, 2013, 10 pages.
Cai, W., Chapter 25: Integrated Starter Alternator, Automotive Power Electronics and Motor Drives, 2005, 55 pages.
Chinese Office Action for Application No. 200880105323.X, dated May 9, 2012, 7 pages.
English Translation of Office Action for Chinese Application No. 200880105323.X, dated May 9, 2012, 7 pages.
Li et al., "Power Management System for Plug-In Hybrid Electric Vehicles" UWM Research Foundation, 2012, 2 pages.
Li, Y., Trip Based Optimal Power Management for Plug-In Hybrid Electric Vehicles, OTT ID #1127, dated Mar. 9, 2012, UWM Research Foundation, 20 pages.
Sherosky, F., Stop-start technology especially challenging for micro-hybrid engineers, Torque News, Jan. 1, 2011, 3 pages.
English translation of Japanese Office Action regarding Application No. 2010-516050, dated Oct. 9, 2012, 4 pages.
International Search Report and Written Opinion regarding PCT/US2012/029835, mail date Dec. 26, 2012, 7 pages.
Notice of Allowance for U.S. Appl. No. 12/710,247, mail date Nov. 26, 2012, 8 pages.
English Translation of Chinese Office Action and Search Report for Application No. 2008801170943, dated Apr. 11, 2013, 14 pages.
Office Action for U.S. Appl. No. 12/130,888, mail date Jun. 26, 2013, 15 pages.

(56) References Cited

OTHER PUBLICATIONS

Third Office Action for Chinese Application No. 200880105323.X, mail date Jul. 26, 2013, 4 pages.

International Search Report and Written Report for Application No. PCT/US2013/036431, mail date Jul. 23, 2013, 12 pages.

Office Action on U.S. Appl. No. 12/130,888 Dated Feb. 19, 2014, 16 pages.

Office Action on U.S. Appl. No. 13/397,561 Dated Mar. 19, 2014, 9 pages.

Office Action on U.S. Appl. No. 13/812,723 Dated Feb. 26, 2014, 8 pages.

Notice of Allowance on U.S. Appl. No. 12/217,407 Dated Mar. 27, 2014, 10 pages.

English Translation of Office Action for Chinese Application No. 2008801170943, mail date Nov. 26, 2013, 2 pages.

2012 *Honda Civic Hybrid* v. 2011 *Toyota Prius Five Comparison Test*, www.edmunds.com/toyota/prius/2011/comparison-test.html, retrieved on Apr. 19, 2013, 9 pages.

Burke, A Deep Impression, Technology of Clean Air, Diesel Progress North American Edition, Jul. 2013, 3 pages.

Electric Hybrid, www.eaton.com/Eaton, ProductsServices/Truck/HybridPower/SystemsOveriview/El . . . , retrieved on Oct. 25, 2013, 1 page.

Integrated Motor Assist (IMA), http://wikicars.org/es/Integrated_Motor_Assist_(IMA), retrieved on Apr. 19, 2013, 7 pages.

Integrated Motor Assist, http://en.wikipedia.org/wiki/Integrated_Motor_Assist, retrieved on Oct. 7, 2013, 3 pages.

Office Action for U.S. Appl. No. 12/217,407, mail date Oct. 22, 2013, 10 pages.

Office Action for U.S. Appl. No. 13/812,723, mail date Sep. 4, 2013, 11 pages.

International Preliminary Report on Patentability for PCT Application No. PCT/US2012/029835, dated Jun. 3, 2014, 5 pages.

Office Action on U.S. Appl. No. 14/081,892 Dated Jun. 4, 2014, 11 pages.

Fourth Office Action with English Translation in Chinese Patent Application No. 200880117094, dated Jun. 4, 2014, 7 pages.

\* cited by examiner

HYBRID VEHICLE DRIVE SYSTEM AND METHOD AND IDLE REDUCTION SYSTEM AND METHOD

CROSS-REFERENCE TO RELATED PATENT APPLICATIONS

This application is a divisional of U.S. patent application Ser. No. 12/710,247, filed Feb. 22, 2010, which:
- is a continuation-in-part of U.S. patent application Ser.No. 12/130,888, filed May 30, 2008, which claims the benefit of priority under 35 U.S.C. §119(e) to U.S. Provisional Application No. 60/979,755, filed Oct. 12, 2007, and U.S. Provisional Application No. 61/014,406, filed Dec. 17, 2007;
- is a continuation-in-part of U.S. Patent Application Ser. No. 12/217,407, filed Jul. 3, 2008, which claims the benefit of priority under 35 U.S.C. §119(e) to U.S. Provisional Application No. 60/959,181, filed Jul. 12, 2007, and U.S. Provisional Application No. 61/126,118, filed May 1, 2008;
- is a continuation-in-part of PCT/US2009/066151, filed Nov. 30, 2009, which claims the benefit of priority to U.S. Provisional Application No. 61/177,240, filed May 11, 2009, and U.S. Provisional Application No. 61/118,980, filed Dec. 1, 2008, and U.S. Provisional Application No. 61/235,998, filed Aug. 21, 2009, and U.S. Provisional Application No. 61/251,285, filed Oct. 13, 2009;
- is a continuation-in-part of PCT/US2008/008442, filed Jul. 10, 2008;
- is a continuation-in-part of PCT/US2008/079376, filed Oct. 9, 2008, which is a continuation of U.S. application Ser. No. 12/130,888, filed on May 30, 2008, which claims the benefit of priority to U.S. Provisional Application No. 60/979,755, filed on Oct. 12, 2007, and U.S. Provisional Application No. 61/014,406, filed on Dec. 17, 2007;

each of the above references is incorporated herein by reference in its entirety.

BACKGROUND OF THE INVENTION

The present disclosure relates to vehicle drive systems. More particularly, the present disclosure relates to hybrid vehicle drive systems employing electric and hydraulic components.

Hybrid vehicle drive systems commonly employ at least two prime movers arranged in different configurations relative to a transmission. One known configuration is found in so-called "series-parallel" hybrids. "Series-parallel" hybrids are arranged such that multiple prime movers can power the drive shaft alone or in conjunction with one another.

In one known hybrid vehicle drive system, a first and second prime mover (e.g., an internal combustion engine and an electric motor/generator) are arranged in a parallel configuration and used to provide power to a drive shaft and a power take-off (PTO) shaft through a transmission. PTO shafts are generally used to drive auxiliary systems, accessories, or other machinery (e.g., pumps, mixers, barrels, winches, blowers, etc.). One limitation of this system is that the second prime mover is typically positioned between the first prime mover and the transmission, creating the need to reposition existing drive train components.

In another known hybrid vehicle drive system, a first prime mover (e.g., an internal combustion engine) drives a PTO through a transmission. A second prime mover (e.g., electric motor/generator) has been coupled directly to the PTO. One limitation of this system is that while it allows the electric motor to provide power to a drive shaft through the PTO, it does not provide power to a hydraulic pump for operation of vehicle mounted hydraulic components and equipment. The system also does not use a hydraulic motor/pump as the second prime mover. The system also does not allow a hydraulic motor/pump to be driven by either the internal combustion engine or by the electric motor/generator, nor does it allow the hydraulic motor/pump and electric motor/generator to be simultaneously driven by the engine. The system also does not use the hydraulic motor/pump and electric motor/generator to simultaneously provide power to a drive shaft.

Hybrid systems used in larger trucks, greater than class 4, have typically utilized two basic design configurations—a series design or a parallel design. Series design configurations typically use an internal combustion engine (heat engine) or fuel cell with a generator to produce electricity for both the battery pack and the electric motor. There is typically no direct mechanical power connection between the internal combustion engine or fuel cell (hybrid power unit) and the wheels in an electric series design. Series design hybrids often have the benefit of having a no-idle system, including an engine-driven generator that enables optimum performance, lacking a transmission (on some models), and accommodating a variety of options for mounting the engine and other components. However, series design hybrids also generally include a larger, heavier battery; have a greater demand on the engine to maintain the battery charge; and include inefficiencies due to the multiple energy conversions. Parallel design configurations have a direct mechanical connection between the internal combustion engine or fuel cell (hybrid power unit) and the wheels in addition to an electric or hydraulic motor to drive the wheels. Parallel design hybrids have the benefit of being capable of increased power due to simultaneous use of the engine and electric motor, having a smaller engine with improved fuel economy while avoiding compromised acceleration power, and increasing efficiency by having minimal reduction or conversion or power when the internal combustion engine is directly coupled to the driveshaft. However, parallel design hybrids typically lack a no-idle system and may have non-optimal engine operation (e.g., low rpm or high transient loads) under certain circumstances. Existing systems on trucks of class 4 or higher have traditionally not had a system that combines the benefits of a series system and a parallel system.

Therefore, a need exists for a hybrid vehicle drive system and method of operating a hybrid vehicle drive system that allows a drive shaft to receive power from at least three components. There is also a need for a hybrid vehicle drive system that allows for the prevention of friction and wear by disengaging unused components. There is a further need for a hybrid vehicle drive system that uses regenerative braking to store energy in at least two rechargeable energy sources. Still further, there is a need for a PTO-based hybrid system. Further still, there is a need for a hybrid system optimized for use with a hydraulic system of the vehicle.

The need for engine idle reduction systems and methods also exists. Sophisticated power train control systems and power management systems required for the operation of a hybrid vehicle drive system can add cost and complexity. Therefore there is a need for an idle reduction system that allows equipment to be powered by one pump. There is also a need for a system that allows for quick recharging from three sources (vehicle engine, external power grid, APU). There is also a need for a system that can provide power to the equipment from two sources simultaneously (vehicle engine and electric motor) during periods when equipment power requirements exceed the output of only an electric motor driven pump.

There is a further need for a series/parallel design in which the system can operate using either series or parallel configurations depending upon which is most advantageous given operating requirements.

SUMMARY

One embodiment relates to a hybrid vehicle drive system for a vehicle including a first prime mover, a first prime mover driven transmission, a rechargeable power source, and a PTO. The hybrid vehicle drive system further includes a hydraulic motor in direct or indirect mechanical communication with the PTO and an electric motor in direct or indirect mechanical communication with the hydraulic motor. The electric motor can provide power to the prime mover driven transmission and receive power from the prime mover driven transmission through the PTO. The hydraulic motor can receive power from the electric motor which is powered by the rechargeable power source.

Another embodiment relates to a hybrid vehicle drive system for a vehicle including a first prime mover, a first prime mover driven transmission, a rechargeable power source, and a PTO. The hybrid vehicle drive system further includes a hydraulic motor in direct or indirect mechanical communication with the PTO and an electric motor in direct or indirect mechanical communication with the hydraulic motor. The electric motor can provide power to the prime mover driven transmission and receive power from the prime mover driven transmission through the PTO. The hydraulic motor can provide power to the prime mover driven transmission and receive power from the prime mover driven transmission through the PTO.

Another embodiment relates to a hybrid vehicle drive system for use with a first prime mover and a first transmission driven by the first prime mover. The system includes a second prime mover coupled to a rechargeable energy source, a component, and an accessory configured to be coupled to the second prime mover. The first prime mover is configured to provide power through the transmission and the component to operate the second prime mover, and the second prime mover is configured to provide power to the drive shaft through the component. The accessory is configured to operate through the operation of the second prime mover.

Yet another embodiment relates to a hydraulic system used in a hybrid vehicle of any type. The vehicle includes a first prime mover, a first prime mover driven transmission, a second prime mover, a component, and a first rechargeable energy source. The first prime mover can provide power to the second prime mover through the transmission and the component. The second prime mover can provide power to the vehicle's drive shaft through the component. The first rechargeable energy source can power the second prime mover or be recharged by the second prime mover. The hydraulic system includes an accessory. The accessory can be coupled to the second prime mover in such a way that the accessory is operated through operation of the second prime mover. The accessory can also operate the second prime mover.

Yet another embodiment relates to a method of operating a hybrid vehicle drive system. The drive system includes a first prime mover, a first prime mover driven transmission, a second prime mover, a first rechargeable energy source, a component, and an accessory. The second prime mover can effect the motion of a drive shaft alone or in combination with the first prime mover. The first rechargeable energy source can power or be recharged by the second prime mover. The component transfers energy between the transmission and the second prime mover in both directions. Operation of the second prime mover powers the accessory, and the accessory can also operate to power the second prime mover.

A first and second electric motor are coupled to the power source. One is with the prime mover and one is in with PTO, whereby the first motor can either provide propulsion or generate power and the second motor can either provide power to the PTO driven transmission or receive power for regeneration braking An optional hydraulic motor can be coupled after the second electric motor which can act as a generator, the first motor can act as a motor.

Yet another embodiment relates to a hybrid vehicle drive system for a vehicle including a first prime mover, a first prime mover driven transmission, a rechargeable power source, and a PTO. The hybrid vehicle drive system further includes a first electric motor coupled to the power source, a hydraulic motor in direct or indirect mechanical communication with the first electric motor, and a second electric motor in direct or indirect mechanical communication with the PTO. The second electric motor can receive power from the prime mover driven transmission through the PTO and charge the power source. The hydraulic motor can receive power the first electric motor. The second electric motor has a higher horsepower rating than the first electric motor.

Another exemplary embodiment relates to a hybrid vehicle drive system for a vehicle including a first prime mover, a first prime mover driven transmission, a rechargeable power source, and a PTO. The hybrid vehicle drive system further includes a first electric motor and a second electric motor coupled to the power source. The second electric motor is in direct or indirect mechanical communication with the PTO. The first electric motor is in direct or indirect communication with the first prime mover. The first electric motor can either provide propulsion or generate power and the second electric motor can either provide power to the PTO for the transmission or receive power via regenerated braking An optional hydraulic motor can be coupled to the second electric motor. According to one alternative embodiment, one of the first and second electric motors can operate as a generator while the other of the first and second electric motors operates as a motor.

Brief Description Of The Drawings

Embodiments will be described with reference to the accompanying drawings, in which.

Detailed Description

Figure 1:
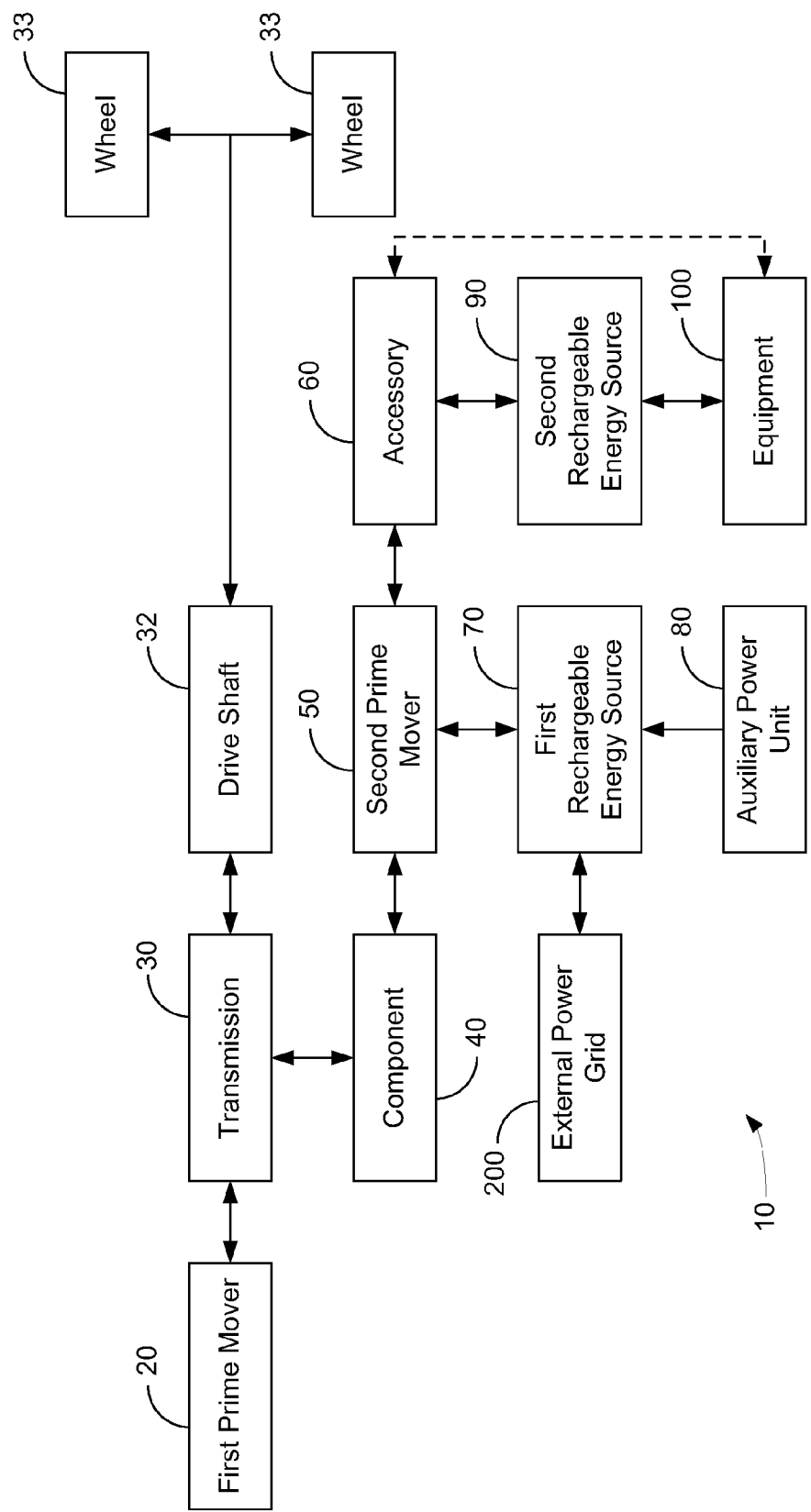
FIG. 1 is a general block diagram of a hybrid vehicle drive system illustrating paths of possible power sources for the drive shaft according to an exemplary embodiment.

Hybrid vehicle drive systems according to several possible embodiments are presented. One feature of one exemplary embodiment of the hybrid vehicle drive system is that a drive shaft can be powered singly or in any combination by a first prime mover, a second prime mover, and an accessory. Preferred embodiments incorporate hydraulic systems into the hybrid vehicle drive system for optimal energy storage and usage. It is noted that the term motor as used herein refers to a motor/generator or motor/pump and is not limited to a device that performs only motor operations.

Another feature of one exemplary embodiment of the system is that when a power take-off (PTO) configured to be engaged or disengaged while a transmission is moving is used, any unneeded drive system components other than a first prime mover can be entirely disconnected from the drive train, reducing inefficiencies and wear in situations where the different portions of the system do not need to interact, such as when a drive shaft is solely driven by the first prime mover, or when a vehicle using the system is stationary and a second prime mover and accessory are not being driven by the first prime mover. Similarly, an optional clutch between the first prime mover and the transmission can be used to reduce inefficiencies during regenerative braking by removing the first prime mover from the system when vehicle braking occurs.

Yet another feature of one exemplary embodiment of the system is that the accessory (e.g., hydraulic pump, pneumatic pump, electric motor, etc.) can be powered singly or in any combination by the first prime mover, the second prime mover, energy from braking, or energy stored in a second rechargeable energy source (e.g., battery, ultra capacitor, hydraulic accumulator, etc.). The presence of a second rechargeable energy source also can obviate the need for a complicated pump control system when the accessory is a hydraulic pump. If the pump is a variable volume displacement pump, further simplification is possible because a clutch may not be needed between the second prime mover and the pump. Other types of pumps can also be used. According to one exemplary embodiment, with a clutch between the second prime mover and the hydraulic pump, the pump can be an inexpensive gear pump.

Yet another feature of one exemplary embodiment of the system is that a first rechargeable energy source connected to the second prime mover can be recharged in one or more modes. These modes include: the second prime mover using power from the first prime mover; the second prime mover using power from regenerative braking; the accessory, using energy stored in the second rechargeable energy source to operate the second prime mover; an auxiliary power unit connected to the first rechargeable energy source; an engine alternator, when present (the alternator can be increased in capacity to allow for this additional charge while driving or idle); or from an external power source, such as being directly plugged into an external power grid. The second prime mover can draw upon this power stored in the first rechargeable power source before daily operation of the vehicle (e.g., after overnight charging), when the vehicle is stopped, or in other situations. In such situations, the second prime mover would operate the accessory to pre-charge or pressurize the second rechargeable energy source before the energy is needed, which would provide higher density power storage when the second rechargeable power source is a hydraulic accumulator, among other advantages. A higher density energy storage device is intended to provide more available power at low revolutions per minute (RPM) operation and an overall lower mass system.

Various additional aspects and advantages will become apparent to those skilled in the art from the following detailed description of the embodiments.

Referring to FIGS. 1-20, hybrid vehicle drive systems according to several exemplary embodiments are shown. Various features of these embodiments can be employed in other embodiments described herein.

As shown in FIG. 1, an exemplary embodiment of a hybrid vehicle drive system 10 can be employed on any type of vehicle. According to one embodiment, the vehicle can be any type of light, medium, or heavy duty truck. In one preferred embodiment, the vehicle is a truck that employs hydraulic systems such as a boom truck. Alternatively, the vehicle can be any type of platform where hybrid systems are employed. The vehicle may have a wide variety of axle configurations including, but not limited to a 4×2, 4×4, or 6×6 configuration.

In one preferred embodiment, the vehicle is truck such as an International 4300 SBA 4×2 truck. According to one exemplary embodiment, the vehicle includes an IHC MaxxforceDT engine with an output of 255 HP and 660 lbs. of torque. The vehicle further includes an Allison 3500_RDS_P automatic transmission. The vehicle has a front gross axle weight rating (GAWR) of 14,000/12,460 lbs, a rear GAWR of 19,000/12,920 lbs., and a total GAWR of 33,000/25,480. The vehicle includes a hydraulic boom. The vehicle boom has a working height of approximately 54.3 feet, a horizontal reach of 36.0 feet, an upper boom has an extension of approximately 145 inches. The lower boom may travel between approximately 0 degrees and 87 degrees from horizontal. The upper boom may have a travel between approximately −20 degrees and 76 degrees from horizontal. According to an exemplary embodiment, the vehicle may further include a hydraulic platform rotator, a hydraulic articulating jib and winch (e.g., with a capacity of 1000 lbs.), a hydraulic jib extension, hydraulic tool outlets, an on-board power charger providing 5 kW at 240 VAC, and electric air conditioning with a capacity of 5,000 BTU. The above referenced power, boom, and types of components are exemplary only.

Figure 3:
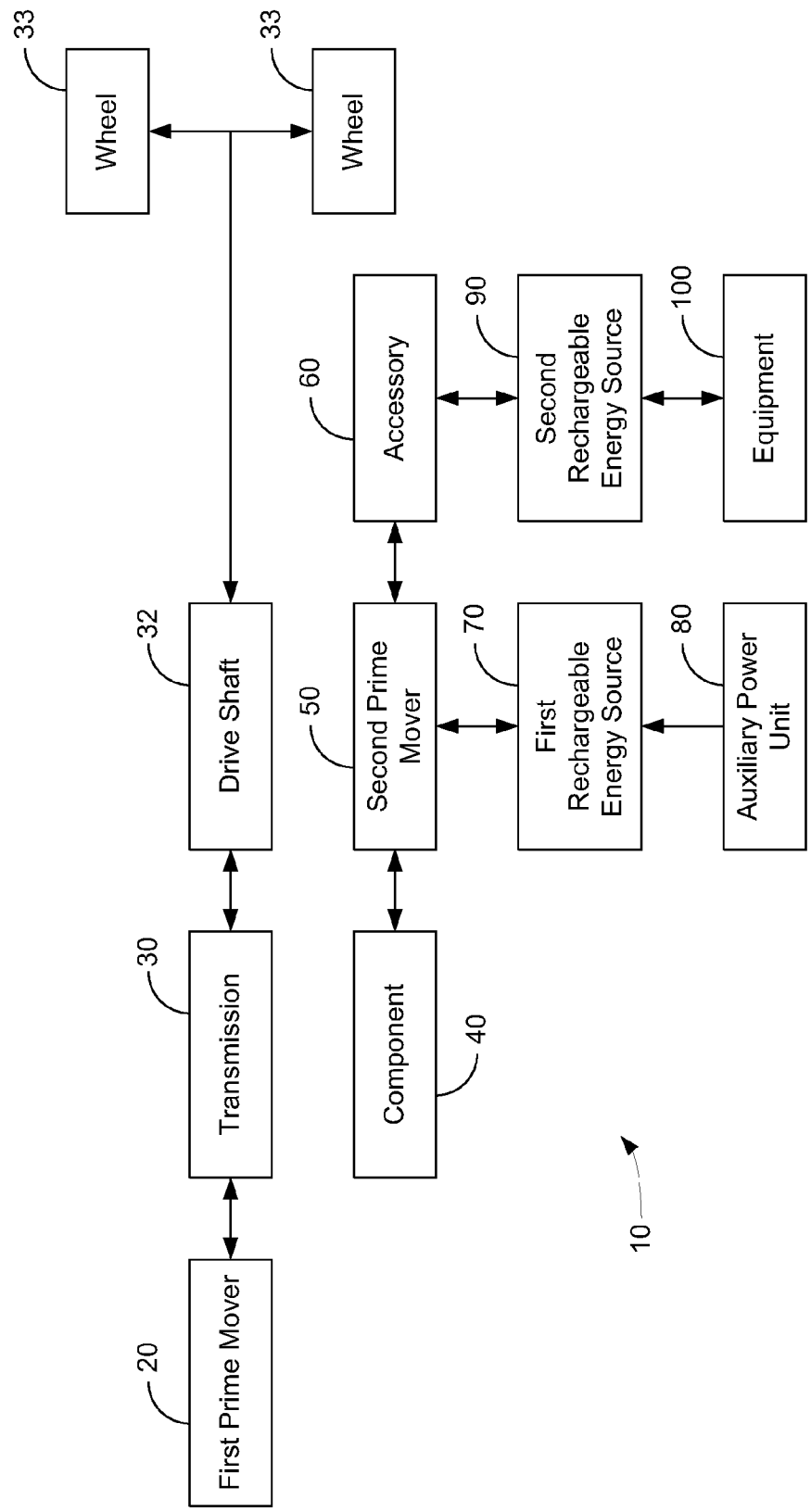
FIG. 3 is a general block diagram illustrating the operation of a hybrid vehicle drive system with the addition of a second rechargeable energy source according to an exemplary embodiment.
Figure 4:
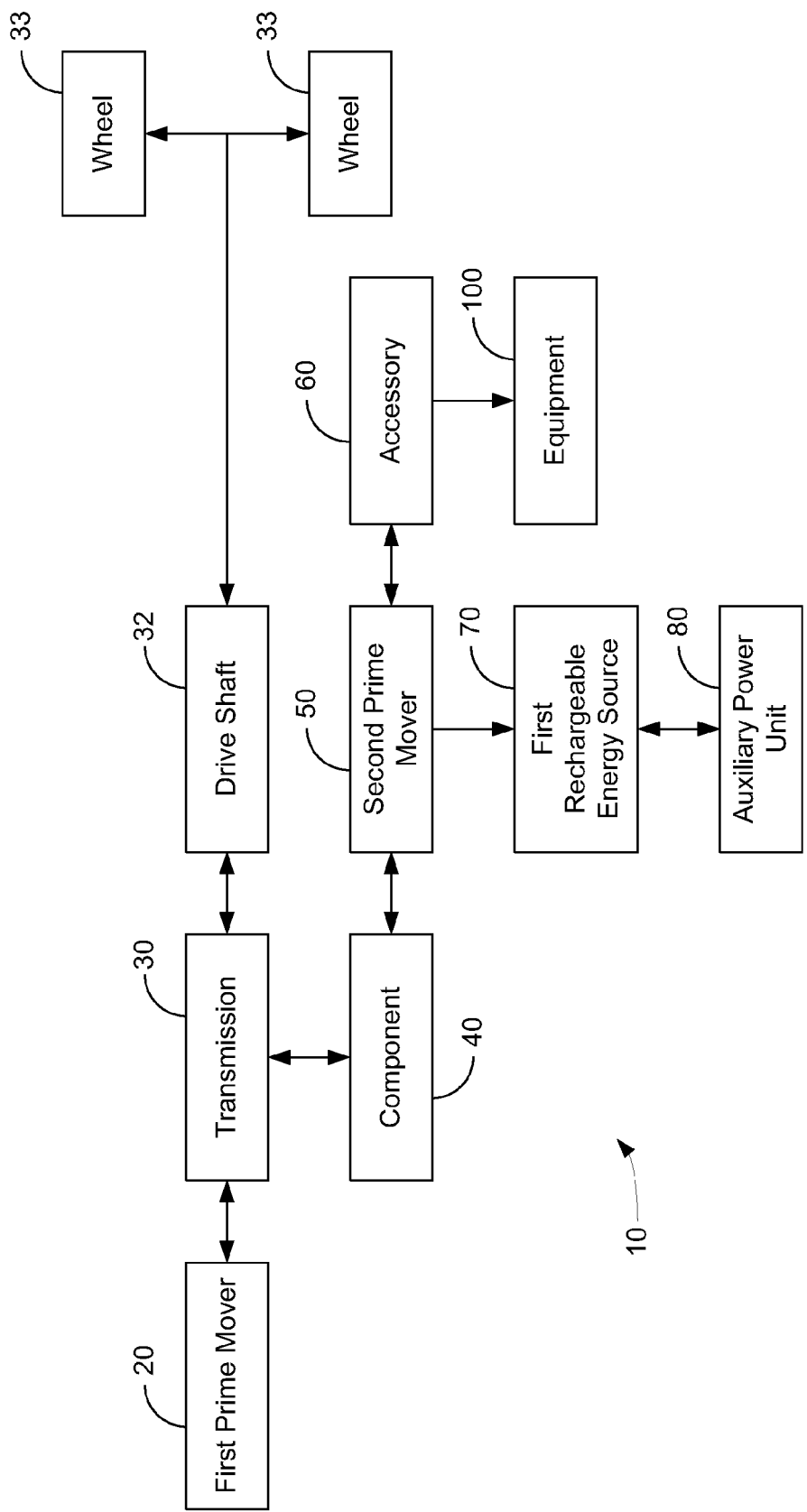
FIG. 4 is a general block diagram illustrating the operation of a hybrid vehicle drive system using a first prime mover providing power to simultaneously charge a first rechargeable energy source and operate equipment according to an exemplary embodiment.

System 10 includes a first prime mover 20 (e.g., an internal combustion engine, such as a diesel fueled engine, etc.), a first prime mover driven transmission 30, a component 40 (e.g., a power take-off (PTO), a transfer case, etc.), a second prime mover 50 (e.g., a motor, such as an electric motor/generator, a hydraulic pump with a thru-shaft, etc.), and an accessory 60 (e.g., a hydraulic pump, such as a variable volume displacement pump, etc.). In certain embodiments, accessory 60 can act as a third prime mover as described below. Transmission 30 is mechanically coupled to component 40. Component 40 is coupled to second prime mover 50. Second prime mover 50 is coupled to accessory 60. According to one exemplary embodiment, second prime mover 50 is a 50 kW electric motor. When acting as a generator (as shown in FIGS. 3 and 4), second prime mover 50 may generate 30 kW continuously or as much as 75 kW at peak times. The above referenced power parameters are exemplary only. Second prime mover 50 may be further used to power various on-board components such as compressors, water pumps, cement mixer drums, etc.

In a preferred embodiment, accessory 60 is embodied as a hydraulic motor and includes a through shaft coupled to component 40 embodied as a PTO. The through shaft is also coupled to the shaft of the mover 50 embodied as an electric motor. In another embodiment, electric motor includes the through shaft that is coupled to the PTO and the pump.

According to one embodiment, system 10 also includes a first rechargeable energy source 70 (e.g., a battery, a bank of batteries, a fuel cell, a capacitive cell, or other energy storage device), an Auxiliary Power Unit (APU) 80 (e.g., an internal combustion engine, possibly fueled by an alternative low emission fuel (e.g., bio-mass, natural gas, hydrogen, or some other fuel with low emissions and low carbon output), and a generator, a fuel cell, etc.), a second rechargeable energy source 90 (e.g. a hydraulic accumulator, ultra capacitor, etc.), and onboard or external equipment 100 (e.g., hydraulically operated equipment, such as an aerial bucket, etc.). First rechargeable energy source 70 is coupled to second prime mover 50 and provides power for the operation of second prime mover 50. First rechargeable (e.g., pressurized or rechargeable) energy source 70 may include other auxiliary components (e.g., an inverter provided for an AC motor, a DC-to-DC converter to charge a DC system, an inverter for power exportation to a power grid or other equipment, controllers for motors, a charger, etc). APU 80 is coupled to first rechargeable energy source 70 and provides power to first rechargeable energy source 70. According to one exemplary embodiment, second renewable energy source 90 is a hydraulic system with a high pressure portion (e.g., an accumulator) and a low pressure component (e.g., a reservoir tank).

Second rechargeable energy source 90 is coupled to accessory 60 and provides stored power for accessory 60. Onboard or external equipment 100 can be coupled to accessory 60 or second rechargeable energy source 90 and operate using power from either accessory 60 or second rechargeable energy source 90. In one embodiment, onboard or external equipment 100 is coupled through second rechargeable energy source 90 to accessory 60. According to various exemplary embodiments, APU 80 may also provide power to both second renewable energy source 90 and first rechargeable energy source 70 when high hydraulic loads are required. APU 80 and second renewable energy source 90 may both provide power to hydraulically operated equipment 100.

In one preferred embodiment, component 40 is a PTO designed to engage or disengage while the transmission is moving via a clutch mechanism. The PTO can be a street side or curb side PTO. Component 40 can be disengaged from transmission 30 when first prime mover 20 exceeds the maximum operating RPM of any component connected through component 40. For example, component 40 can be disengaged if first prime mover 20 exceeds the maximum operating RPM of accessory 60. Alternatively, all components connected through component 40 can operate throughout the RPM range of first prime mover 20, and component 40 can be engaged continuously. In a preferred embodiment, component 40 can be disengaged during high speed steady driving conditions to reduce friction and wear on system 10.

Alternatively, transmission 30 may be modified to incorporate component 40 and optionally incorporate second prime mover 50 directly into transmission 30. Component 40, embodied as a PTO, may optionally include a PTO shaft extension. An example of a PTO shaft extension is described in U.S. Pat. Nos. 6,263,749 and 6,499,548 both of which are incorporated herein by reference. Component 40 can have a direct connection to transmission 30.

Component 40 may interface with transmission 30 in a way that there is a direct coupling between mover 20, component 40, and transmission 30. Alternatively, component 40 may interface with transmission 30 in a way that the interface directly couples component 40 to the torque converter of transmission 30. The torque converter may be in mechanical communication with mover 20, but rotating at a different speed or may rotate at the same speed as mover 20 if it is locked up.

A clutch mechanism can be employed to properly engage and disengage component 40. In another preferred embodiment, component 40 is a PTO that has an internal clutch pack, such as a hot shift PTO. A hot shift PTO can be used when frequent engagements of the PTO are required, often with automatic transmissions. In one embodiment, second prime mover 50 can be operated at the same RPM as first prime mover 20 prior to the engagement of component 40. This is intended to reduce wear on the clutch mechanism if component 40 has a 1:1 ratio of input speed to output speed. If other ratios for component 40 are used, the RPM of first prime mover 20 or second prime mover 50 can be adjusted accordingly prior to engagement to insure that input and output speed match the ratio of the component to reduce wear on the clutch mechanism.

While component 40 is engaged, second prime mover 50 can operate to provide power to a drive shaft 32 via transmission 30.

In FIG. 1, first prime mover 20 provides power to drive shaft 32 through transmission 30. Second prime mover 50 provides additional or alternative power to drive shaft 32 through component 40 and transmission 30. Drive shaft 32 provides power to two or more wheels 33 used to provide forward and backward momentum to the vehicle. For example, second prime mover 50 can optionally provide the sole source of power to drive shaft 32. Alternatively, second prime mover 50 can provide additional power to drive shaft 32 during vehicle acceleration. When providing power to drive shaft 32, second prime mover 50 can operate using power from first rechargeable energy source 70. According to the various exemplary embodiments of system 10, first rechargeable energy source 70 can be charged or powered by second prime mover 50, APU 80 or another suitable source (e.g., the vehicle alternator, the power grid, etc.).

Optional APU 80 can be used to power first rechargeable energy source 70 when the vehicle is driving up a grade, as well as other situations. This use is intended to improve vehicle performance, particularly when the power requirements of the vehicle exceed the power available from first prime mover 20, first rechargeable energy source 70, and second rechargeable energy source 90. The presence of APU 80 is intended to allow for a smaller first prime mover 20. In one embodiment, APU 80 is of a type that produces lower emissions than first prime mover 20. APU 80 is intended to enable a vehicle using system 10 to meet various anti-idle and emission regulations.

In one embodiment, system 10 is configured to automatically engage APU 80 or first prime mover 20 through component 40 or accessory 60 to charge first rechargeable energy source 70 when the stored energy decreases to a certain amount. The permissible reduction in stored energy can be determined based upon a user selectable switch. The switch specifies the method of recharging first rechargeable energy source 70 from an external power grid.

In one embodiment, a user can select between 220-240V recharging, 110-120V recharging, and no external power source available for recharging. For the different voltages, the amount of power that can be replenished over a certain period of time (e.g., when connected to an external power grid overnight) would be calculated. Beyond that amount of power usage, first prime mover 20, or APU 80 is engaged to charge or provide power to first rechargeable energy source 70. If no external power source is available, first prime mover 20 or APU 80 can be automatically engaged during regular finite periods, calculated to minimize idle time. In one embodiment, APU 80 and/or optionally first rechargeable energy source 70 can provide power to an external power grid 200, also known as vehicle to grid (V2G) power sharing. This is intended to provide low-emission power generation and/or reduce requirements to generate additional grid power during peak loads on the grid.

In another embodiment, a user may only select between two settings, one setting to select charging using a grid and the other setting to select charging without using an external power grid. The controller would monitor state of charge of the batteries and control recharging differently for each setting. If no external charging from a power grid is selected, system 10 may allow the state of charge of first rechargeable energy source 70 (batteries) to drop to a threshold (as an example 30%), then the controller would cause either first prime mover 20 or the optional APU 80 to be engaged to charge batteries to a predetermined level (as an example 80%) to minimize the frequency that first prime mover 20 or APU 80 must be started. Or different levels of discharge and recharging may be selected to minimized idle time. System 10 may occasionally recharge batteries to 100% of charge to help condition the batteries. If the user selectable switch indicated system 10 would be charged from an external power grid, the controller may allow the state of charge of first renewable energy source to drop to a threshold (as an example 30%), then the controller would cause either first prime mover 20 or optional APU 80 to be engaged to charge batteries to a predetermined level that is lower (as an example 50%). The lower level allows the external power grid to recharge a greater amount of first rechargeable energy source 70 when vehicle can be plugged in or charged by the external power grid, reducing the fuel consumption of prime mover 70 or optional APU 80.

External power grid 200 allows first rechargeable energy source 70 to be recharged with a cleaner, lower cost power compared to recharging first rechargeable energy source 70 with first prime mover 20. Power from an external power grid may be provided at a fraction of the cost of power provided from an internal combustion engine using diesel fuel. According to one exemplary embodiment, first rechargeable energy source 70 can be recharged from an external power grid 200 in approximately 8 hours or less.

In one embodiment, second rechargeable energy source 90 is utilized, and provides power to accessory 60. Additional or alternative power can be provided to drive shaft 32 by accessory 60. For example, accessory 60 can provide power to drive shaft 32 until second rechargeable energy source 90 is discharged. Alternatively, accessory 60 can provide additional power to drive shaft 32 during vehicle acceleration. Accessory 60 provides power to drive shaft 32 through second prime mover 50, component 40, and transmission 30. The combination of power provided to drive shaft 32 by second prime mover 50 and accessory 60 is intended to allow for the use of a smaller first prime mover 20 which provides the best use of stored energy and reduces the overall system mass. In another embodiment, accessory 60 only receives power from second prime mover 50 or from first prime mover 20 through component and does not provide power to drive shaft 32. Accessory 60 may power equipment directly.

In one exemplary embodiment, an optional clutch can be coupled between first prime mover 50 and accessory 60 or between component 40 and second prime mover 50. The clutch is disengaged when the vehicle is stationary so second prime mover 50 can turn accessory 60 without unnecessarily driving component 40.

A variety of control systems can be utilized to control the various components (clutches, motors, transmissions, etc.) in system 10. Electronic control systems, mechanical control systems, and hydraulic control systems can be utilized. In addition, a controller can be provided to indicate a request to operate an accessory or other equipment. In one embodiment, a controller similar to the controller in U.S. Pat. No. 7,104,920 incorporated herein by reference can be utilized. Preferably, the controller is modified to communicate by pneumatics (e.g., air), a wireless channel, or fiber optics (e.g., light) for boom applications and other applications where conductivity of the appliance is an issue.

The control system can utilize various input criteria to determine and direct the amount of power required or to be stored, the input criteria can input operator brake and acceleration pedals, accessory requirements, storage capacity, torque requirements, hydraulic pressure, vehicle speed, etc.

A control system may control the torque and power output of second prime mover 50 and accessory 60 so that component 40, second prime mover 50 and accessory 60 are operated within the allowable torque and power limitations of each item so that the sum of second prime mover 50 and accessory 60 do not exceed component 40 or exceed capacity of transmission 30, such as capacity of transmission power takeoff drive gear rating or exceed capacity of transmission maximum turbine torque on an automatic transmission. Optionally the controller may monitor and control additional input torque from the prime mover, or input torque of the prime mover after multiplication by the torque converter, along with that from other prime movers or accessories to ensure that the turbine torque limit is not exceeded or other internal torque ratings of components within an automatic transmission or an autoshift manual transmission, or a manual transmission. The torque and power output of second prime mover 50 and accessory 60 may also be controlled using an input from the driver and/or from a power train control system. If two components are used as described in other embodiments, the torque and power output of the second and third prime mover and optional accessory or accessories may be controlled so that the transmission power takeoff drive gear rating with two power takeoffs is not exceeded or that the capacity of transmission maximum turbine torque on an automatic transmission, or other torque rating of an internal component within a transmission of different kind, such as an autoshift manual or manual transmission is not exceeded.

According to other exemplary embodiments, a control system may be used for other purposes (e.g., coupling component 40 to transmission 30; monitoring the charge status of first rechargeable energy source 70 and second rechargeable energy source 90; monitoring and managing the thermal status of various components (e.g., prime movers, rechargeable energy sources, electronics, etc.); operating first prime mover 20, second prime mover 50, and accessory 60 to replenish energy in first rechargeable energy source 70 and second rechargeable energy source 90 and/or supply power to equipment 100; operate APU 80 as needed; or control other functions). Information on the status of the system, such as operating efficiency, status of rechargeable energy sources, and certain operator controls may be displayed or accessed by the driver.

Figure 2:
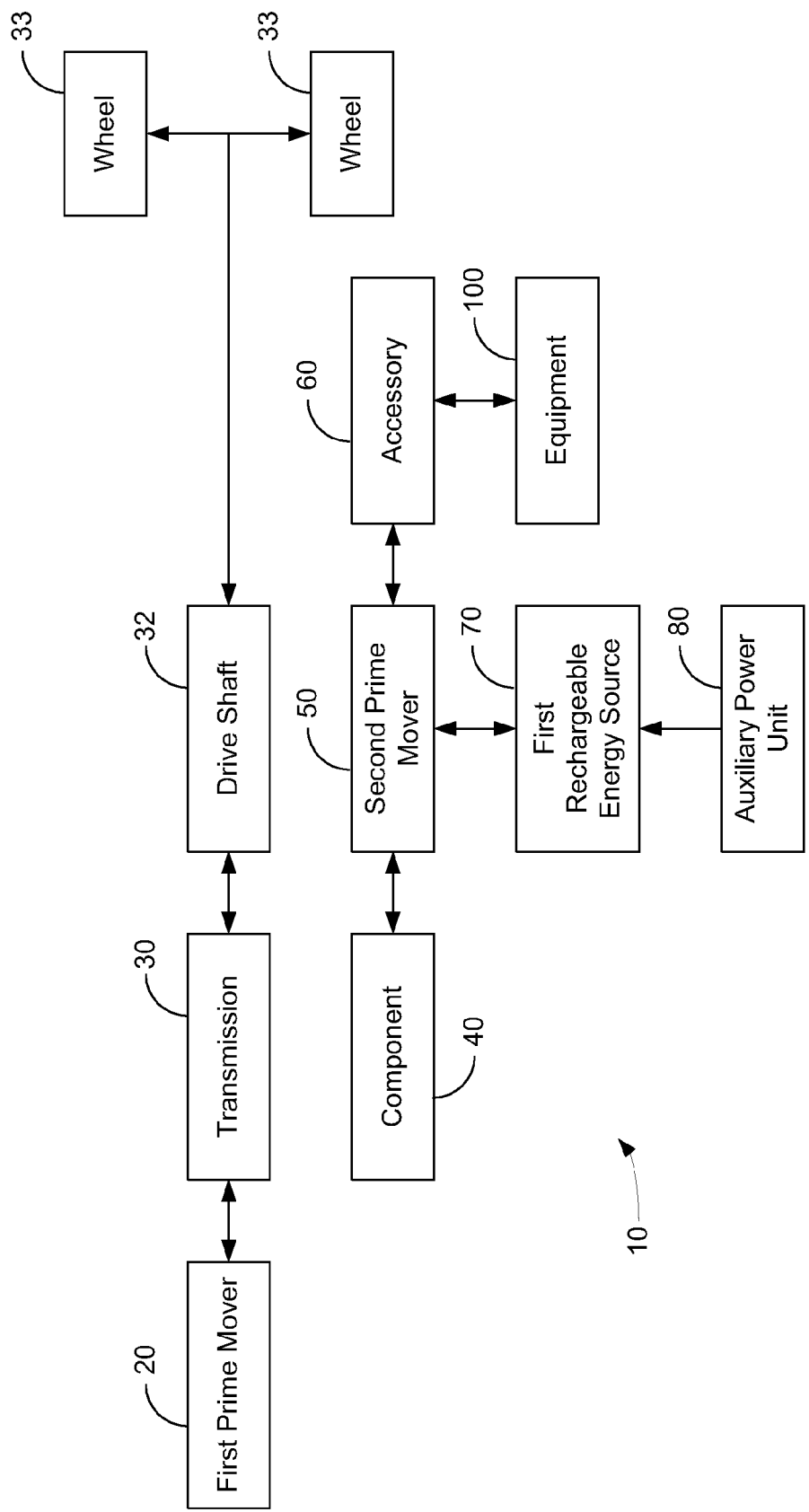
FIG. 2 is a general block diagram illustrating the operation of a hybrid vehicle drive system using an auxiliary power unit, second prime mover and accessory components to operate equipment according to an exemplary embodiment.

Referring to FIG. 2, an exemplary operation of system 10 is shown. Component 40 is disengaged from transmission 30. APU 80 charges or provides power to first rechargeable energy source 70 when necessary. APU 80 can include a generator powered by an internal combustion engine. The generator can be connected to first rechargeable energy source 70 through a power converter, AC/DC power inverter or other charging system. First rechargeable energy source 70 provides power to second prime mover 50. The operation of second prime mover 50 operates accessory 60. Accessory 60 provides power to on-board or external equipment 100. First rechargeable energy source 70 and/or APU 80 may provide all the power for system 10 when the vehicle is stationary and first prime mover 20 is turned off (e.g., in an idle reduction system). If second prime mover 50 is not coupled to drive shaft 32 and instead provides power to accessory 60 (e.g., in an idle reduction system), system 10 may include a simplified control and power management system.

According to another exemplary embodiment, component 40 may be mechanically coupled to and first prime mover 20 may be operated periodically to provide power to second prime mover 50 through transmission 30 and component 40. Second prime mover 50 recharges first rechargeable energy source 70 and/or powers accessory 60. Accessory 60 can recharge second rechargeable energy source 90 or operate other equipment.

According to another exemplary embodiment, system 10 is configured as an idle reduction system that can provide power to vehicle loads such as HVAC, computers, entertainment systems, and equipment without the need to idle the engine continuously. Accordingly, system 10 uses an electric motor (e.g., prime mover 50) to power a hydraulic pump (e.g., accessory 60) for the operation of hydraulic equipment (e.g., aerial buckets, hydraulically powered compressors, etc.). Alternatively, the electric motor may directly power a compressor. The electric motor can be configured to only operate when there is a demand for hydraulic flow or the need to operate other mechanically coupled equipment to conserve energy within first rechargeable energy source 70. The electric motor can be activated by a controller that receives a signal sent through fiber optics or a signal sent through other means.

In one embodiment, mover 20 is not engaged with component 40 when mover 50 is used to power a pump or other mechanically coupled equipment 100. While component 40 (PTO) is not engaged, the PTO may be modified to allow shaft 32 to spin with low resistance. A PTO can be chosen with a feature that normally limits movement of the PTO when not engaged, this feature can be disabled when the electric motor is used to power the hydraulic pump. This concept also applies to "operating mode" for hybrid system process below discusses with reference to FIGS. 3 and 4. This type of idle reduction can be used when the vehicle is stationary.

Batteries (e.g., rechargeable energy source 70) provide energy for the electric motor. After the batteries are depleted, an external power grid is used to recharge the batteries.

If the rechargeable energy reserve is large enough, the electric motor (mover 50) may operate continuously, eliminating the need for a controller to turn motor on and off based upon demand. Such a system may be coupled to a variable volume displacement pump to reduce flow when demand for hydraulic flow is low, resulting in lower consumption of power from the rechargeable energy source. This same method of continuous operation can also be used for hybrid system configurations.

Figure 9:
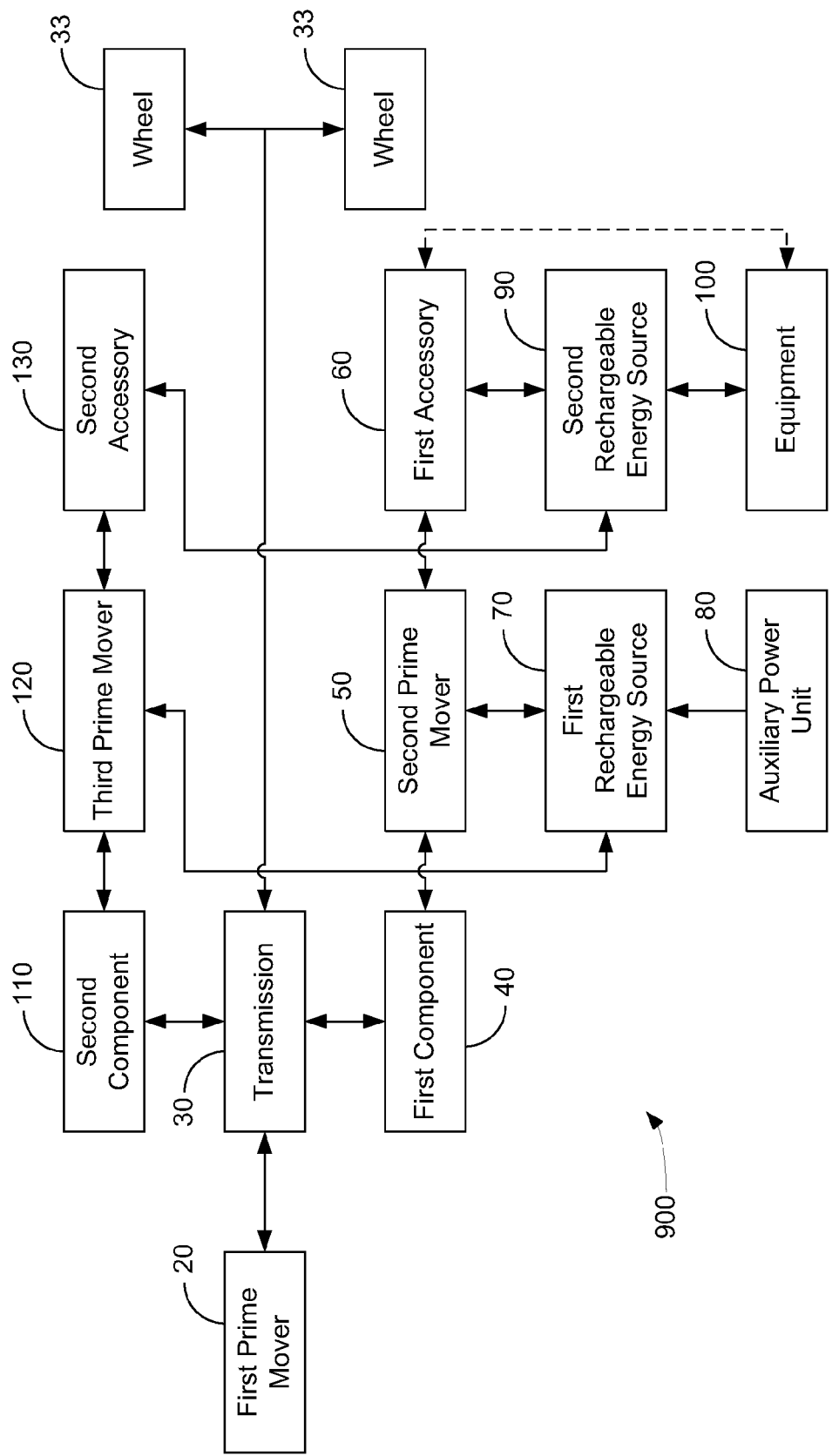
FIG. 9 is a general block diagram of a hybrid vehicle drive system illustrating the use of a second power take-off, a third prime mover, and a second accessory component.

Depending upon the battery system, the batteries may be thermally corrected during charging. Thermal correction may be needed if the temperature of the battery exceeds a certain threshold. A cooling system, either external to the vehicle or internal to vehicle may be used, such that coolant is circulated to reduce heat or the battery case can be ventilated with cooler air to dissipate heat, possibly with a powered ventilation system. A second pump may also be connected to a PTO (as shown in FIG. 9). First prime mover 20 may be started and used to recharge by engaging component 40 to transmission and operating second prime mover 50 as a generator to recharge first rechargeable energy source batteries. If there is insufficient energy to operate the electric motor driven hydraulic pump, the vehicle engine is started, PTO engaged and the second pump is used to power the equipment. Further, the second pump can be used when the hydraulic power requirements exceed the power output of the electric motor coupled to the hydraulic pump. Alternatively, prime mover 50 could directly power the first accessory (hydraulic pump) and the second prime mover could be made not to operate as a generator. Not operating second prime mover as a generator may reduce system complexity and reduce cost.

In another embodiment, first rechargeable energy source 70 provides power to electrical systems of the vehicle such as "hotel loads" (e.g., HVAC, lighting, radio, various electronics, etc.). In yet another embodiment, first rechargeable energy source 70 charges a main crank battery of the vehicle. The main crank battery can be isolated from system 10. First rechargeable energy source 70 may also be used in other configurations that use 100% electric propulsion for certain periods to power additional vehicle systems such as power steering, brakes and other systems normally powered by first prime mover 20.

In yet another embodiment, second prime mover 50 provides power to external devices directly or through an additional rechargeable energy source and an associated inverter. Utilizing second prime mover 50 to power external devices is intended to lessen the need for an additional first prime mover 20 powered generator.

In yet another embodiment, a sophisticated control system (e.g., a pump control system utilizing fiber optics, etc.) can be used to control the operation of accessory 60. In yet another embodiment, accessory 60 is a variable volume displacement pump. Accessory 60 can operate continuously, only providing flow if there is a demand. When no demand is present, accessory 60 provides little or no additional friction or resistance within the system.

Referring to FIG. 3, another exemplary operation of system 10 is shown. First rechargeable energy source 70 and/or APU 80 may provide power for system 10 when the vehicle is stationary and first prime mover 20 is turned off (e.g., in an idle reduction system). For example, as shown in FIG. 3, energy source 70 may power accessory 60. In one embodiment, second rechargeable energy source 90 is utilized. Accessory 60 stores energy in second rechargeable energy source 90, as shown. Second prime mover 50 is engaged to operate accessory 60 (e.g., a hydraulic pump) when the stored energy in second rechargeable energy source 90 (e.g., a hydraulic accumulator) is reduced to a predetermined level. The utilization of second rechargeable energy source 90 is intended to reduce operation time of accessory 60. Accessory 60 only needs to operate to maintain energy in second rechargeable energy source 90. On-board or external equipment 100 (e.g., any hydraulic equipment) is powered by second rechargeable energy source 90. In one embodiment, a clutch mechanism is used to disengage accessory 60 from second prime mover 50 during vehicle travel when second rechargeable energy source 90 has been fully charged. This is intended to reduce friction on system 10 when second prime mover 50 is needed, but accessory 60 is not. Second rechargeable energy source 90 can provide hydraulic power to equipment 100 at a constant system pressure through a pressure reducing valve.

Alternatively, second rechargeable energy source 90 and two hydraulic motor/pump units are coupled together to provide constant system pressure and flow. The first unit (e.g., a hydraulic motor) receives high pressure flow from second rechargeable energy source 90. The first unit is coupled to a second unit (e.g., a pump) which supplies hydraulic power to equipment 100 at a lower pressure. Both hydraulic second rechargeable hydraulic circuit and low pressure hydraulic equipment circuit have a high pressure and a low pressure (reservoir or tank) sections. A control system may be utilized to maintain constant flow in the low pressure hydraulic equipment circuit as the high pressure flow from the second rechargeable source (accumulator) reduces or varies. The advantage of this configuration is that the energy from the high pressure accumulator is more efficiently transferred to the equipment. This configuration also allows independent hydraulic circuits to be used for the propulsion system and for equipment 100. The independent hydraulic circuits allow for fluids with different characteristics to be used in each circuit. Further, a hydraulic circuit that may be susceptible to contamination (e.g., the equipment circuit) can be kept separate from the other hydraulic circuit (e.g., the propulsion circuit).

In another embodiment, second rechargeable energy source 90 is utilized, and accessory 60 is a hydraulic pump. Second rechargeable energy source 90 can include a low pressure fluid reservoir and a hydraulic accumulator. The utilization of second rechargeable energy source 90 obviates the need for a sophisticated pump control system and the associated fiber optics; instead a simpler hydraulic system can be used (e.g., an insulated aerial device with a closed center hydraulic system and a conventional control system, etc.). If the speed of accessory 60 slows due to depletion of on-board power sources, accessory 60 can operate longer to maintain energy in second rechargeable energy source 90. This is intended to minimize any negative effects on the operation of equipment 100. According to one exemplary embodiment, second prime mover 50 is an AC motor and turns at generally a constant rate regardless of the output volume of accessory 60 (e.g., to create two or more different levels of flow from accessory 60).

However, in some scenarios, second prime mover 50 may provide power to accessory 60 and the speed of second prime mover 50 may be varied by a controller. For example, the speed of second prime mover 50 may be varied to reduce the flow of fluid from accessory 60 (e.g., for two speed operation of an aerial device where lower hydraulic flow may be desirable for fine movement of the boom).

In one embodiment, system 10 can provide the advantage of allowing a vehicle to operate at a work site with fewer emissions and engine noise by using an operating mode. In an operating mode (as shown in FIGS. 3 and 4), first prime mover 20 (e.g., an internal combustion engine, such as a diesel fueled engine, etc.) is turned off and component 40 (PTO) is disengaged from transmission 30, and component 40 when disengaged is able to spin freely with little resistance, and power from first renewable energy source 70 and second renewable energy source 90 are used to operate on-board or external equipment 100 and electrical systems of the vehicle such as "hotel loads" (e.g., HVAC, lighting, radio, various electronics, etc.). According to another exemplary embodiment, second renewable energy source 90 may be optional and first renewable energy source 70 may directly power to equipment 100. According to one exemplary embodiment, first renewable energy source 70 has a capacity of approximately 35 kWh and is configured to provide enough power to operate the vehicle for a full day or normal operation (e.g., 8 hours).

Referring to FIG. 4, yet another exemplary operation of system 10 is shown. When APU 80 is out of fuel, APU 80 is not used, or APU 80 is not present, first rechargeable energy source 70 can be recharged by other components of system 10 (in addition to other methods). First prime mover 20 and second prime mover 50 are preferably operated and synchronized to the same speed (e.g., input and output mechanical communication through component 40 is a one to one ratio). Component 40 is preferably engaged to transmission 30. First prime mover 20 provides power to second prime mover 50 through transmission 30 and component 40. Adjustments to second prime mover 50 speed is made if the ratio between first prime mover 20 and second prime mover 50 is not one to one to minimize wear of the clutch in component 40 or to speed of first prime mover 50. Operation of second prime mover 50 recharges first rechargeable energy source 70 to a predetermined level of stored energy. This method of recharging first rechargeable energy source 70 is intended to allow continuous system operation in the field without the use of external grid power. This method is further intended to allow continuous operation of equipment 100 during recharging of first rechargeable energy source 70.

While charging first rechargeable energy source 70, second prime mover 50 simultaneously operates accessory 60. Accessory 60 provides power to on-board or external equipment 100. After first rechargeable energy source 70 has been recharged, component 40 is disengaged from transmission 30. Operation of accessory 60 can continue without the use of first prime mover 20 as shown in FIG. 2. Alternatively, with component 40 engaged, operation of accessory 60 can continue powered in part or in full by prime mover 20. This may be useful for example, if there is a failure in one of the other components that power accessory 60. This may also be useful if the power demand from accessory 60 exceeds the power available from second prime mover 50. According to one exemplary embodiment, first prime mover 20 provides supplementary power to or all of the power to equipment 100 (e.g. a digger derrick that may require higher hydraulic flow during digging operations). Using first prime mover 20 to provide supplementary power to equipment 100 during intermittent periods of high power requirement allows system 10 to include a smaller second prime mover 50 that is able to provide enough power for the majority of the equipment operation. The control system may receive a signal from the equipment indicating additional power is required beyond that provided by second prime mover 50. Such a signal may be triggered by the operator, by activation of a function (e.g., an auger release, etc.), by demand in the circuit or component above a predetermined threshold, or by other means.

Figure 5:
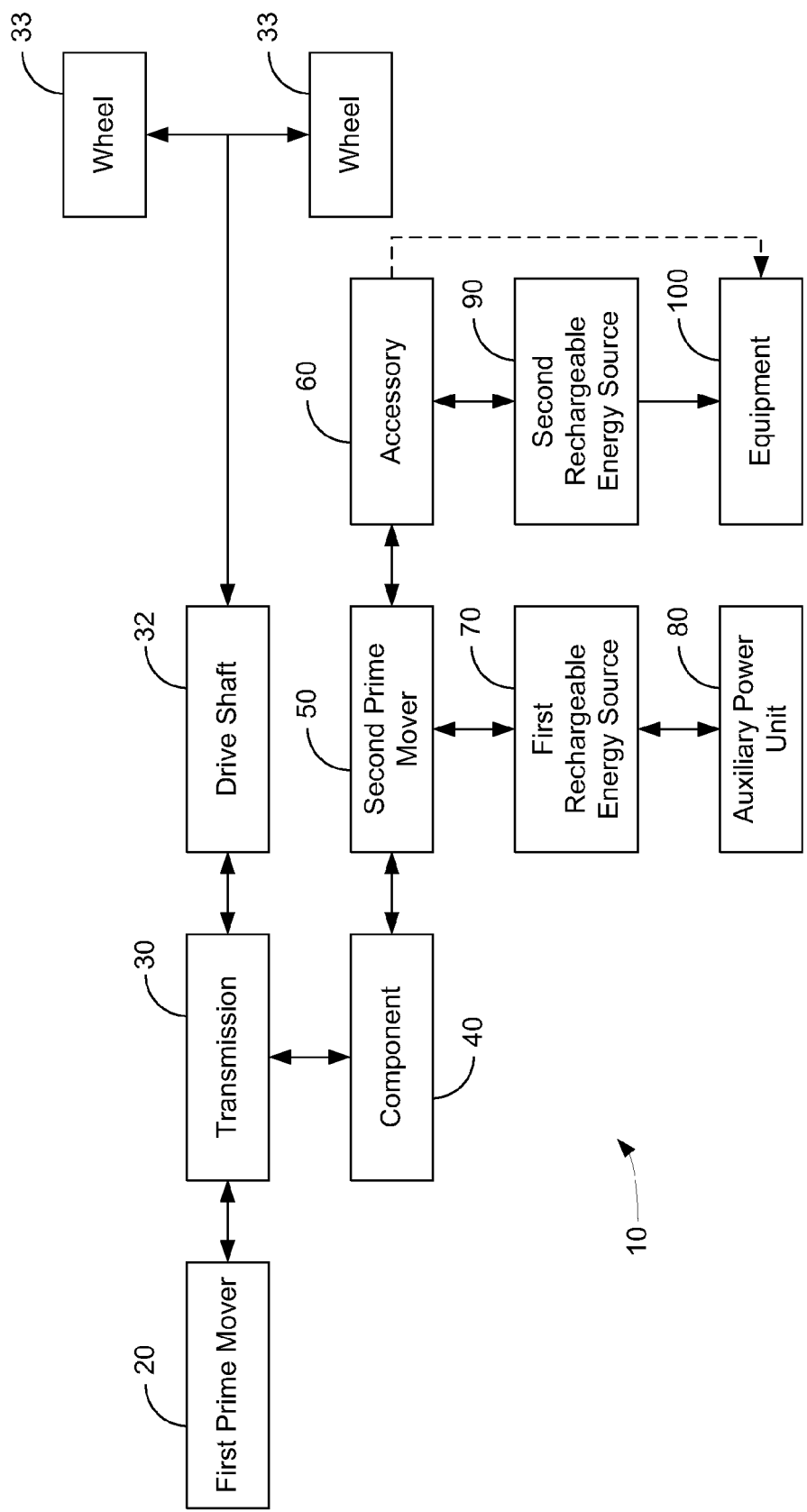
FIG. 5 is a general block diagram illustrating the operation of a hybrid vehicle drive system using a first prime mover providing power to simultaneously charge first and second rechargeable energy sources according to an exemplary embodiment.

Referring to FIG. 5, yet another exemplary operation of system 10 is shown. Second rechargeable energy source 90 is utilized. Accessory 60 provides power to second rechargeable energy source 90. In one embodiment, on-board or external equipment 100 (e.g., hydraulic cylinders, valves, booms, etc.) is coupled to second rechargeable energy source 90, and can be powered by second rechargeable energy source 90. External equipment 100 may also be operated directly by accessory 60 without the use of a second rechargeable energy source 90. This method of recharging first rechargeable energy source 70 and second rechargeable energy source 90 is intended to allow continuous system operation in the field without the use of external grid power. This method is further intended to allow continuous operation of equipment 100 during recharging of first rechargeable energy source 70 and second rechargeable energy source 90.

Figure 6:
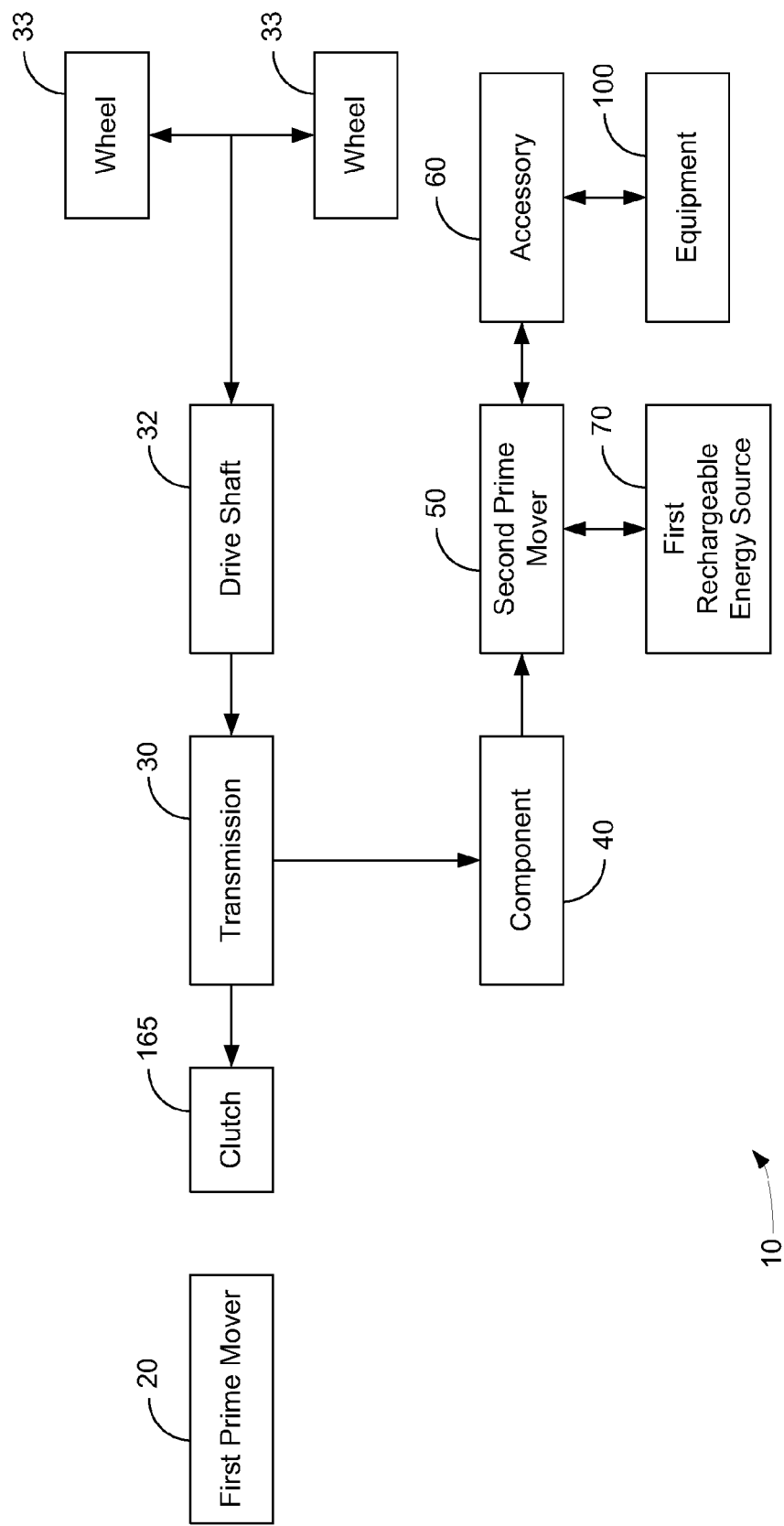
FIG. 6 is a general block diagram illustrating the operation of a hybrid vehicle drive system during regenerative braking according to an exemplary embodiment.

Referring to FIG. 6, yet another exemplary operation of system 10 is shown. In one embodiment, a clutch or other mechanism is used to disengage first prime mover 20 from transmission 30 during vehicle braking. This is intended to maximize the regenerative energy available from vehicle braking The forward momentum of the vehicle provides power from wheels 33 to transmission 30. Transmission 30 may be reduced to a lower gear to increase the RPMS and increase the amount of energy transferred to second prime mover 50. Second prime mover 50 can operate to charge first rechargeable energy source 70 and help slow the vehicle according to principles of regenerative braking Disengaging first prime mover 20 from transmission 30 further reduces the amount of energy transferred back to first prime mover 20 during braking and reduces the need for engine braking The control system for the hybrid components may also monitor chassis anti-lock brake system (ABS) activity. If the chassis anti-lock brake system has sensed possible wheel lock-up and has become active, possibly due to low traction or slippery road conditions, then hybrid regenerative braking is suspended by the hybrid control system. The regenerative braking system may be disabled as soon as ABS is active and may remain off for only as long as the ABS is active, or alternatively regenerative braking may remain off for a period of time after ABS is no longer active or regenerative braking may remain off for the remainder of the ignition cycle to eliminate the chance that regenerative braking could adversely affect vehicle handling in low friction, slippery road conditions during the current ignition cycle. At the next ignition cycle, regenerative braking may be reactivated.

Figure 7:
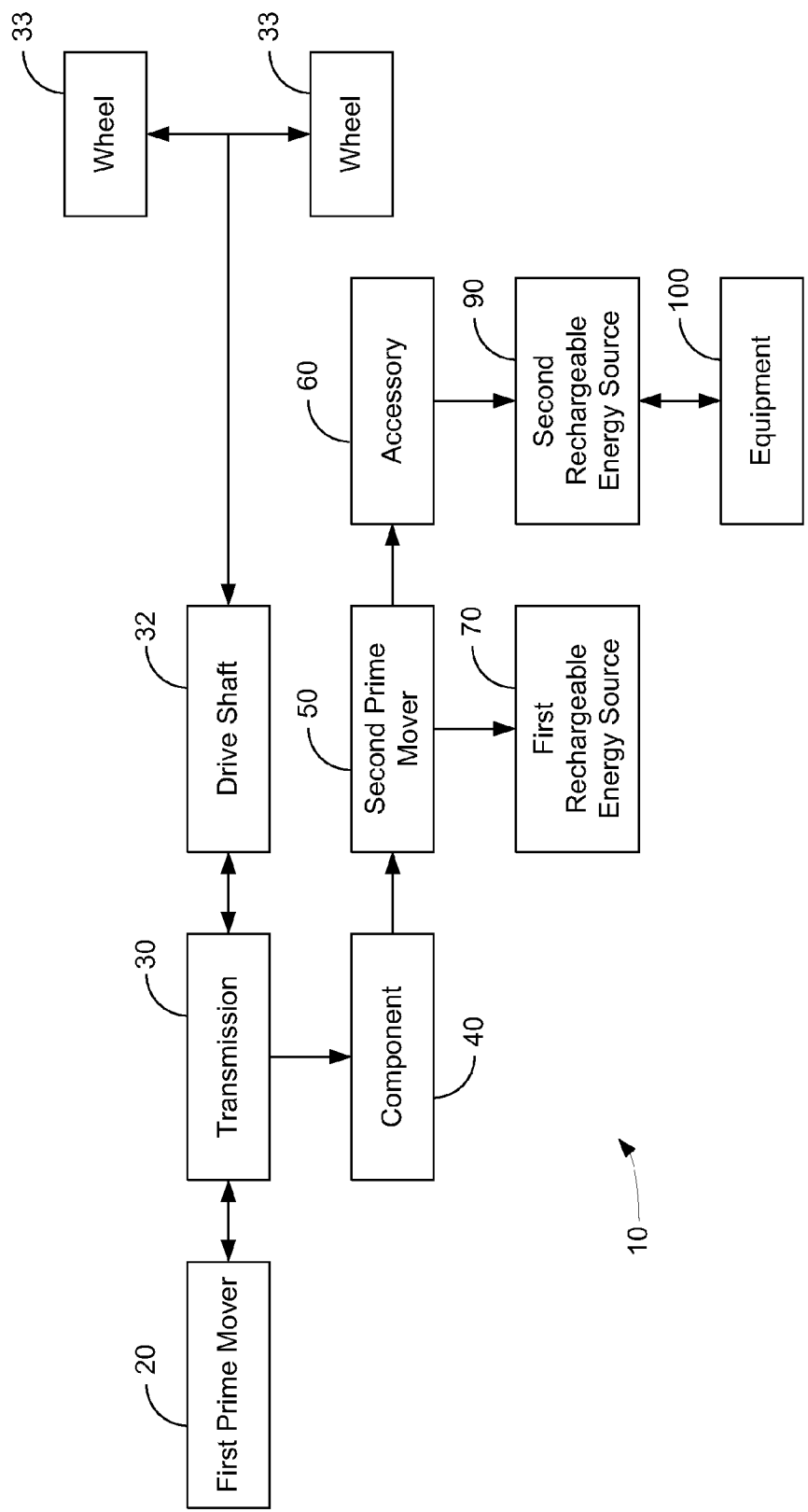
FIG. 7 is a general block diagram illustrating the operation of a hybrid vehicle drive system simultaneously charging first and second rechargeable energy sources during regenerative braking according to an exemplary embodiment.
Figure 8:
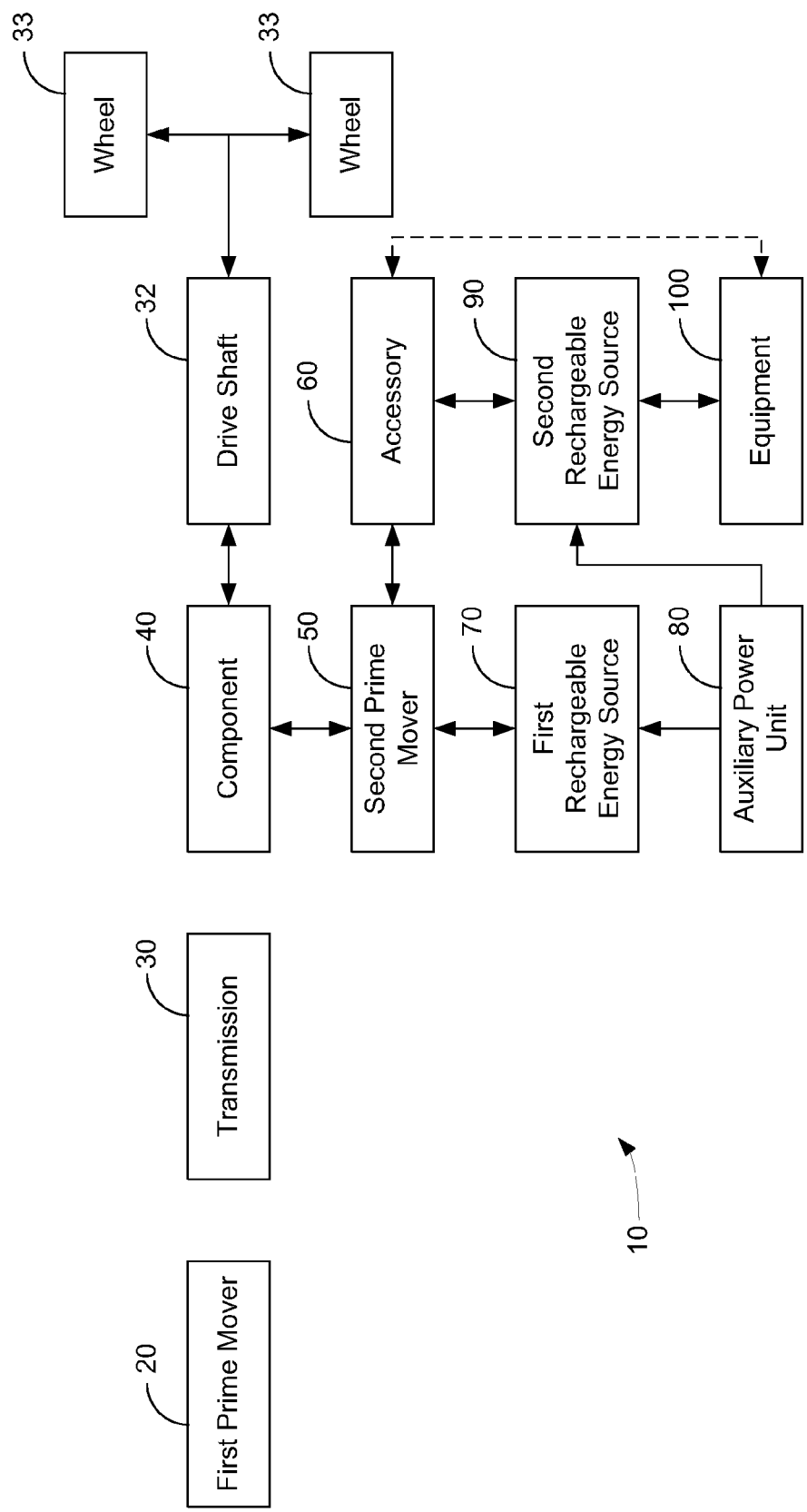
FIG. 8 is a general block diagram of a hybrid vehicle drive system illustrating the use of a transfer case instead of a power take-off from the transmission according to an exemplary embodiment.

Referring to FIG. 7, yet another exemplary operation of system 10 is shown. Second rechargeable energy source 90 is utilized. As mentioned above, during vehicle braking, first rechargeable energy source 70 is charged through operation of second prime mover 50. Accessory 60 can operate to further slow the vehicle, and store energy in second rechargeable energy source 90, if second rechargeable energy source 90 is not fully charged. In this manner, regenerative braking can be used to simultaneously charge multiple energy storage devices of system 10. This is intended to allow recharging of both energy storage devices through braking during vehicle travel, among other advantages. A clutch can be optionally included between first prime mover 20 and transmission 30 to further improve regenerative braking Referring to FIG. 8, in an alternative embodiment of system 10, component 40 is a transfer case. Component 40 is coupled to transmission 30, drive shaft 32, and second prime mover 50. Energy from regenerative braking bypasses transmission 30, passing through component 40 to operate second prime mover 50. Similarly, motive power for drive shaft 32 from second prime mover 50 and accessory 60 bypasses transmission 30, passing through component 40. Component 40 further allows power from second prime mover 50 to be transferred to drive shaft 32, assisting, for example, when the vehicle is accelerating. A conventional clutch can be placed between drive shaft 32 and component 40 to disconnect drive shaft 32 when the vehicle is parked and to allow second prime mover 50 to charge first rechargeable energy source 70 when transmission 30 is coupled to component 40 and first prime mover 20 is coupled to transmission 30. An optional clutch can also be placed between component 40 and transmission 30 or between transmission 30 and first prime mover 20. This allows power from regenerative braking to be channeled directly to second prime mover 50 and accessory 60.

In one embodiment, during operation of equipment 100, component 40 is not coupled to second prime mover 50 and accessory 60 can optionally directly power equipment 100. An optional APU 80 can charge first rechargeable energy source 70 and/or second rechargeable energy source 90 as required.

Referring to FIG. 9, in an alternative embodiment of system 900, a second component 110 such as a power take-off (PTO) is coupled to the transmission 30. Accessory 60 may be a hydraulic pump with the capability to produce more power than a single power take-off can transfer to transmission 30. First component 40 and second component 110 are provided to cooperate to transfer more power from second rechargeable energy source 90 to transmission 30 than a single component is able to transfer. System 10 further includes a third prime mover 120 (e.g., a motor, such as an electric motor/generator, etc.), and a second accessory 130 (e.g., a hydraulic pump, such as a variable volume displacement pump, etc.). Transmission 30 is mechanically coupled to components 40 and 110. Second component 110 is coupled to third prime mover 120. Third prime mover 120 is coupled to second accessory 130. First rechargeable energy source 70 is coupled to third prime mover 120 and provides power for the operation of third prime mover 120. Second rechargeable energy source 90 is coupled to second accessory 130 and provides stored power for second accessory 130. While FIG. 9 shows a system 10 with both third prime mover 120 and second accessory 130 coupled to second component 110, according to other exemplary embodiments, either third prime mover 120 or second accessory 130 may be absent. If a clutch is provided between first prime mover 20 and transmission 30, first component 40 and second component 110 may be configured to drive transmission 30, possibly without assistance from prime mover 20 or when prime mover 20 is off. At slow speeds, if transmission 30 includes a torque converter which is not locked, the optional clutch may not be needed for components 40 and 110 to transfer power to transmission 30 and move the vehicle.

In an alternative embodiment of system 900 for FIG. 9, an external power grid can be used with an electrical rechargeable energy source. Battery size and system software can be modified to charge the battery in the electric grid. For example, the software can be modified to use a charge depleting mode if the battery is charged from the grid.

Figure 10:
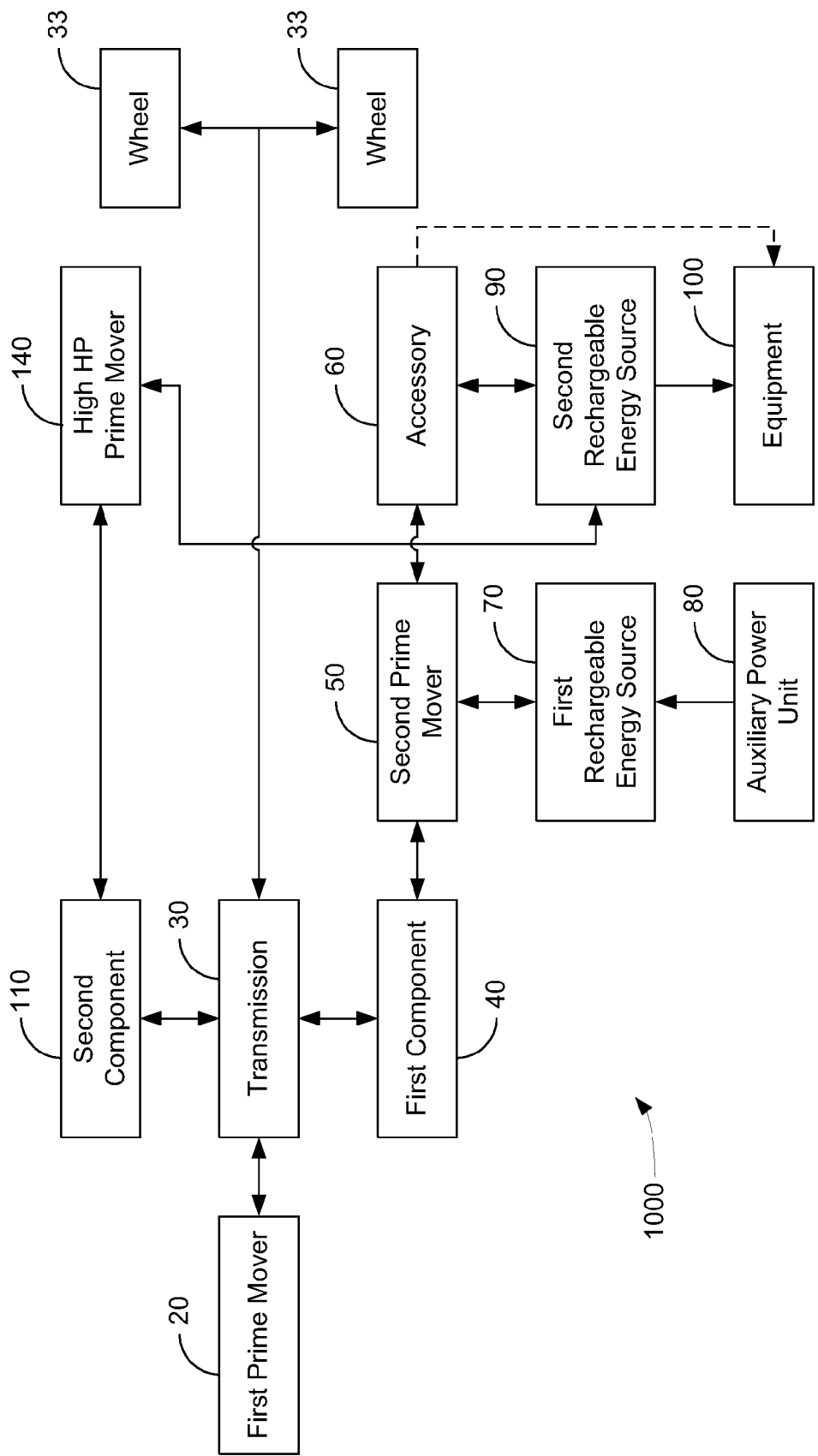
FIG. 10 is a general block diagram of a hybrid vehicle drive system illustrating the use of a second power take-off and an electric motor according to an exemplary embodiment.

Referring to FIG. 10, in an alternative embodiment of system 10, a high horsepower prime mover 140 (e.g., a motor such as a high output power hydraulic motor, etc.) is coupled to second component 110 in a system 1000. High horsepower prime mover 140 is further coupled to second rechargeable energy source 90 (e.g., one or more accumulators). Second rechargeable energy source 90 is pressurized by accessory 60 during highway speeds or while parked.

In one embodiment, high horsepower prime mover 140 receives power from a PTO to pressurize second rechargeable energy source 90 during regenerative braking. Conversely, mover 140 can aid acceleration of the vehicle through component 110 and transmission 30. A clutch can be disposed between first prime mover 20 and transmission 30 for more efficient regenerative braking The embodiment of system 10 shown in FIG. 10 may include a system including second rechargeable energy source 90 and two hydraulic motor/pump units that is configured to provide constant system pressure and flow similar to the system described above. The first unit or high pressure motor is provided by high HP prime mover 140. The second unit or low pressure pump (e.g., a variable displacement pump pressure compensated load sensing pump) may be provided between high HP prime mover 140 and second component 110 preferably with a through shaft or other means of mechanical communication. The equipment circuit can trigger operation of high HP prime mover 140.

Figure 11:
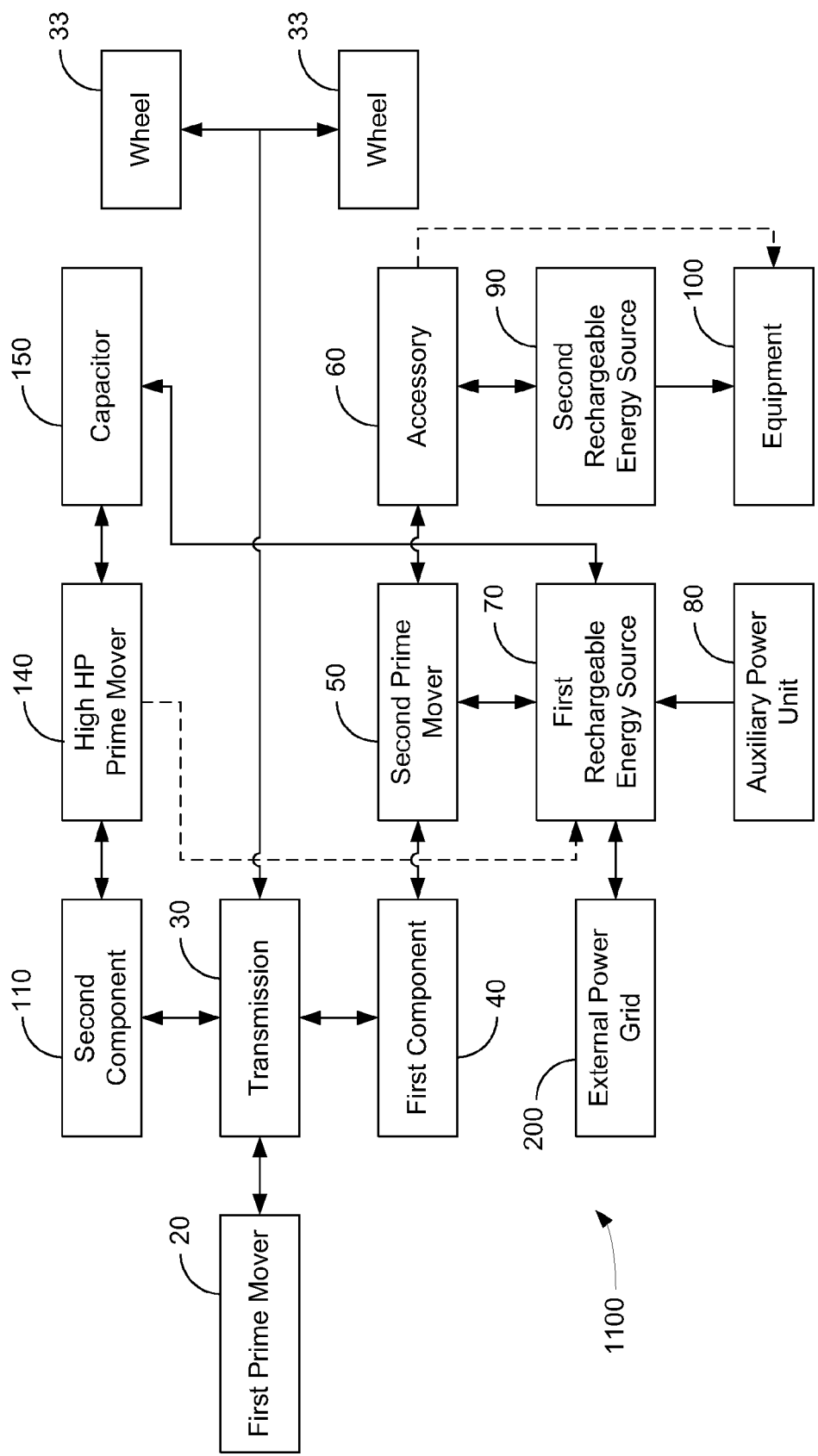
FIG. 11 is a general block diagram of a hybrid vehicle drive system illustrating the use of a second power take-off, a high horsepower motor, and a capacitor according to an exemplary embodiment.

Referring to FIG. 11, in an alternative embodiment of system 10, a high power prime mover 140 is coupled to second component 110 in a system 1100. High horsepower prime mover 140 is further coupled to an ultra capacitor 150 (e.g., a fast charge and discharge capacitor, etc.) which may include multiple capacitors. Capacitor 150 is in turn coupled to first rechargeable energy source 70. First rechargeable energy source 70 is charged by second prime mover 50 during highway speeds or while parked, by auxiliary power unit 80 or by being plugged into the electrical power grid. High HP prime mover 140 may also independently recharge first rechargeable energy source 70. In an optional charging scheme, APU 80 is optional.

Figure 12:
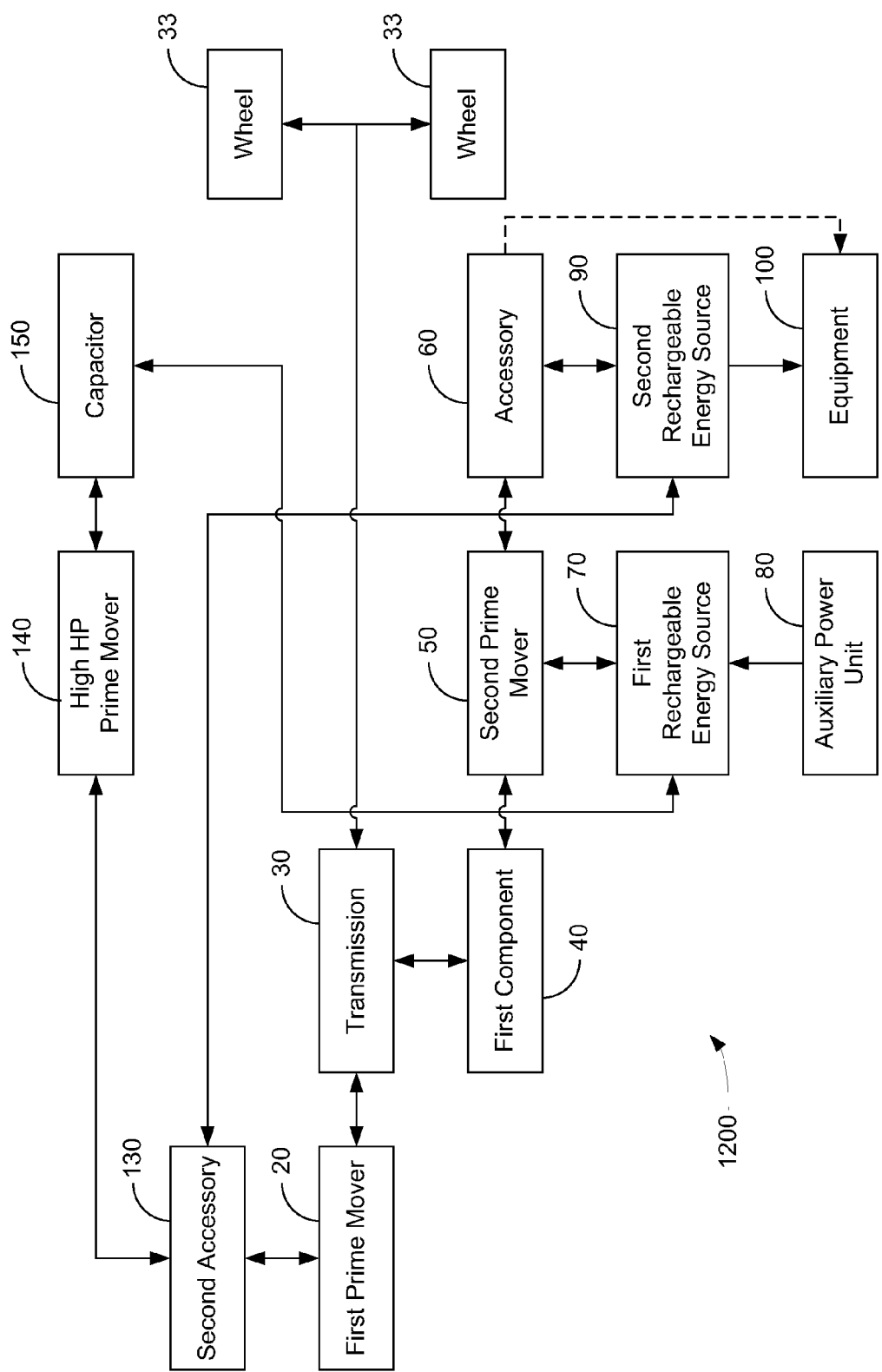
FIG. 12 is a general block diagram of a hybrid vehicle drive system illustrating the use of a second accessory component, a high horsepower motor, and a capacitor coupled to the first prime mover according to an exemplary embodiment.

Referring to FIG. 12, in an alternative embodiment of system 10, a second accessory 130 (e.g., a hydraulic pump, such as a variable volume displacement pump, etc.) and a high horsepower prime mover 140 (e.g., a motor such as a high power electric motor, etc.) are coupled to first prime mover 20 (e. g., to the crankshaft of an internal combustion engine, such as a diesel fueled engine, etc.) in a system 1200. Second accessory 130 and high horsepower prime mover 140 allow large amount of power to be transmitted to first prime mover 20. First rechargeable energy source 70 is coupled to high horsepower prime mover 140 via capacitor 150 and provides power for the operation of high horsepower prime mover 140. Second rechargeable energy source 90 is coupled to second accessory 130 and provides stored power for second accessory 130. High horsepower prime mover 140 may further be used to assist in cranking first prime mover 20. Cranking first prime mover 20 may be particularly advantageous when first prime mover 20 is started and stopped frequently (e.g., to reduce idle time). High horsepower prime mover 140 may further be a more powerful starter motor. While FIG. 9 shows a system 10 with both second accessory 130 coupled to second component 110 and high horsepower prime mover 140, according to other exemplary embodiments, either second accessory 130 may be absent or horsepower prime mover 140 may be absent.

Figure 13:
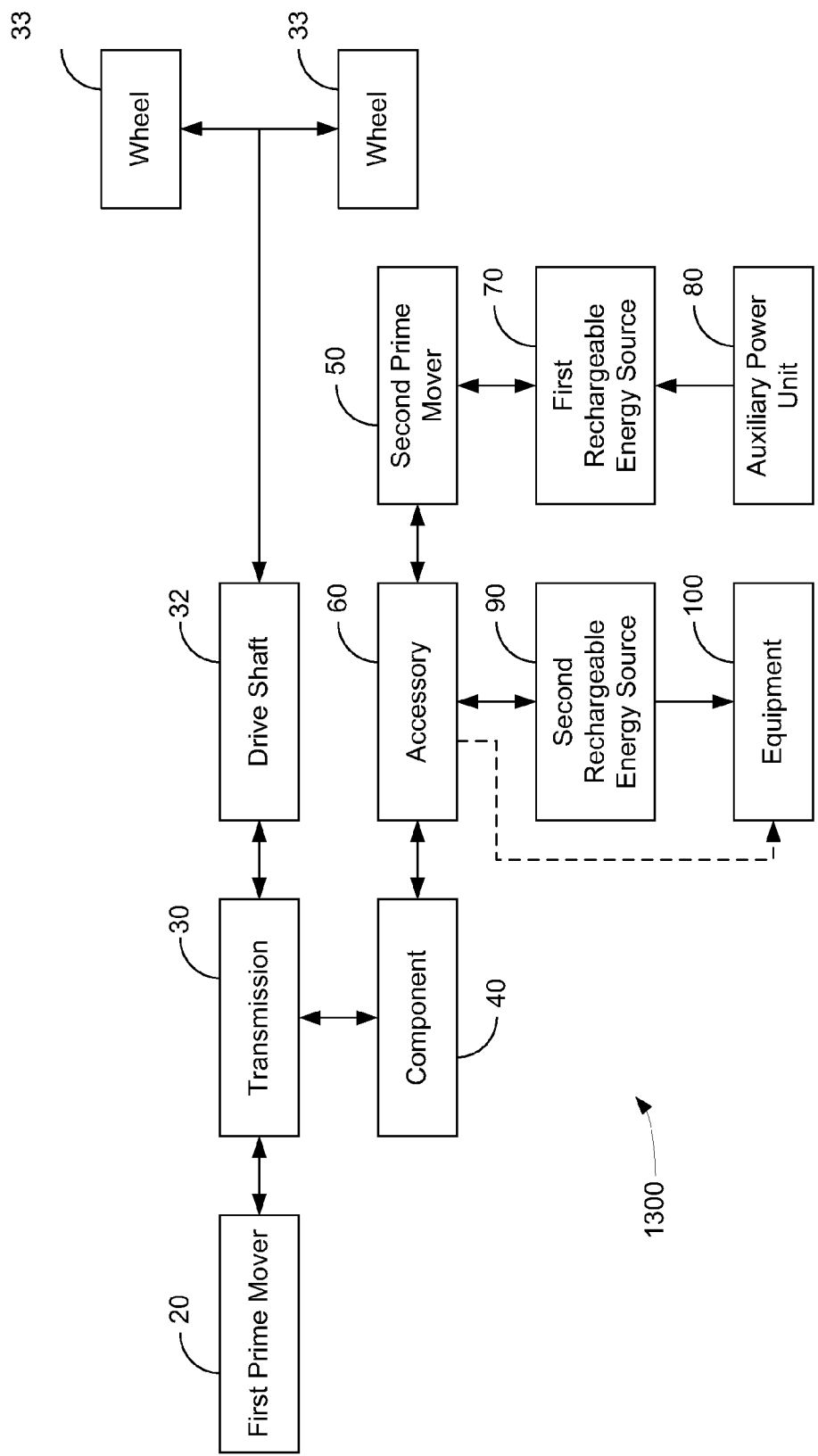
FIG. 13 is a general block diagram of a hybrid vehicle drive system including an accessory coupled to a power take-off and a second prime mover coupled to the accessory according to an exemplary embodiment.

Referring to FIG. 13, in an alternative embodiment of system 10, a system 1300 includes a first prime mover 20 (e.g., an internal combustion engine, such as a diesel fueled engine, etc.), a first prime mover driven transmission 30, a component 40 (e.g., a power take-off (PTO), a transfer case, etc.), a second prime mover 50 (e.g., a motor, such as an electric motor/generator, a hydraulic pump with a thru-shaft, a hydraulic pump without a thru-shaft with second prime mover 50 only connected on one side etc.), and an accessory 60 (e.g., a hydraulic pump, such as a variable volume displacement pump, a hydraulic pump with a thru-shaft etc.). Transmission 30 is mechanically coupled to component 40. Component 40 is coupled to accessory 60. Accessory 60 is coupled to second prime mover 50.

According to one exemplary embodiment, accessory 60 is a hydraulic pump with a thru-shaft. Coupling the accessory 60 to the component 40 provides several advantages. Hydraulic pumps with thru-shafts are more common and generally less expensive than thru-shaft motors. Further, accessory 60 is generally smaller than second prime mover 50 and allows for a more compact package when coupled to component 40.

Second rechargeable energy source 90 is coupled to accessory 60 and provides stored power for accessory 60. Accessory 60 stores energy in second rechargeable energy source 90 during the operation of system 10 (e.g., during cruising or during regenerative braking, etc.). Accessory 60 may draw energy from second rechargeable energy source 90 to provide bursts of high horsepower to first prime mover 20 until second rechargeable energy source 90 is exhausted. In another embodiment, accessory 60 may directly power equipment and second rechargeable energy source 90 may be absent.

Figure 14:
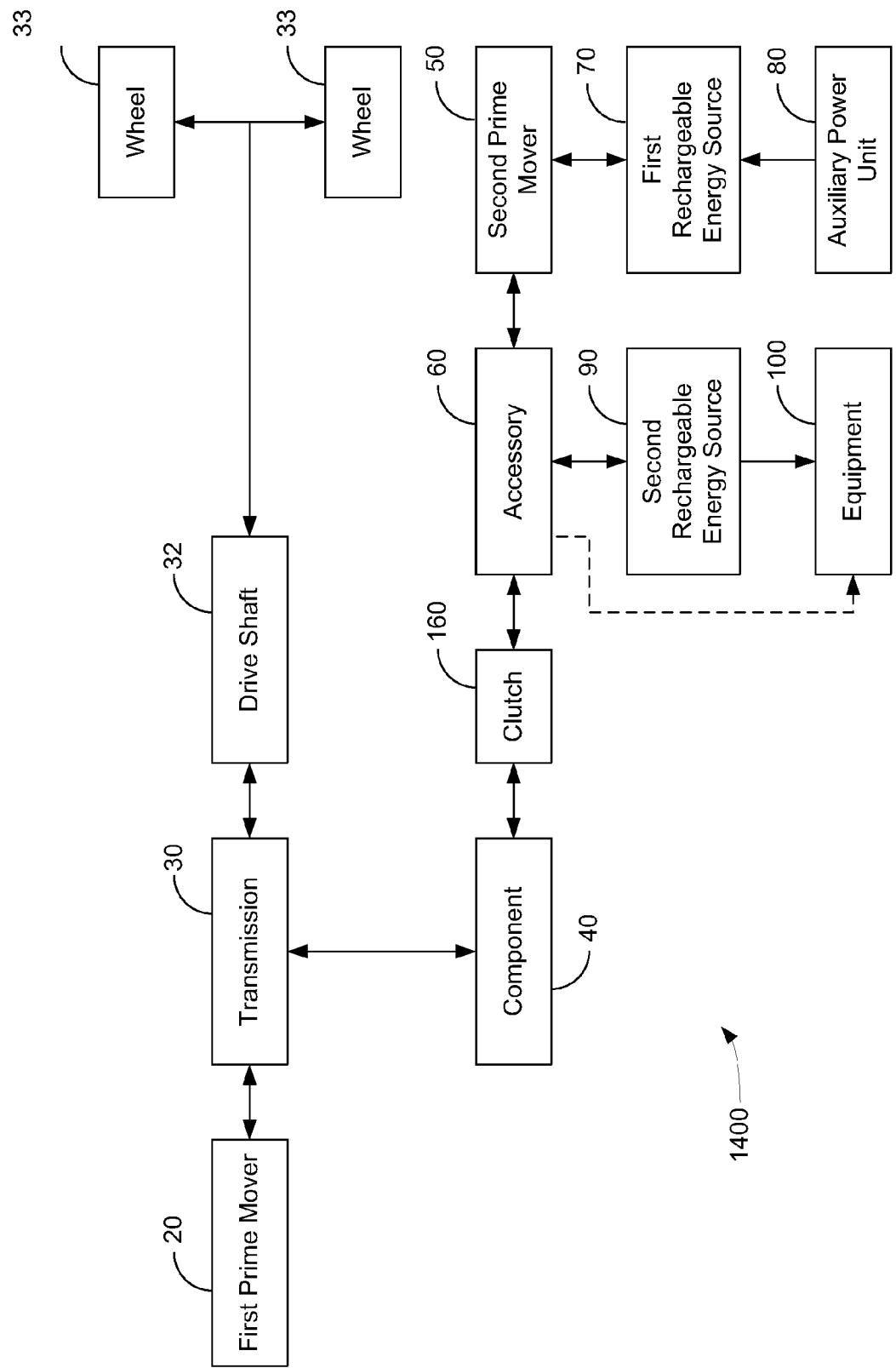
FIG. 14 is a general block diagram of a hybrid vehicle drive system similar to the system of FIG. 13 that includes a clutch between the accessory and the power take-off according to an exemplary embodiment.

Referring to FIG. 14, in an alternative embodiment, system 1400 may include a clutch 160 coupled to component 40. As described earlier component 40 may be a PTO with an integral clutch to selectively disconnect component 40 from first prime mover 20. However, even when disconnected from first prime mover 20, component 40 may still be powered by second prime mover 50 and/or accessory 60. The rotational inertia of component 40 along with any associated frictional losses represent power that is wasted in component 40. Optional clutch 160 allows component 40 to be disengaged from second prime mover 50 and/or accessory 60. Auxiliary Power Unit 80 is optional. Accessory 60 may directly power equipment 100. Source 90 is optional. Optional clutch 160 could be used in other configurations where it would be advantageous to completely remove component 60 from second prime mover 80 or accessory 60.

Figure 15:
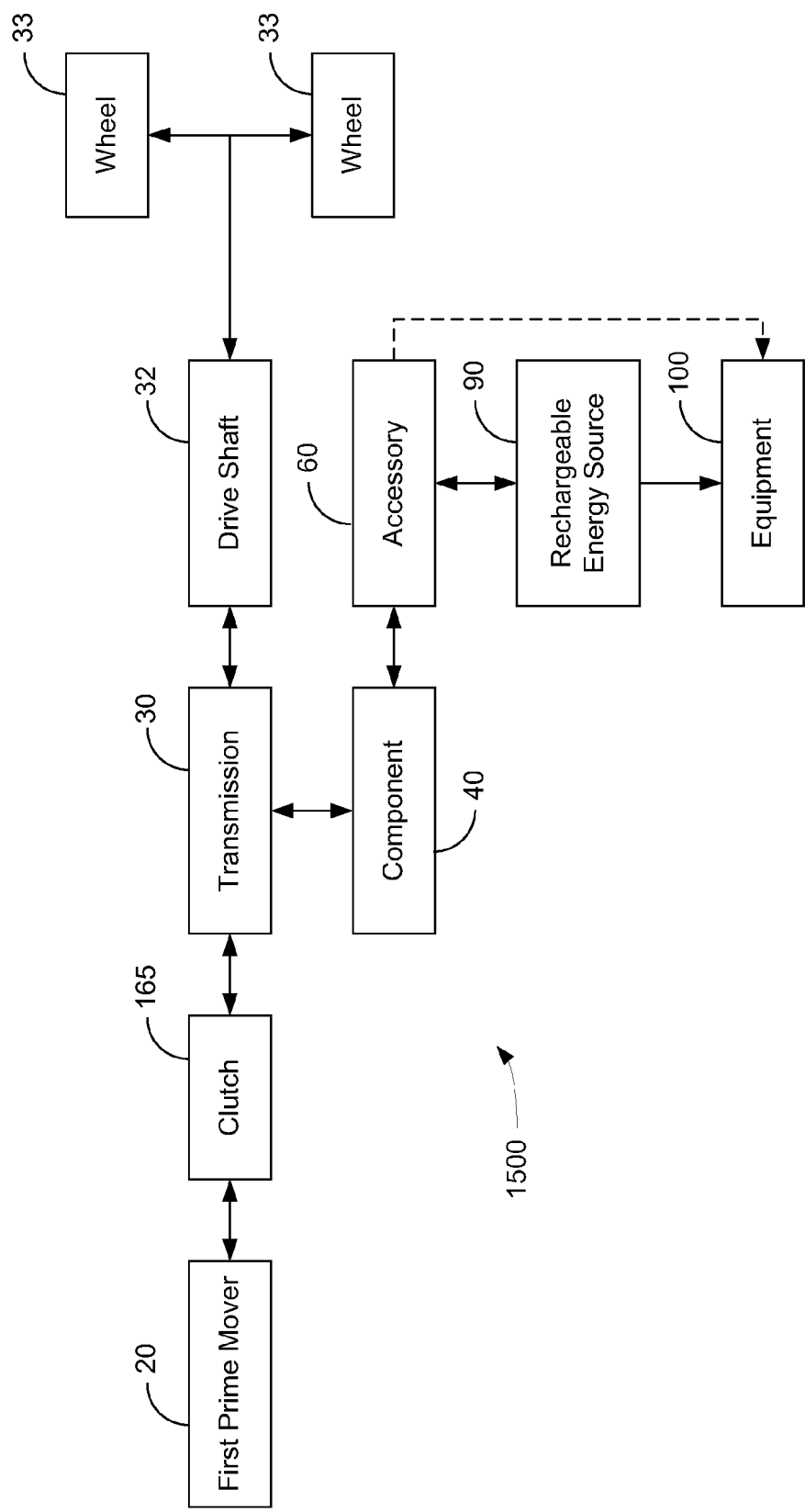
FIG. 15 is a general block diagram of a hybrid vehicle drive system similar to the system of FIG. 13 that includes a clutch between the first prime mover and the transmission according to an exemplary embodiment.

Referring to FIG. 15, in an alternative embodiment, system 1500 may include a clutch 165. System 10 as shown in FIG. 15 operates similar to the embodiment of FIG. 10 and includes an accessory 60 (e.g., a hydraulic pump, such as a variable volume displacement pump, etc.) coupled to component 40. Similar to high horsepower prime mover 140 shown in FIG. 10, accessory 60 may be configured to provide a large amount of power to transmission 30 to augment first prime mover 10. For example, accessory 60 may transfer additional power to transmission 30 to facilitate accelerating the vehicle. Accessory 60 may operate with or without an electrical motor as shown in FIG. 10.

Clutch 165 is coupled to first prime mover 20 and transmission 30. Clutch 165 is configured to selectively disengage first prime mover 20 from transmission 30. The rotational inertia of first prime mover 20 along with any associated frictional losses represent energy that is wasted in first prime mover 20 and reduces the efficiency of regenerative braking in system 10. Disengaging first prime mover 20 from the rest of system 1500 allows for more energy to be captured during regenerative braking.

Figure 16:
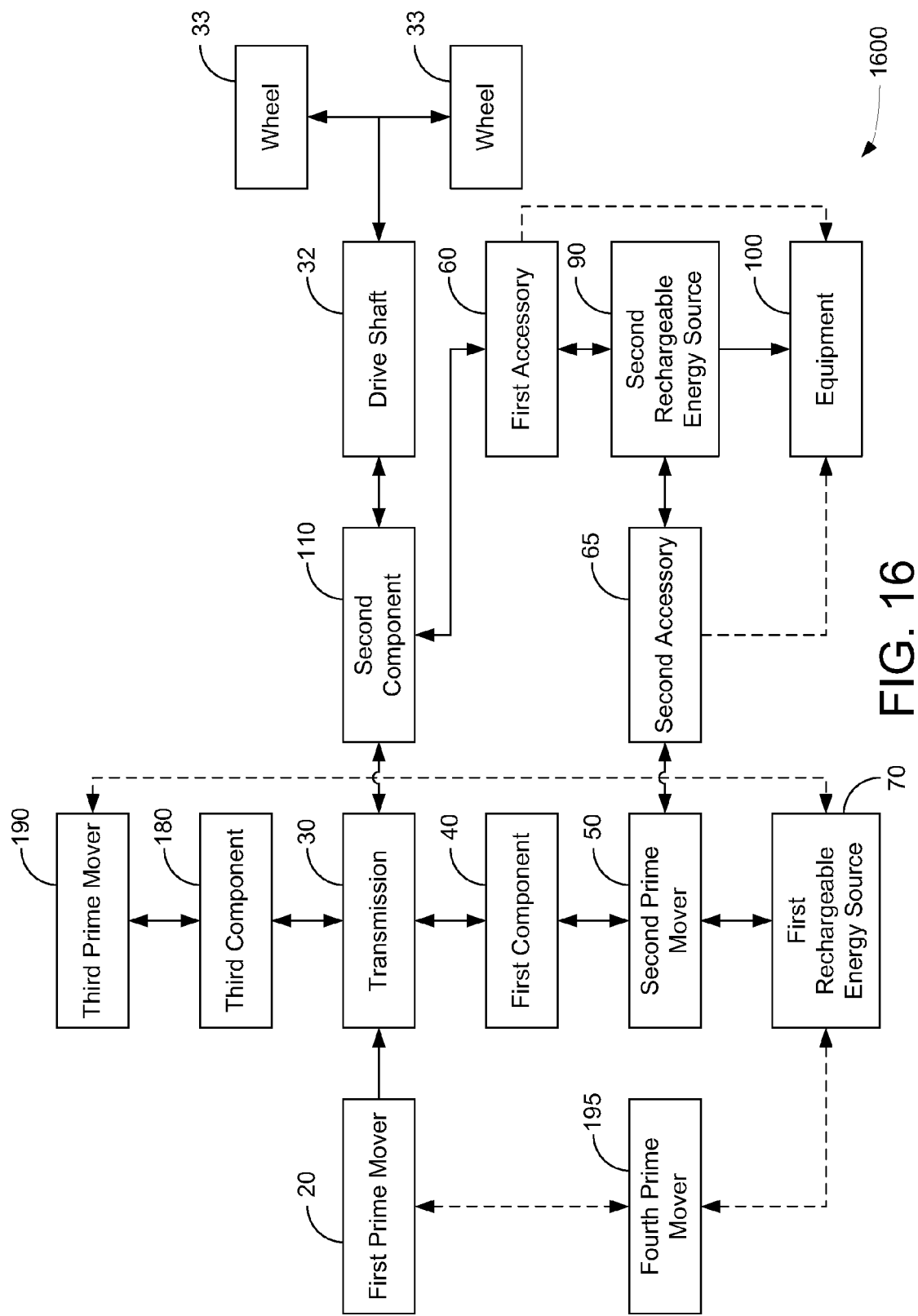
FIG. 16 is a general block diagram of a hybrid vehicle drive system including a second prime mover coupled to a PTO and an accessory coupled to a transfer case according to an exemplary embodiment.

Referring to FIG. 16, in an alternative embodiment, system 1600 may include both a first component 40 such as a PTO, and a second component 110 such as a transfer case coupled to transmission 30. Similar to the embodiment of FIG. 8, energy from regenerative braking bypasses transmission 30, passing through component 110 to operate accessory 60. Similarly, motive power for drive shaft 32 from accessory 60 bypasses transmission 30, passing through component. Component 110 further allows power from accessory 60 to be transferred to drive shaft 32, assisting, for example, when the vehicle is accelerating. Transmission 30 is further mechanically coupled to component 40. Component 40 is coupled to second prime mover 50. Using both a PTO and a transfer case allows system 1600 to benefit from better regenerative braking from drive shaft and the inclusion of a PTO to power electric motor operated hydraulic equipment. Second prime mover 50 may provide power to a second accessory 65 to pressurize second rechargeable energy source 90 when the vehicle is parked or moving at a constant speed. Second rechargeable energy source 90 provides additional power during the acceleration of the vehicle. System 10 may optionally include a clutch between first prime mover 20 and transmission 30 and/or between transmission 30 and component 110.

As shown in FIG. 16, system 1600 may further include a third component 180 such as a PTO, a third prime mover 190, and a fourth prime mover 195. Third prime mover 190 is coupled to third component 180. Third prime mover 190 is coupled to first rechargeable energy source 70 configured to charge first rechargeable energy source 70. In this way, second prime mover 50 may draw power from first rechargeable energy source 70 while first rechargeable energy source 70 continues to be charged by third prime mover 190. Fourth prime mover 195 may be a larger starter motor and may be provided for first prime mover 20 to assist with low speed torque and quick starts of first prime mover 20. The large starter motor can also reduce unnecessary idle. First prime mover 20 may be started and stopped to reduce unnecessary idling. Mover 195, mover 190, and component 180 are optional. Clutches can be placed between mover 20 and transmission 30 and between transmission 30 and component 110. The interface between mover 50 and accessory 65 can be by a one way or two way interface.

Figure 18:
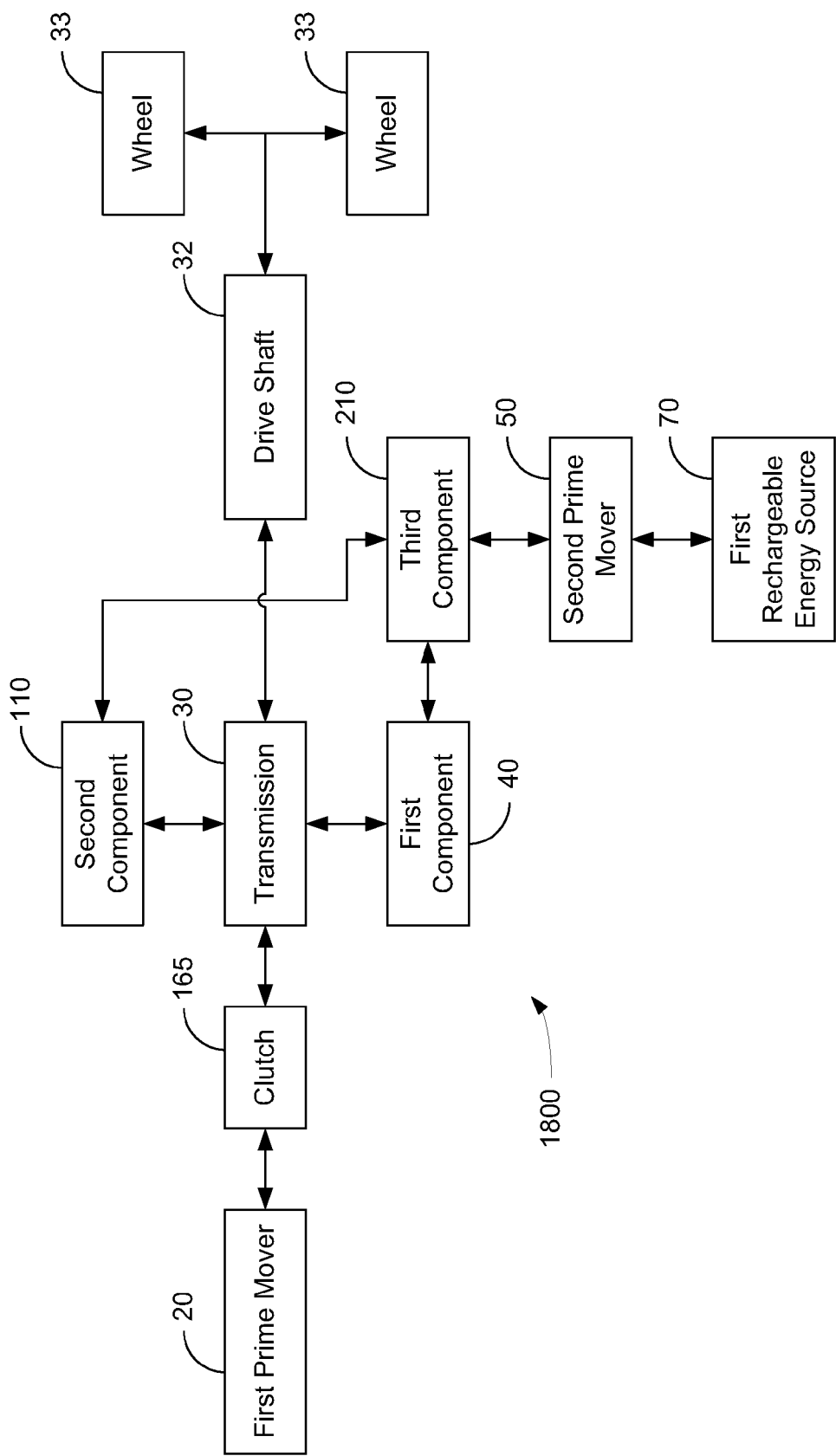
FIG. 18 is a general block diagram of a hybrid vehicle drive system that includes a multi-input/output drive coupled to first and second PTOs according to an exemplary embodiment.

Referring to FIG. 18, in an alternative embodiment, system 1800 may include both a first component 40 and a second component 110 such as a PTO coupled to transmission 30, and a third component 210 such as multi-input/output drive coupled to first component 40 and second component 110. Third component 210 may be a hydraulic drive such as manufactured by Funk Manufacturing Co. and distributed by Deere & Company. Third component is further coupled to a second prime mover 50. Second prime mover 50 may be an electric motor with the capability to produce more power than a single power take-off can transfer to transmission 30. First component 40, second component 110, and third component 210 are provided to cooperate to transfer more power from second prime mover 50 to transmission 30 than a single component is able.

Figure 19:
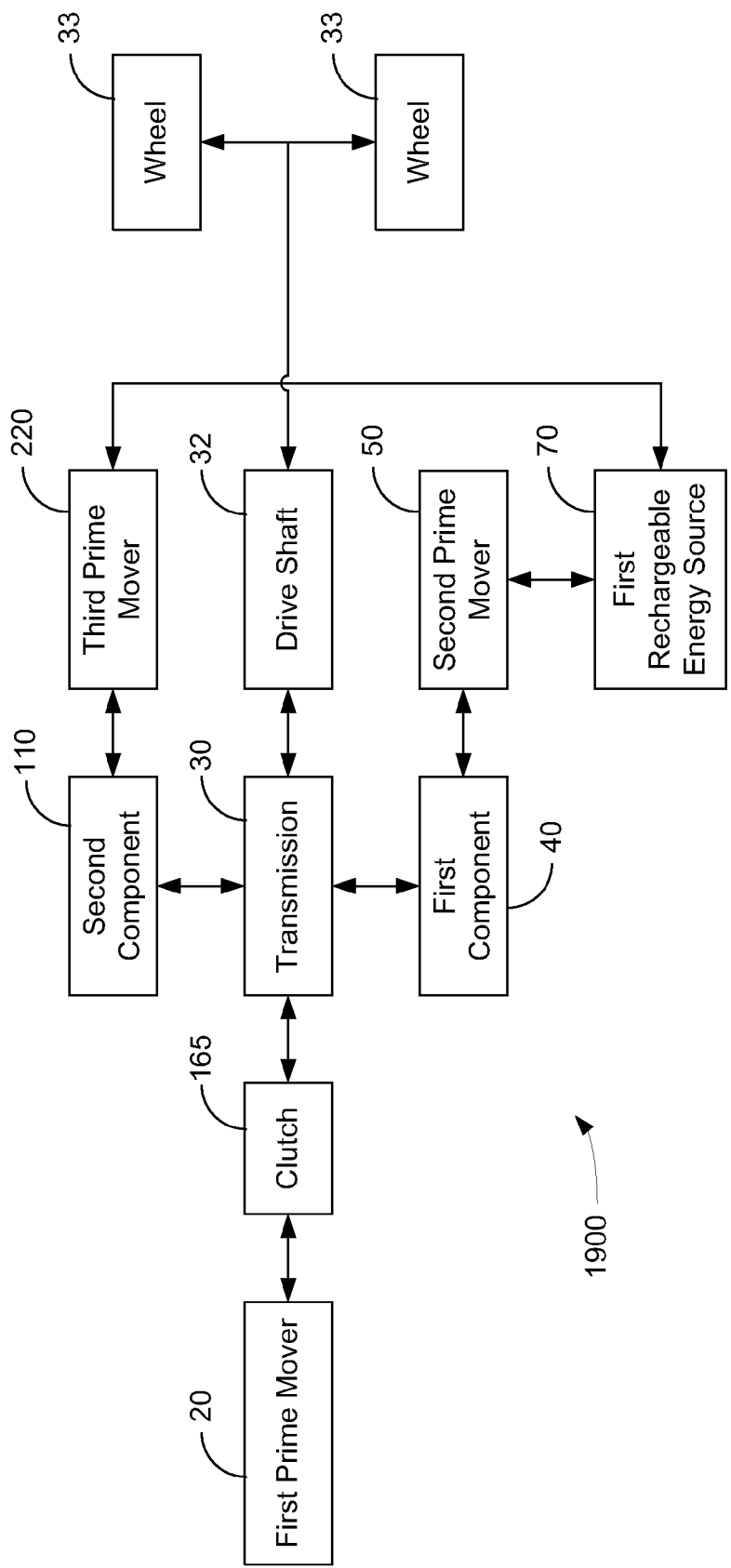
FIG. 19 is a general block diagram of a hybrid vehicle drive system that does not include hydraulic drive components and includes electric motors coupled to each of two PTOs coupled to the first prime mover according to an exemplary embodiment.

Referring to FIG. 19, in an alternative embodiment, system 1900 may include both a first component 40 and a second component 110 such as a PTO coupled to transmission 30. System 10 further includes a second prime mover 50 (e.g., a motor, such as an electric motor/generator, etc.), and a third prime mover 220 (e.g., a motor, such as an electric motor/generator, etc.), coupled to first component 40 and a second component 110, respectively. A first rechargeable energy source 70 is coupled to second prime mover 50 and third prime mover 220 and provides power for the operation of second prime mover 50 and a third prime mover 220.

Clutch 165 can disengage first prime mover 30, allowing the vehicle to be driven in an all electric mode if other vehicle systems (e.g., HVAC system, braking, power steering, etc.) are also electrically driven. The all electric mode may also be possible in other system configurations (as shown in FIG. 6).

The all electric mode saves fuel by allowing first prime mover 20 to be off when not needed such as at low speeds or when the vehicle is stopped.

Optionally, transmission 30 may be constructed such that independent component input/output gears are used, one for each component 40 and 110. A clutch located in transmission 30 and in between input/output gears for component 40 and 110 could allow series/parallel operation by operating first prime mover 20, engaging clutch 165 and driving one of the component input/output gears causing either second prime mover 50 or third prime mover 220 to act as a generator. The clutch in transmission 30 disengages the other component input/output gear from the other input/output gear coupled to component 40, 110 that interfaces with prime mover 50 that acts as a generator. The remaining component input/output gear is coupled to the other gears in transmission 30 that transmit power to drive shaft 32, possibly through another clutch internal to the transmission that is engaged. The remaining prime mover acts as a motor and powers transmission 30 through the component that is mechanically coupled to the input/output gear. Such an arrangement is particularly useful when the vehicle is driven in the city. In such a situation, prime mover 20 may operate at a more efficient speed and power range, independent of vehicle speed, or prime mover 20 may be turned off completely to further reduce fuel consumption. If more power is needed, the disengaged prime mover may be synchronized in speed with the disengaged prime mover or prime movers 20 and then also coupled to transmission 30 to provide the needed additional power. The engaged prime over or transmission, making adjustments in speed to adapt to the ratio of the input to output gearing of the component (PTO).

Alternatively, an optional APU could charge first rechargeable energy source 70 while first prime mover 20 is kept off and the vehicle is operated in a series hybrid configuration in which clutch 165 is disengaged. The APU is preferably a low emissions power source using a low carbon fuel. Such a configuration would be useful in an urban area requiring low emissions. As in the all-electric mode, vehicle systems (e.g., HVAC, braking, power steering, etc.) are operated electrically when first prime mover 20 is off and the vehicle is being driven.

Figure 20:
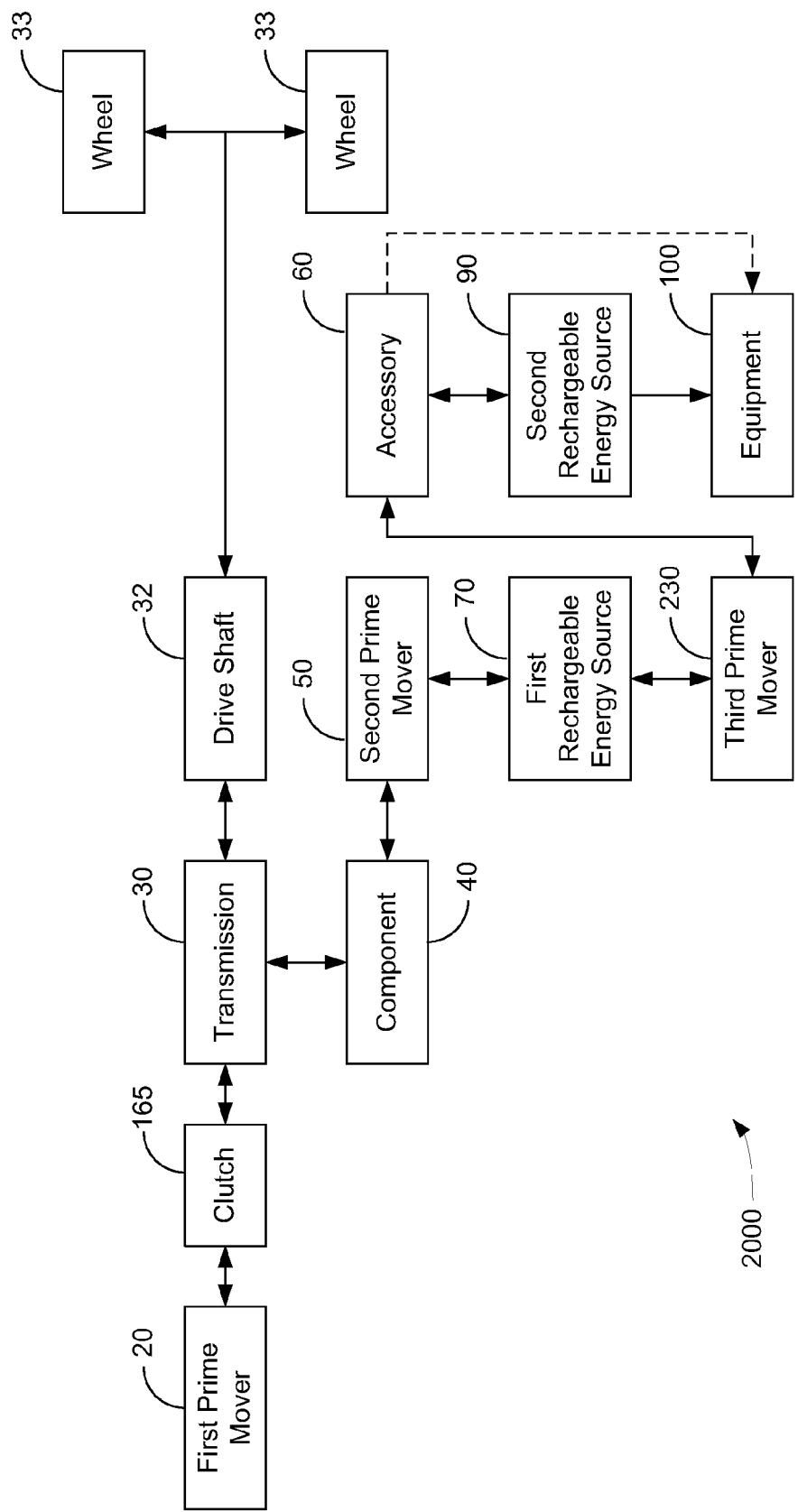
FIG. 20 is a general block diagram of a hybrid vehicle drive system that includes a smaller electric motor as a third prime mover to power a hydraulic pump according to an exemplary embodiment.

Referring to FIG. 20, in an alternative embodiment, system 2000 may be similar to the embodiment shown in FIG. 1. However, second prime mover 50 (e.g., a motor, such as an electric motor/generator, etc.) may provide more power than necessary to drive accessory 60 (e.g., a hydraulic pump, such as a variable volume displacement pump, etc.). Therefore, a third prime mover 230 such as a smaller electric motor/generator is provided. Third prime mover 230 is coupled to first rechargeable energy source 70 and provides power to accessory 60. According to one exemplary embodiment, third prime mover 230 is a 10-60 hp electric motor, more preferably a 20-40 hp electric motor.

Figure 21:
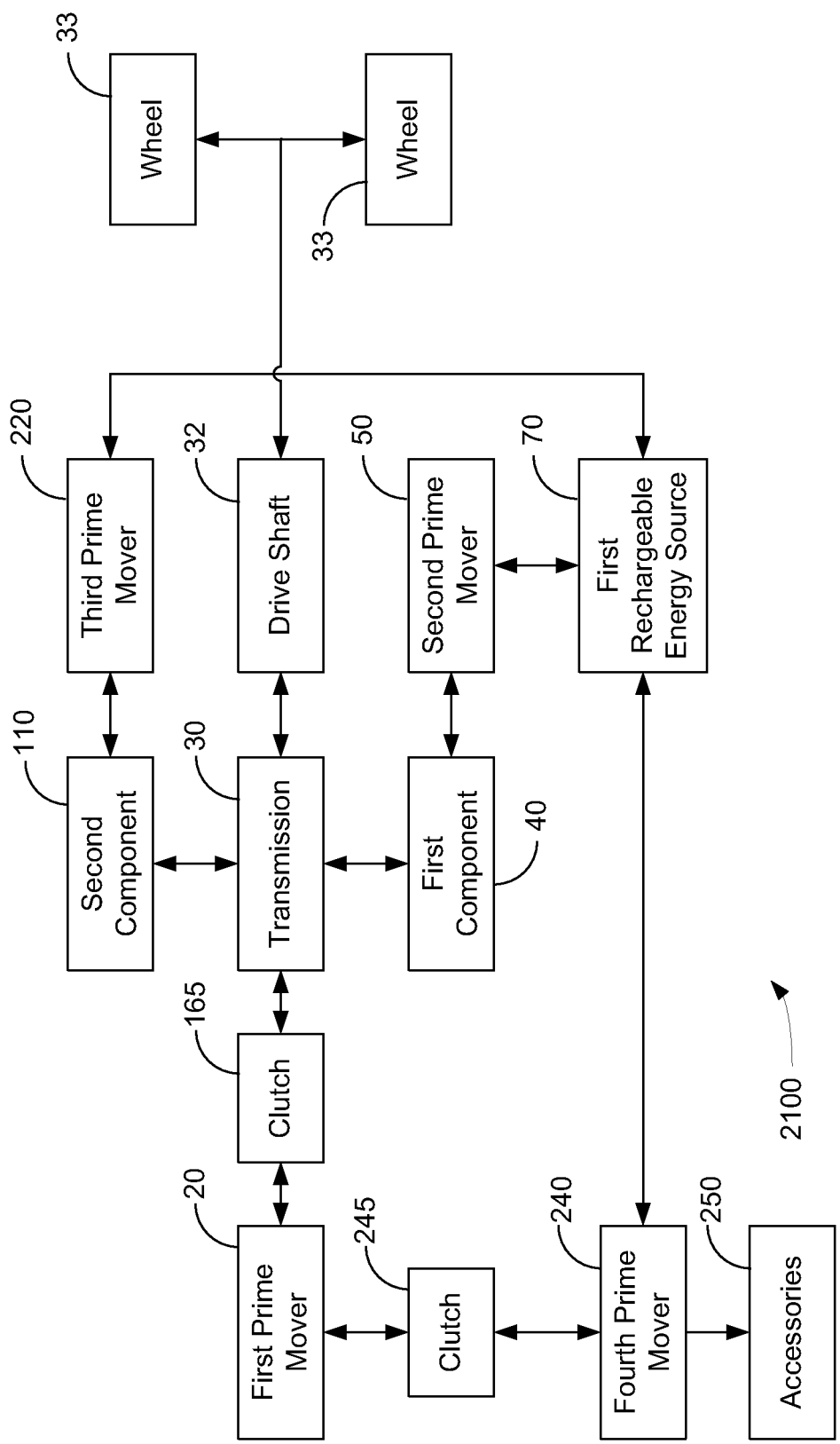
FIG. 21 is a general block diagram of a hybrid vehicle drive system that does not include hydraulic drive components and includes electric motors coupled to each of two PTOs coupled to the first prime mover along with an electric motor coupled to the internal combustion engine to power on-board accessories according to an exemplary embodiment.

Referring to FIG. 21, in an alternative embodiment, system 2100 may be similar to the embodiment shown in FIG. 1. However, a fourth prime mover 240 may be coupled to first prime mover 20 with a clutch 245 (e.g., to the crankshaft of the internal combustion engine). The coupling may be direct to the crankshaft or through a belt or through a shaft. Fourth prime mover 240 may be, for example, an electric motor that provides power to one or more accessories 250 such as a cooling fan for first prime mover 20, power steering pumps, an HVAC system, brakes, etc. Alternatively, it may be an integrated starter generator, optionally capable of regenerative braking.

System 2100 as shown in FIG. 21, is able to function in several modes, depending on the needs of the vehicle. System 10 can be configured as a combination series/parallel hybrid. For example, in an all electric mode, first prime mover 20 may be turned off and clutch 165, disengaged prime movers 50 and 220 may provide the power to drive wheels 33. Movers 50 and 220 can be attached to a hydraulic pump. In one embodiment, movers 50 and 120 can be integrated with a hydraulic pump as a single unit sharing a shaft. According to one exemplary embodiment, each of prime movers 50 and 120 are able to provide at least 100 hp so that 200 hp of power are transmitted to transmission 30 to drive wheels 33. If the vehicle requires more power to drive shaft 32, first prime mover 20 may be turned on. The speed of the output from first prime mover 20 is synchronized to the desired RPMs. Clutch 165 is engaged to couple first prime mover 20 to transmission 30 in addition to prime movers 50 and 120. If the vehicle requires even more power to drive shaft 32, clutch 245 may be engaged so that fourth prime mover 240 provides additional power to crankshaft of first prime mover 20. Fourth prime mover 240 may simultaneously provide power to one or more accessories 250. Using prime movers 50, 220 and 240 to supplement the power driving wheels 33 allows a smaller, more efficient first prime mover 20 to be used in system 10.

Fourth prime mover 240 can drive accessories 240 via belts and/or pulleys and/or shafts and/or gears can be mechanically coupled to first prime mover 20 through clutch 245 via belts, shafts, gears and/or pulleys. Prime mover 240 can be an electric motor with a through shaft. The through shaft can drive belts and/or pulleys for accessories (e.g., HVAC, fan, steering, pumps, brakes, etc.) Clutch 165 may be integrated with the transmission (as in a manual transmission or in an auto-shift transmission). In an automatic transmission utilizing a torque converter, clutch 165 may be in between the torque converter and the ICE or integrated into the transmission and placed between the torque converter and the input gear for the PTO (for those transmissions that utilize a PTO input gear independent of the torque converter). The integration and/or location of clutch 165 as described may be used for other embodiments shown in other diagrams in which a clutch can be placed in between the ICE and the transmission.

If first prime mover 20 is a relatively small internal combustion engine, it may not be able to provide all the power to drive wheels and regenerate rechargeable energy source 70. In such a case, clutch 165 is disengaged and clutch 245 is engaged so that first prime mover 20 only drives accessories 250 and third prime mover 240 which, in turn, acts as a generator to charge rechargeable energy source 70. Prime movers 50, and 120 provide power to drive wheels 33. This arrangement allows first prime mover 20 operate in a more efficient zone. Clutch 245 may disconnect first prime mover 20 from fourth prime mover 240 and fourth prime mover 240 may provide power for accessories 250. To keep the engine block warm when first prime mover 20 is turned off, engine coolant may be circulated through a heating element (not shown). The ICE can then be turned off to eliminate fuel consumption and reduce emissions if first rechargeable energy source has enough energy to power other prime movers. As with all hybrid mechanizations described, a control system would assess various inputs to the system and adjust output of various devices, for example monitoring factors such as, energy levels, power demand, torque, control inputs, speeds, temperatures and other factors to determine appropriate operation of prime movers, activation of clutches and other devices for optimal efficiency and performance. The heated coolant would then be circulated back to first prime mover 20. The heated coolant may also be used to warm rechargeable energy source 70 or other on-board batteries when the ambient air is cold. The warmer for the engine block and/or batteries could be used on other embodiments.

System 2100 as illustrated in FIG. 21 advantageously can utilize a parallel hybrid configuration with assist from fourth prime mover 240 (e.g., accessory electric motor), first prime mover 20 (ICE), second prime mover 50, and third prime mover 220. The parallel nature of system 2100 allows maximum acceleration as power can be utilized from multiple sources. As discussed above, transmission 30 can include a clutch (e.g. internal or external clutch 165). To reduce clutch wear, components 40 and 110 can be utilized to launch the vehicle and once the input shaft is close to or at the same speed as the engine drive shaft, the clutch can be engaged to couple prime mover 20 to transmission 30. This method can also be used for other embodiments in which a clutch is used to engaged the prime mover with the transmission.

Alternatively, system 2100 in FIG. 21 can be provided as only a single PTO system. The use of two PTOs allows more power to be provided to transmission 30.

Accordingly to another embodiment, system 2100 of FIG. 21 can be arranged so that a parallel hybrid configuration is assisted from mover 220 and mover 50 during acceleration. In an electric only acceleration mode, power can be provided through components 40 and 110 via motors 50 and 220 with prime mover 20 off.

Fourth prime mover 240 can be a multitude of electric motors for powering individual accessories. Clutch 245 and mover 240 can be connected to the front or other locations of prime mover 20 and could be used in other configurations with reference to FIGS. 1-20. Advantageously, electric only acceleration can use standard drive train components and does not produce emissions. The use of prime mover 240 powered through source 70 for movers 220 and 50 reduces emissions.

According to another embodiment, system 2100 as illustrated in FIG. 21 can also be configured to provide series electric only acceleration. Mover 20 is used to charge first rechargeable energy source 70 (e.g., batteries) and is not directly coupled to transmission 30 or is disconnected from transmission 30 via clutch 165. Mover 240 provides power to accessories 250. Advantageously, mover 20 can be configured to operate at most efficient RPM and load. Preferably, motor 240, has a thru-shaft and can act as a generator while mover 20 powers accessories. Such a system would have advantages in stop and go type applications where electric motors can store energy during braking and accelerate vehicle without having to change the operating RPM of mover 20.

According to another embodiment, system 2100 as illustrated in FIG. 21 can also be operated in a ICE only cruise mode. During steady driving (such as highway driving), ICE prime mover (e.g., mover 20) may provide all of the power and electric motors (e.g., movers 220 and 50) may be uncoupled (disconnected via clutches) from the drive train to reduce unnecessary friction and parasitic loads. Such mode provides best constant power at cruising speeds. In such a mode, mover 20 can be directly coupled or coupled through clutch 165 to transmission 30 to provide best efficiency when mover 20 (ICE) can operate at a steady state and in an efficient RPM and load range. All unnecessary hybrid components can be disconnected during ICE only cruise mode, as well as any unnecessary loads. When accelerating or braking, electric motors (or hydraulic motors) may be temporarily engaged to provide additional propulsion or capture brake energy for reuse resulting in higher operating efficiency and lower fuel consumption.

According to yet another embodiment, system 2100 as illustrated in FIG. 21 can also be provided in a mode in which highway speed is maintained by mover 20 and hybrid components are temporarily engaged to accelerate or slow the vehicle. An ICE (mover 20) can be used for base cruise power and one or more electric or hydraulic motors are engaged as needed for additional acceleration or to slow the vehicle. After the vehicle resumes a steady highway cruise, components 110 and 40 (e.g., PTOs) can be disengaged to remove unnecessary resistance of unneeded hybrid components. Advantageously, such a configuration allows a smaller horsepower engine to be used in optimal range for maximum efficiency and reduces large swings required in outputs from mover 20 (e.g., the engine operates less efficiently when required to provide power to provide large transient loads or when power output is much higher or lower than its optimal range).

According to an alternative embodiment, mover 50 can include a pump or a pump can be placed in between mover 50 and first component 40. In another alternative, the hydraulic pump could be placed after or behind mover 50. In this embodiment, power from source 70 can be utilized to drive pump for hydraulic components using mover 50. Such configuration would be advantageous when the vehicle is stationary as power from the batteries (e.g., source 70) is utilized to operate electric motors and hydraulic pumps.

According to another embodiment, system 2100 illustrated in FIG. 21 can be operated in a mode in which mover 20 is operated and the rotational speed of the hydraulic pump is constant. Component 40 can be engaged so that mover 20 drives the hydraulic pump and mover 50. If rotation of mover 50 needs to vary due to changes in required hydraulic flow, a separate PTO can be engaged and used to recharge batteries while other electric motors can operate independently to provide power to the pump with varying rotation speed. As discussed above, the hydraulic pump can be placed between mover 50 and component 40 or behind mover 50. In an embodiment in which a second PTO is not available, the rotational speed of the pump can be kept constant and the output of the pump can be varied to change flow to meet required hydraulic flow variations. This configuration is particularly advantageous in digger derrick applications in which the speed of the auger must be changed by adjusting flow.

Referring to FIGS. 22-29, in an alternative embodiment, system 2200 may be similar to the embodiment shown in FIG. 21. However, a fifth prime mover 260 with a clutch 255 may be provided between first prime mover 20 and clutch 165. Fifth prime mover 260 may act as a motor to power the drive train or as a generator to recharge first rechargeable energy source 70 or provide electrical power to other components of system 10. System 10, as shown in FIGS. 22-29, may advantageously operate in a variety of modes.

Figure 22:
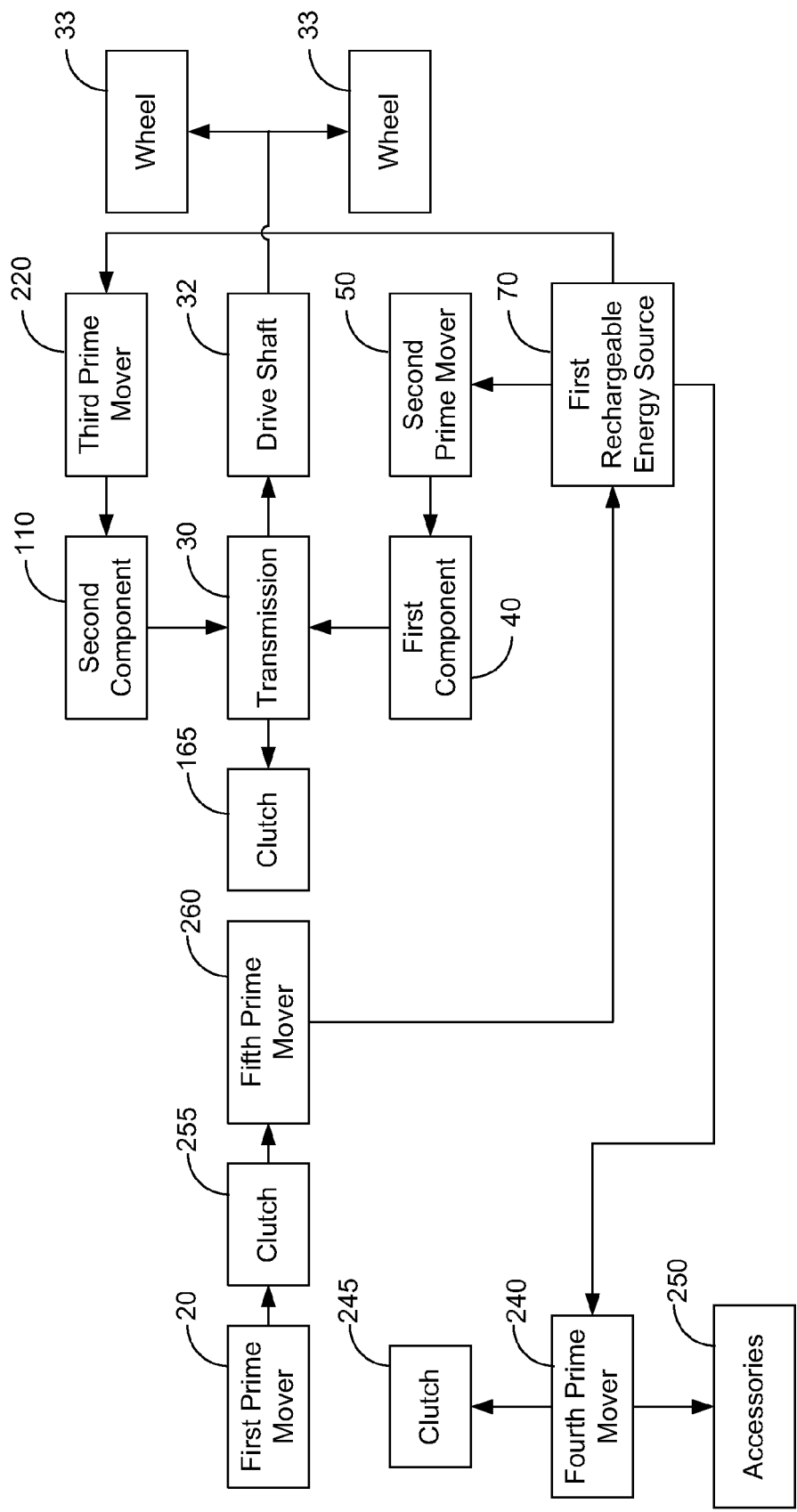
FIG. 22 is a general block diagram of a hybrid vehicle drive system in series mode operation in accordance with an exemplary embodiment.

FIG. 22 illustrates system 2200 in a series mode of operation as the vehicle is accelerating. First prime mover 20 turns fifth prime mover 260 which charges first rechargeable energy source 70. Clutch 165 is disengaged to decouple fifth prime mover 260 from transmission 30. First rechargeable energy source 70 provides electrical power to second prime mover 50 and third prime mover 220 which drive transmission 30 through first component 40 and second component 110, respectively. According to other exemplary embodiments, only one of second prime mover 50 and third prime mover 220 may provide power to transmission 30.

Figure 23:
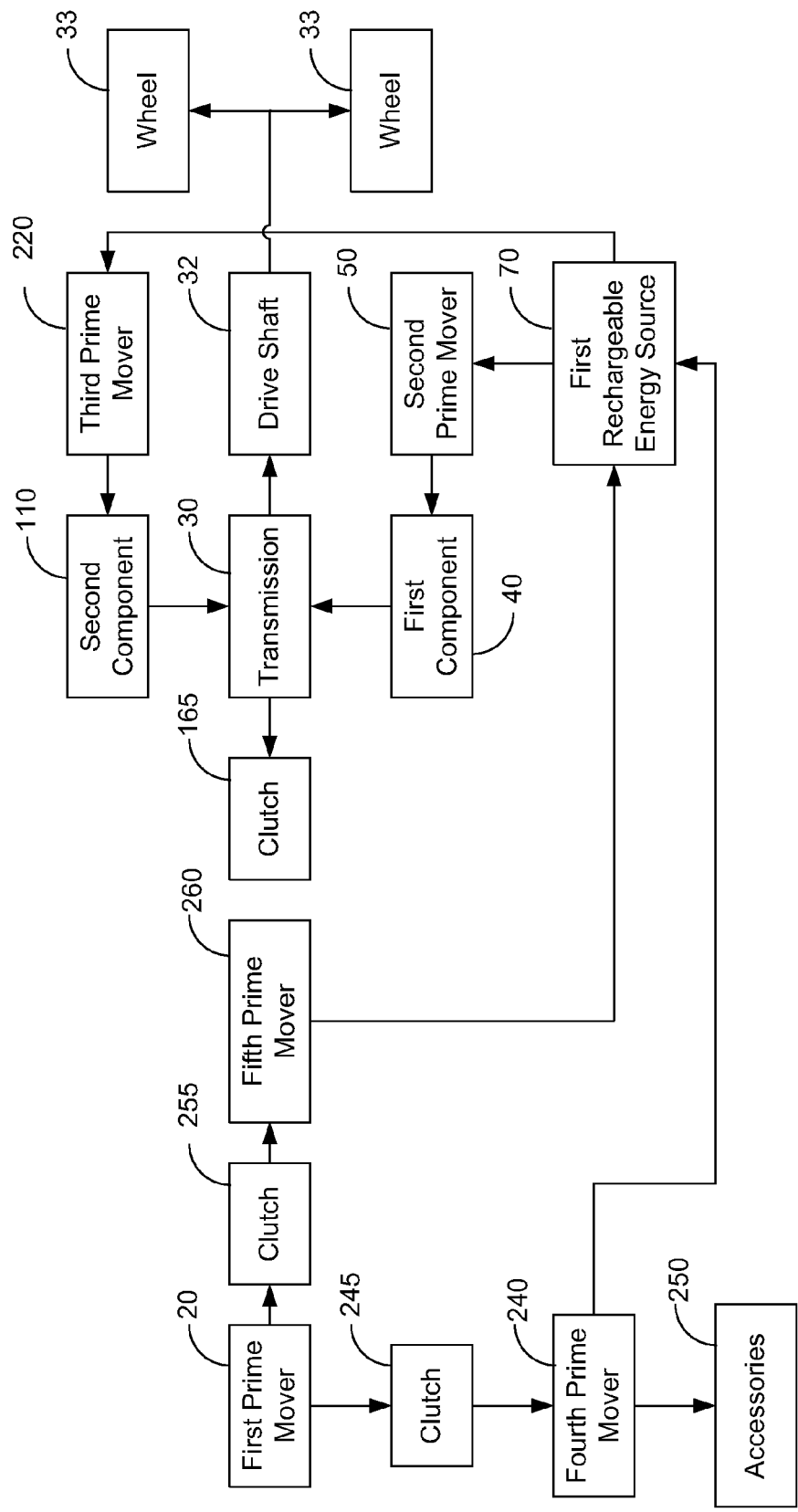
FIG. 23 is a general block diagram of a hybrid vehicle drive system in a series mode of operation in accordance with an exemplary embodiment.

FIG. 23 illustrates system 2200 in a series mode of operation as the vehicle is accelerating according to another exemplary embodiment. First prime mover 20 turns fifth prime mover 260 which charges first rechargeable energy source 70. Clutch 165 is disengaged to decouple fifth prime mover 260 from transmission 30. First rechargeable energy source 70 provides electrical power to second prime mover 50 and third prime mover 220 which drive transmission 30 through first component 40 and second component 110, respectively. According to other exemplary embodiments, only one of second prime mover 50 and third prime mover 220 may provide power to transmission 30. Clutch 245 is engaged so first prime mover 20 further drives fourth prime mover 240. Fourth prime mover 240 may be used to power on-board accessories 250 and/or recharge first rechargeable energy source 70.

Figure 24:
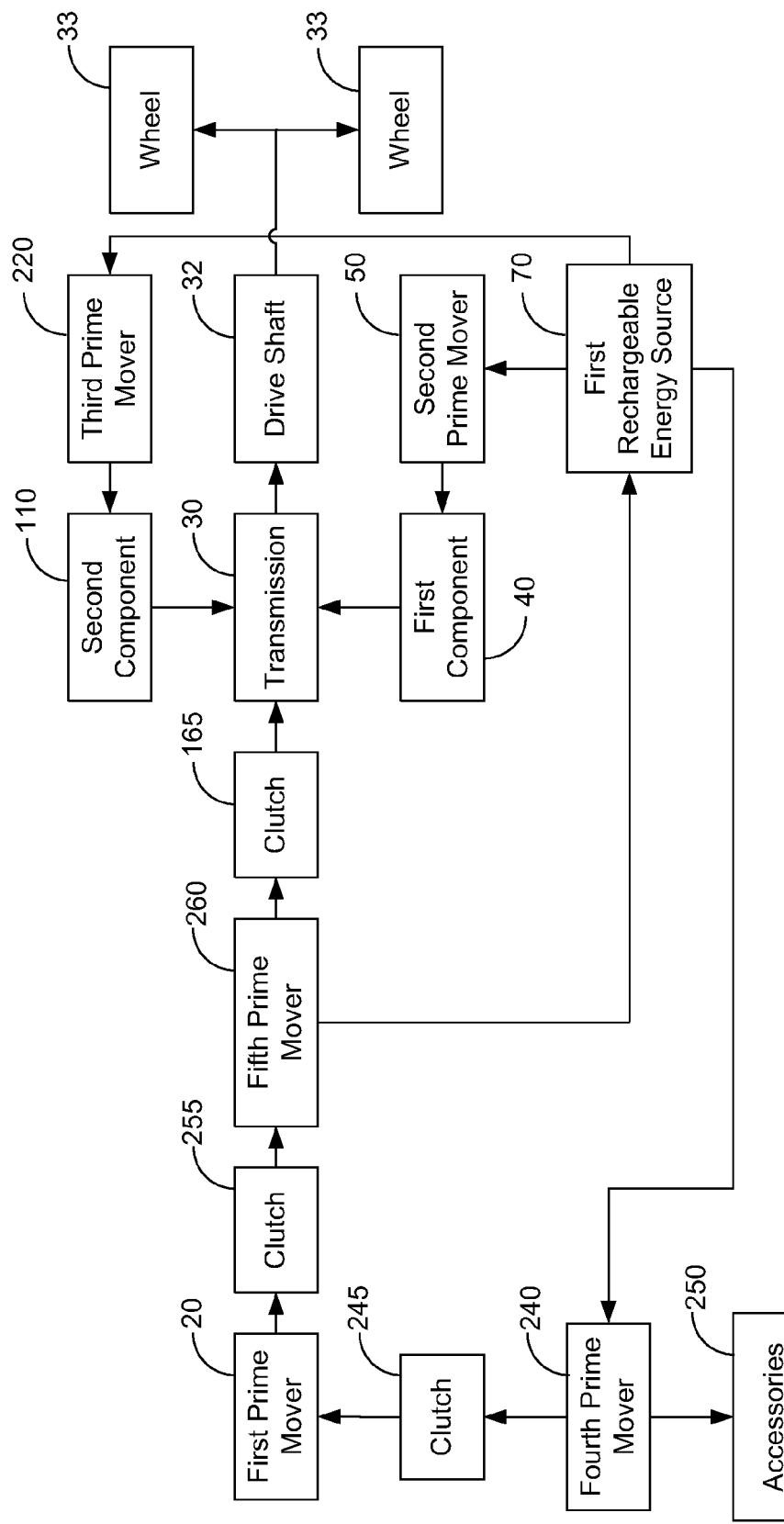
FIG. 24 is a general block diagram of a hybrid vehicle drive system in a parallel mode of operation in accordance with an exemplary embodiment.

FIG. 24 illustrates system 2200 in a parallel mode of operation as the vehicle is accelerating. Power from both first prime mover 20 and first rechargeable energy source 70 is used to power the drive train. First prime mover 20 turns fifth prime mover 260 and transmission 30. Clutch 165 is engaged to couple fifth prime mover 260 to transmission 30. First rechargeable energy source 70 provides electrical power to second prime mover 50 and third prime mover 220 which drive transmission 30 through first component 40 and second component 110, respectively. According to other exemplary embodiments, only one of second prime mover 50 and third prime mover 220 may provide power to transmission 30. First rechargeable energy source 70 further powers fourth prime mover 240. Clutch 255 is engaged so fourth prime mover 240 is coupled to first prime mover 20 to assist driving the drive train. To reduce clutch wear, clutch 165 may be disengaged and second prime mover 50 and third prime mover 220 (via components 40 and 110) may provide the initial power to accelerate the vehicle. This method may also reduce or eliminate the need for a torque converter. Once the input shaft is close to or the same speed as the engine drive shaft, clutch 165 is engaged to couple first prime mover 20 and transmission 30.

Figure 25:
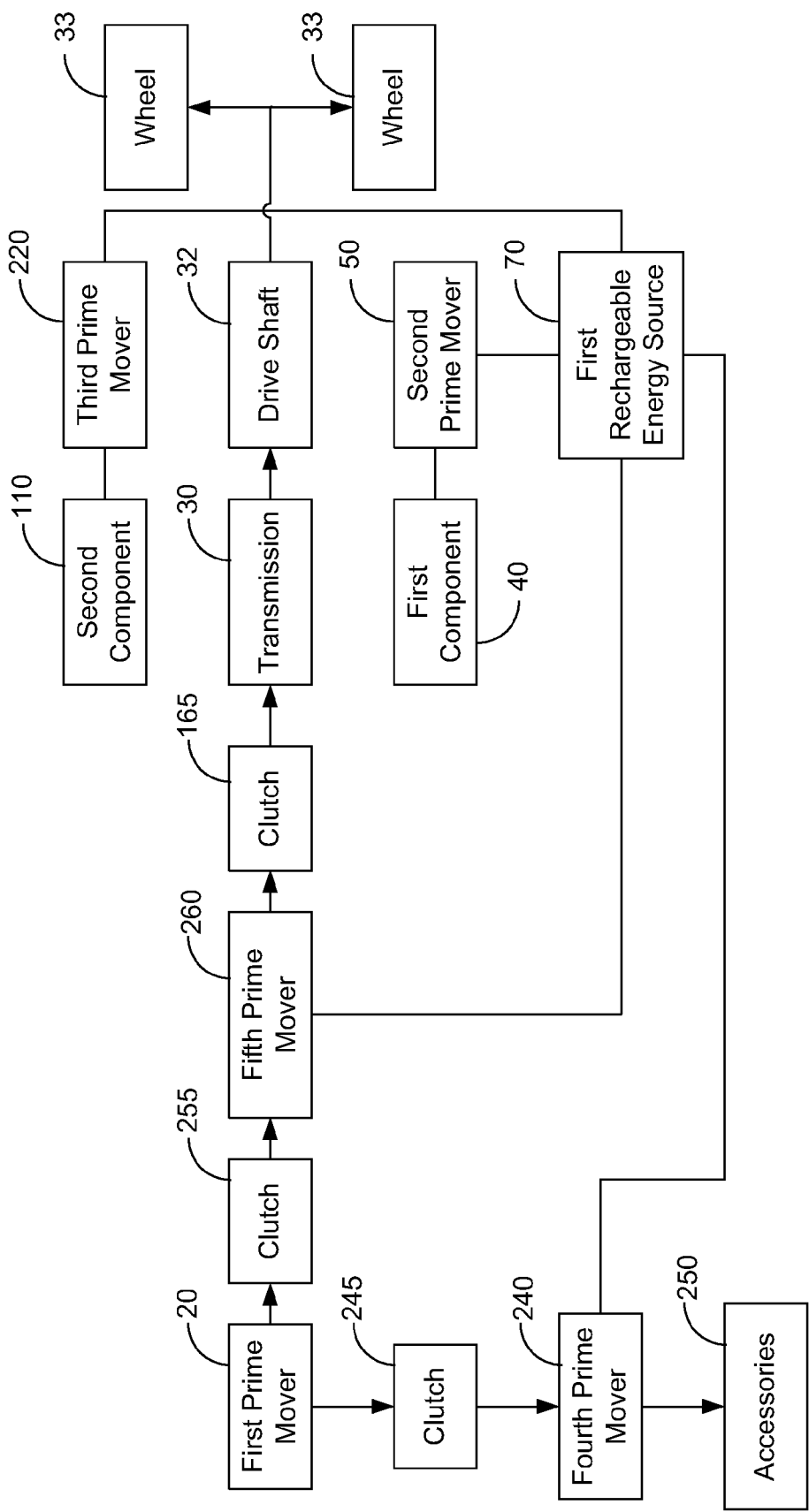
FIG. 25 is a general block diagram of a hybrid vehicle drive system in a cruising mode in accordance with an exemplary embodiment.

FIG. 25 illustrates system 2200 in a cruising mode with first prime mover 20 providing the power to maintain a relatively constant speed for the vehicle (e.g., during highway driving). Unnecessary loads such as unused hybrid components, are disconnected. Directly coupling first prime mover 20 to drive shaft 32 provides best efficiency when first prime mover 20 can operate at a steady state in an efficient rpm and load range.

Figure 26:
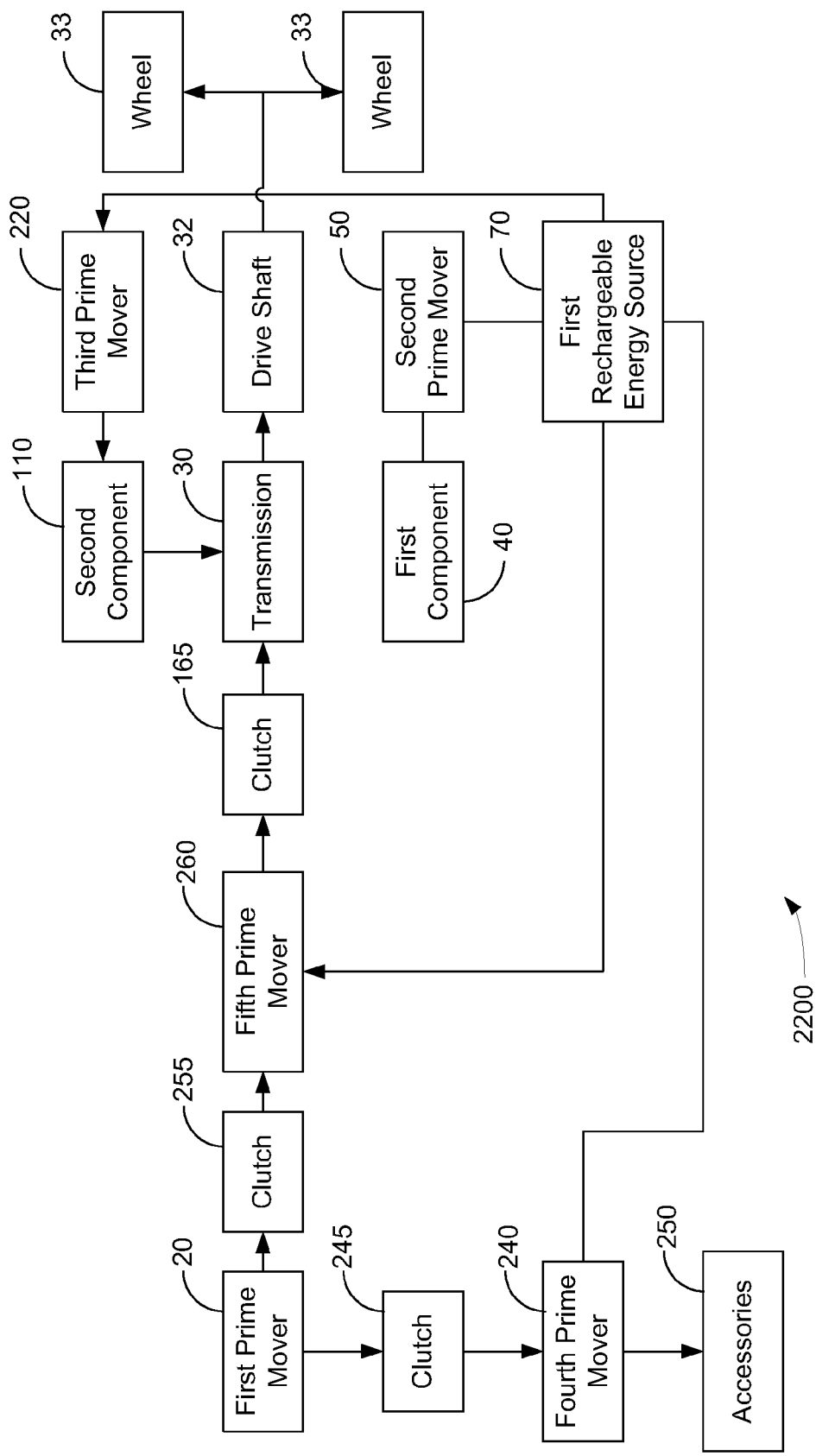
FIG. 26 is a general block diagram of a hybrid vehicle drive system in a cruising mode in accordance with an exemplary embodiment.

As shown in FIG. 26, hybrid components of system 2200 may be temporarily engaged when vehicle is in a cruising mode (FIG. 25) to slow or accelerate the vehicle. First rechargeable energy source 70 may provide additional power to the drive train through one or more prime movers to accelerate the vehicle. After vehicle resumes a steady highway cruise, the additional prime movers can be disengaged (e.g., by disengaging components 40 and 110) to remove unnecessary resistance of unneeded hybrid components. Temporarily using hybrid components to provide additional power to the drive shaft allows a smaller horsepower engine to be used in its optimal range for maximum efficiency. Large swings in required output from the ICE are further reduced. Internal combustion engines generally operate less efficiently when required to provide large transient loads or when power output is much higher or lower than the optimal range. As alternative embodiment, additional prime movers may be engaged if needed to slow or accelerate the vehicle. For example, second prime mover 50 can be coupled to transmission 30 through first component 40 to provide additional acceleration or slow the vehicle.

Figure 27:
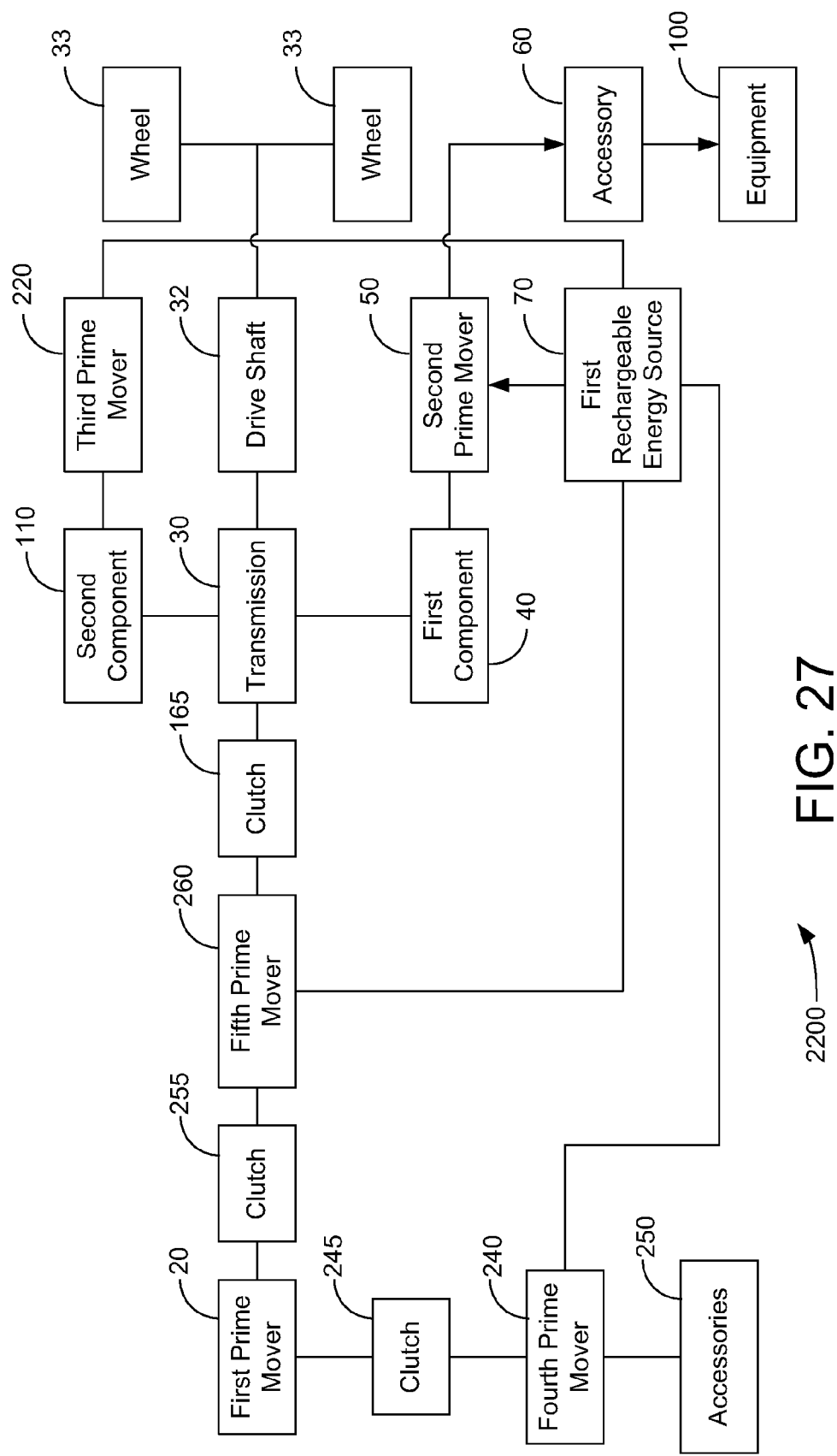
FIG. 27 is a general block diagram of a hybrid vehicle drive system when the vehicle is stationary in accordance with an exemplary embodiment.

To reduce idle time of the internal combustion engine, first prime mover 20 may be turned off when the vehicle is stationary, as shown in FIG. 27. Second prime mover 50 is powered by first rechargeable energy source 70 and drives accessory 60 and equipment 100. According to other exemplary embodiments, accessory 60 may be provided between first component 40 and second prime mover 50 (as shown in FIG. 13).

Figure 28:
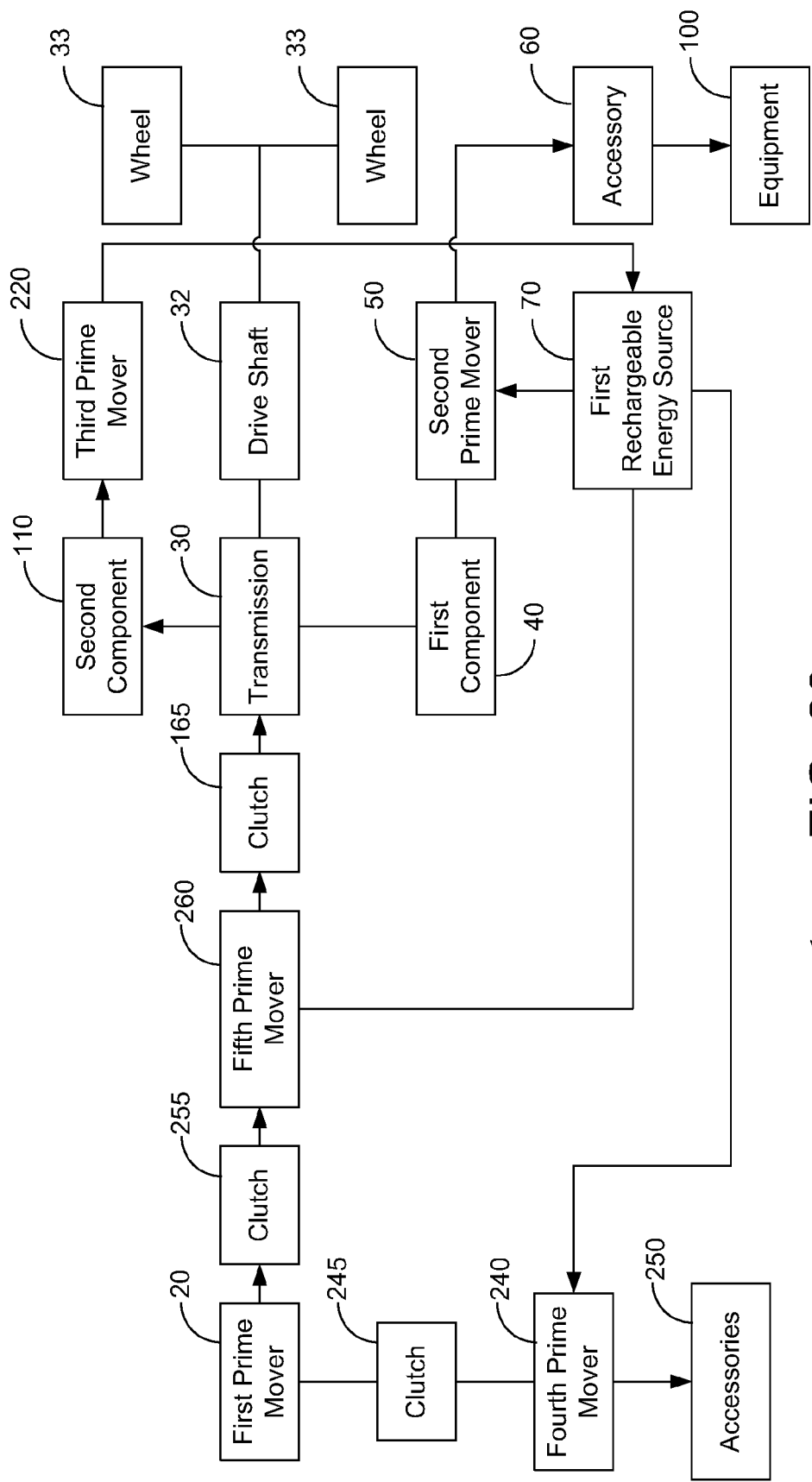
FIG. 28 is a general block diagram of a hybrid vehicle drive system when the first prime mover is used to recharge the energy source in accordance with an exemplary embodiment.

As shown in FIG. 28, first prime mover 20 may be used to recharge first rechargeable energy source 70. According to one exemplary embodiment, accessory 60 is a hydraulic pump. If the rotational speed of second prime mover 50 needs to vary (e.g., to accommodate changes in required hydraulic flow), component 110 is engaged and used to recharge first rechargeable energy source 70 through third prime mover 220. Second prime mover 50, meanwhile, can operate independently to provide power to accessory 60 with varying rotation speed. First rechargeable energy source 70 may further provide power to fourth prime mover 240 to drive on-board accessories 250. According to another exemplary embodiment, if the rotational speed of the hydraulic pump is constant, component 40 may be engaged so that first prime mover 20 drives accessory 60 and second prime mover 50 without the intermediate recharging step. According to still another exemplary embodiment, rotational speed of second prime mover 50 may be varied and component 110 may be absent. The system may be charged while varying flow by keeping the rotational speed of accessory 60 constant while varying the output of the pump to change flow (e.g. on a digger derrick application in which the speed of the auger must be changed by adjusting flow).

Figure 29:
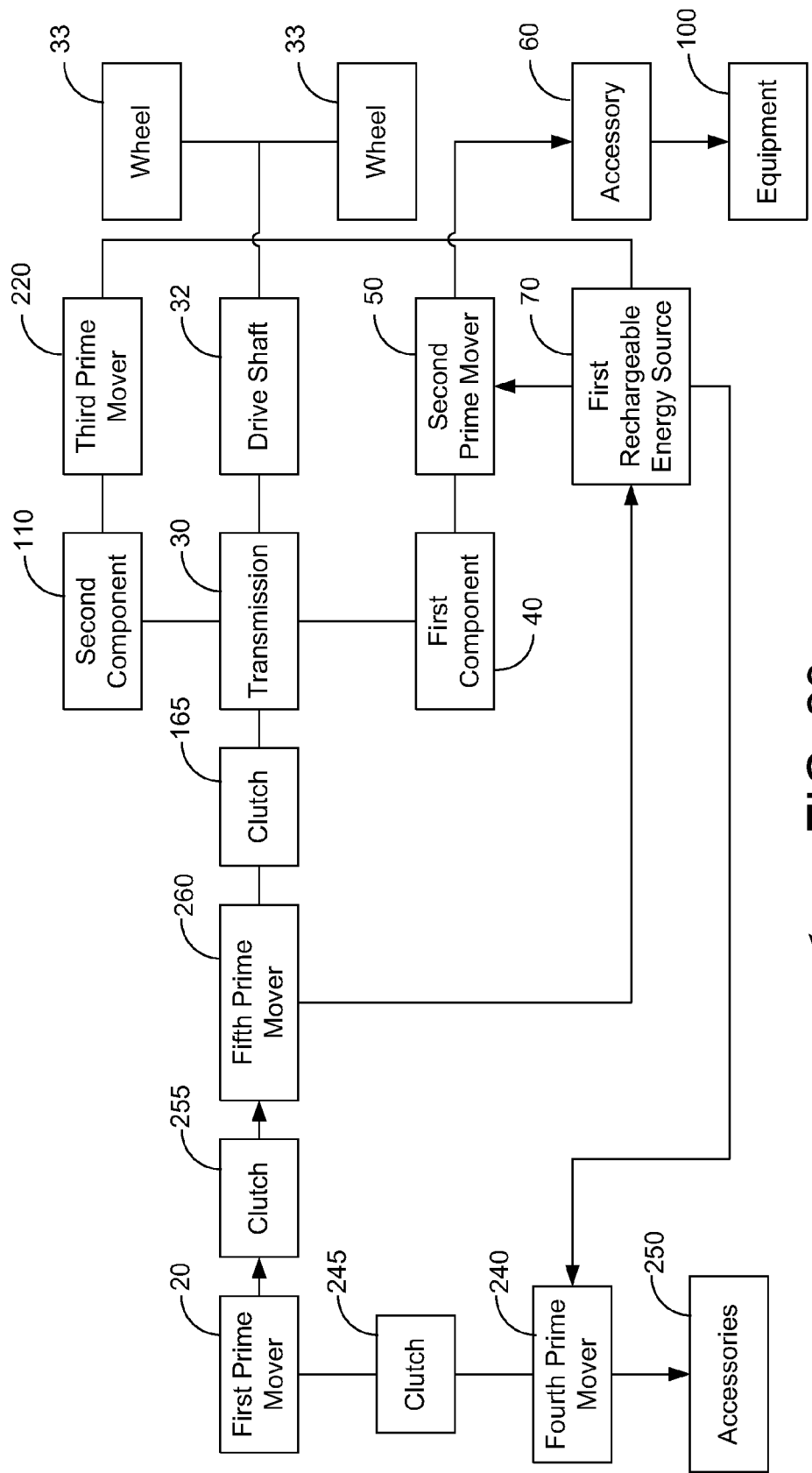
FIG. 29 is a general block diagram of a hybrid vehicle drive system when the first prime mover is used to recharge the energy source in accordance with an exemplary embodiment.

As shown in FIG. 29, first prime mover 20 may be used to recharge first rechargeable energy source 70. First prime mover 20 turns fifth prime mover 260 which charges first rechargeable energy source 70. Clutch 165 is disengaged to decouple fifth prime mover 260 from transmission 30. Second prime mover 50, meanwhile, can operate independently to provide power to accessory 60 with varying rotation speed. First rechargeable energy source 70 may further provide power to fourth prime mover 240 to drive on-board accessories 250.

According to another exemplary embodiment, system 10 may be an idle reduction system. An idle reduction system may have a configuration similar to any previously described embodiment of system 10 but is not configured to provide power back to first prime mover 20 and drive shaft 32 (e.g., the drive train). Instead, component 40 only provides power in one direction (e.g., component 40 does not back-drive into transmission 30). Such a system 10 does not require additional software, calibration and control electronics that is required for the integration of a hybrid drive system. Such a system 10 may also not require sophisticated thermal management systems and higher capacity motors and drive electronics. Such a system 10 may include an optional secondary rechargeable power source 90 such as an accumulator and/or an optional APU 80 or may even include a connection to a power grid. Similar to the embodiment shown in FIG. 14, system 2200 may include an optional clutch 160 between component 40 and second prime mover 50 or accessory 60. If system 10 does not include a second rechargeable power source 90 such as an accumulator, system 10 may include air, wireless or fiber optic controls. If system 10 includes a second rechargeable power source 90, no additional control system is required (e.g., the accumulator forms a closed centered hydraulic system with hydraulic controls).

As an example, in one idle reduction configuration, a PTO with an integrated clutch is connected to a transmission and is coupled to a hydraulic motor. The hydraulic motor has a thru-shaft and is also coupled to an electric motor. The motor may be an AC motor or a DC motor. Batteries supply energy to the motor, electronics control motor speed and turn motor on and off. The PTO may be disengaged from the transmission to allow the electric motor to move the hydraulic pump. It may be necessary to modify the PTO to allow the shaft to spin freely when not engaged with the transmission. When the batteries reach a low state of charge, or the electric motor speed slows below an acceptable level due to low battery energy, the prime mover (usually a diesel or gas engine) is started. The engine rpm is adjusted so that the PTO shaft will provide the needed rotational speed for the hydraulic pump. PTO is then engaged and drives the hydraulic pump.

The batteries can be charged through the electric motor, or through a vehicle alternator, or alternatively the batteries may remain depleted at the job-site and recharged once the vehicle returns to a location in which power from the grid can be used to recharge the batteries. If batteries remain depleted, the engine is started, PTO is engaged and hydraulic pump or other auxiliary equipment often used on a work truck at a job-site is mechanically powered by the first prime mover (ICE).

The location to charge the vehicle may be a garage with a charging station or an ordinary plug. Using only grid power to recharge the batteries can simplify the idle reduction system. A separate vehicle monitoring system may record if the batteries are recharged at a garage overnight, or if the batteries need to be serviced or replaced. Such a system may send a signal via a link (such as cellular, satellite, or wireless local area network, or a wired connection) to a fleet management system so that fleet personnel can take action to maintain system or train vehicle operators.

The battery system may be designed to be modular and easy for replacement battery modules to be installed. A modular, replaceable battery system can allow a vehicle to use a lower cost battery initially that has a shorter useful life and then replace it when the existing battery no longer can store sufficient energy, with the same type of battery, or a more advanced battery. A replaceable battery system may be beneficial since lower cost batteries can be used until more advanced batteries capable of more energy storage, lower mass and greater service life are available at lower costs. The battery system may have electronics integrated in a module and may include thermal management. The electronics may produce uniform input and output electrical characteristics, allowing for different battery technologies to be used, without affecting idle reduction performance. The battery may also be designed for quick replacement. Such a design could make it possible to use batteries that are charged at a base station. Batteries at a base station may provide power for a facility or to the grid when not needed for a vehicle. There may be additional electronics integrated with the battery module including monitoring circuitry to record power available, power used, how much of the battery life has been reduced (possibly based upon overall percent discharge, rate of discharge and recharge, average operating temperature, frequency of balancing various cells or frequency of achieving full state of charge). Such a system may allow for rental of a battery system or payment based upon battery usage and estimated reduction in battery useful life. This type of modular battery system can also be used on other embodiments of hybrid systems described in this disclosure.

As has been discussed, system 10 may perform many different functions. The function of the various exemplary embodiments of system 10 may change based on the behavior of the vehicle that includes system 10. For example, when the vehicle is braking, regenerative braking may be used to recharge first rechargeable energy source 70 and/or second rechargeable energy source 90. During acceleration, first rechargeable energy source 70 and/or second rechargeable energy source 90 may be used to provide power to the drive train. When the vehicle is parked, on-board equipment 100 such as a hydraulic lift may be activated. Such a hydraulic lift would draw power from second rechargeable energy source 90 (e.g., a hydraulic accumulator) or be driven directly by an accessory 60 such as a hydraulic pump. Once the lift is raised and stops, hydraulic fluid no longer flows. In this position, second rechargeable energy source 90 does not have to be charged and accessory 60 does not have to run to keep the hydraulic lift raised. Therefore, when the lift is not moving, second prime mover 50 may be turned off to reduce unnecessary consumption of energy from first rechargeable energy source and first prime mover 20 may be turned off to reduce unnecessary idling. Prime mover 20 may remain off when the vehicle is parked if there is sufficient energy in rechargeable energy sources for equipment, or "hotel loads", or power that is exported from the vehicle to power tools or lights or other loads. System 10 may include sensors and a control system to automatically turn on and off first prime mover 20, second prime mover 50, accessory 60, or other components of system 10 when they are not needed thereby conserving fuel and reducing emissions.

Figure 17:
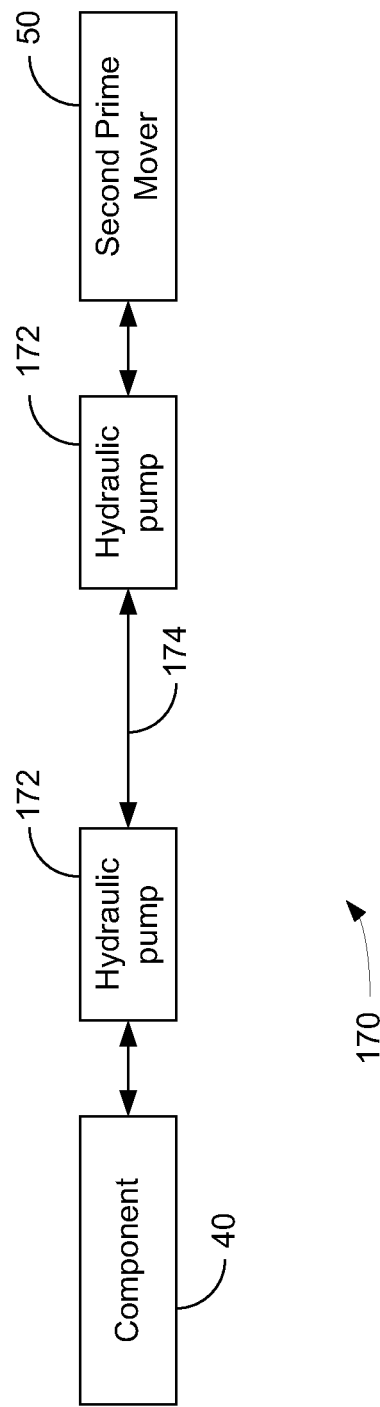
FIG. 17 is a general block diagram of a fluid coupling connecting two exemplary elements of a hybrid vehicle drive system according to an exemplary embodiment.

According to various exemplary embodiments, the elements of system 10 may be coupled together with fluid couplings. One exemplary embodiment of such coupling 170 is shown in FIG. 17 coupling a component 40 to a second prime mover 50. Fluid coupling 170 includes one or more hydraulic motors/pumps 172 and a fluid channel 174 that couples together the hydraulic motors/pumps 172. While fluid couplings 170 may increase the cost of system 10, they allow greater flexibility in the placement of the various elements of system 10 over that which would be generally possible if the elements are coupled with mechanical shafts.

It is also important to note that the arrangement of the hybrid drive system components, as shown, are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited herein. Further, the discussions related to optional clutches apply to other embodiments described with respect to other Figures. For example, although an APU 80 and optional clutches are shown in various embodiments, they can be removed from the system without departing from the scope of the invention unless specifically recited in the claims. Accordingly, all such modifications are intended to be included within the scope of the present disclosure as described herein. The order or sequence of any process or method steps may be varied or re-sequenced according to alternative embodiments. Other substitutions, modifications, changes, and/or omissions may be made in the design, operating conditions and arrangement of the preferred and other exemplary embodiments without departing from the exemplary embodiments of the present disclosure as expressed herein.

What is claimed is:
1. A hybrid vehicle drive system for use with a first prime mover and a first transmission driven by the first prime mover, the system comprising:
   a second prime mover coupled to a rechargeable energy source; and a PTO interface, wherein the first prime mover is configured to provide power through the PTO interface to the second prime mover to operate the second prime mover, and the second prime mover is configured to provide power to a drive shaft through the PTO interface, wherein an electrical control system monitors torque of the second prime mover and the first prime mover to ensure a turbine torque limit associated with the first transmission is not exceeded, and wherein the second prime mover is configured to provide additional power to the drive shaft when the first prime mover provides power to the drive shaft through the transmission.

2. The system according to claim 1, wherein the electrical control system monitors the torque of the first prime mover by monitoring input torque after multiplication by a torque converter.

3. The system according to claim 1, wherein the electrical control system monitors power of the second prime mover and the first prime mover to ensure the turbine power limit is not exceeded.

4. The system according to claim 1, wherein an accessory is coupled to the second prime mover and a torque of the accessory is monitored to ensure the turbine torque limit is not exceeded.

5. The system according to claim 4, wherein the electrical control system sums the torque of the first prime mover, the second prime mover, and the accessory.

6. The system according to claim 1, wherein the electrical control system ensures the torque limits of other components in the first transmission are not exceeded.

7. The system according to claim 1, wherein the second prime mover is also configured to provide sole power to the drive shaft when no power is provided by the first prime mover to the drive shaft through the transmission.

8. The system according to claim 1, further comprising at least one more PTO interface configured to channel power to the drive shaft through the transmission.

9. A hybrid vehicle drive system for use with a first prime mover and a first transmission driven by the first prime mover, the system comprising:

a second prime mover coupled to a rechargeable energy source;

a PTO interface, wherein the first prime mover is configured to provide power through the PTO interface to the second prime mover to operate the second prime mover, and the second prime mover is configured to provide power to a drive shaft through the PTO interface; and an electrical control system configured to monitor torque of the second prime mover and the first prime mover to ensure a turbine torque limit associated with the first transmission is not exceeded, wherein the second prime mover is configured to provide additional power to the rechargeable energy source by using continuous power from the first prime mover when the first prime mover provides power to the drive shaft through the transmission, wherein the second prime mover is configured to provide additional power to the drive shaft when the first prime mover provides power to the drive shaft through the transmission.

10. The system according to claim 9, wherein the electrical control system monitors the torque of the first prime mover by monitoring input torque after multiplication by a torque converter.

11. The system according to claim 9, wherein the electrical control system monitors power of the second prime mover and the first prime mover to ensure the turbine power limit is not exceeded.

12. The system according to claim 9, wherein an accessory is coupled to the second prime mover and a torque of the accessory is monitored to ensure the turbine torque limit is not exceeded.

13. The system according to claim 12, wherein the electrical control system sums the torque of the first prime mover, the second prime mover, and the accessory.

14. The system according to claim 9, wherein the second prime mover is configured to provide the additional power to the rechargeable energy source by using the continuous power from the first prime mover when the first prime mover provides power to the transmission while the vehicle is driving, the driving including periods of time when the vehicle is in motion and temporarily at rest.

15. The system according to claim 9, wherein the second prime mover is configured to provide the additional power to the rechargeable energy source by using the continuous power from the first prime mover when the first prime mover provides power to the transmission while the vehicle is at temporarily at rest with a brake pedal depressed.

16. A hybrid vehicle drive system for use with a first prime mover and a first transmission driven by the first prime mover, wherein the first prime mover is an internal combustion engine, the system comprising:

a second prime mover coupled to a rechargeable energy source, wherein the second prime mover is an electric motor;

a PTO interface, wherein the first prime mover is configured to provide power through the PTO interface to the second prime mover to operate the second prime mover, and the second prime mover is configured to provide power to a drive shaft through the PTO interface; and an electrical control system configured to monitor torque of the second prime mover and the first prime mover to ensure a turbine torque limit associated with the first transmission is not exceeded, wherein the second prime mover is configured to provide additional power to the drive shaft through the PTO interface when the first prime mover provides power to the drive shaft, provide power to the rechargeable energy source, and directly drive an accessory.

17. The system according to claim 16, wherein the accessory is a hydraulic pump.

18. The system according to claim 16, wherein the electric control system is configured to monitor the torque of the second prime mover and the first prime mover to ensure a power take off drive gear rating associated with the first transmission is not exceeded.

* * * * *

UNITED STATES PATENT AND TRADEMARK OFFICE
CERTIFICATE OF CORRECTION

| | |
|---|---|
| PATENT NO. | : 8,905,166 B2 |
| APPLICATION NO. | : 13/629533 |
| DATED | : December 9, 2014 |
| INVENTOR(S) | : Joseph Thomas Dalum et al. |

It is certified that error appears in the above-identified patent and that said Letters Patent is hereby corrected as shown below:

On Title Page 2, column 1, under Related U.S. Application Data, line 9, delete "12/130,088," and insert -- 12/130,888, --.

In the Claims

In column 29, line 12, claim 1, after "through the" insert -- first --.

In column 29, line 21, claim 3, delete "ensure the" and insert -- ensure a --.

In column 30, line 2, claim 9, after "through the" insert -- first --.

In column 30, line 9, claim 11, delete "ensure the" and insert -- ensure a --.

Signed and Sealed this
Fifth Day of May, 2015

Michelle K. Lee
*Director of the United States Patent and Trademark Office*